(12) United States Patent
Ishizono et al.

(10) Patent No.: US 8,668,248 B2
(45) Date of Patent: Mar. 11, 2014

(54) VEHICLE BODY STRUCTURE

(75) Inventors: Manabu Ishizono, Wako (JP); Takumi Tsuyuzaki, Wako (JP); Kosaku Tomozawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 13/505,365

(22) PCT Filed: Oct. 29, 2010

(86) PCT No.: PCT/JP2010/069325
§ 371 (c)(1),
(2), (4) Date: May 1, 2012

(87) PCT Pub. No.: WO2011/055695
PCT Pub. Date: May 12, 2011

(65) Prior Publication Data
US 2012/0212009 A1    Aug. 23, 2012

(30) Foreign Application Priority Data

| Nov. 5, 2009 | (JP) | 2009-254219 |
| Nov. 20, 2009 | (JP) | 2009-265367 |
| Dec. 17, 2009 | (JP) | 2009-286939 |
| Dec. 17, 2009 | (JP) | 2009-286948 |
| Dec. 17, 2009 | (JP) | 2009-286954 |
| Dec. 17, 2009 | (JP) | 2009-286969 |
| Jul. 13, 2010 | (JP) | 2010-159042 |

(51) Int. Cl.
*B62D 25/20* (2006.01)

(52) U.S. Cl.
USPC .............. 296/187.08; 296/204; 296/193.07; 296/70; 296/209

(58) Field of Classification Search
USPC ............. 296/204, 187.09, 187.08, 193.07, 296/193.09, 203.02, 70, 209
See application file for complete search history.

(56) References Cited

U.S. PATENT DOCUMENTS

| 5,613,727 A | 3/1997 | Yamazaki |
| 7,469,957 B1 | 12/2008 | Boettcher |
| 2010/0171340 A1 | 7/2010 | Yasuhara et al. |
| 2012/0242113 A1* | 9/2012 | Yasuhara et al. ......... 296/193.07 |

FOREIGN PATENT DOCUMENTS

| JP | 64-26581 | 2/1989 |
| JP | 05-270435 | 10/1993 |
| JP | 08-020363 | 1/1996 |

(Continued)

*Primary Examiner* — Jason S Morrow
(74) *Attorney, Agent, or Firm* — Rankin, Hill & Clark LLP

(57) ABSTRACT

A vehicle body (11) including: a tunnel cross-member (28) extending in the vehicle's widthwise direction along the lower surface of a tunnel section (18) of the floor panel (19); left and right side-frame extensions (22, 22) extending rearward along the lower surfaces (31, 32) of the dashboard (15) from the rear ends of left and right front side-frames (16, 16). The left and right side-frame extensions each bifurcate into a side sill-side extension (43, 43) which, while tilting, extends rearward and outward in the vehicle's widthwise direction from the rear end of each of the left and right side-frame extensions to a side sill (17, 17), and into a tunnel-side extension (44, 44) which, while tilting, extends rearward and inward in the vehicle's widthwise direction from the rear end of each of the left and right side-frame extensions to the tunnel cross-member. The tilt of the side sill-side extensions and the tilt of the tunnel-side extensions are substantially the same.

17 Claims, 49 Drawing Sheets

(56) References Cited

FOREIGN PATENT DOCUMENTS

| | | |
|---|---|---|
| JP | 10-119826 | 5/1998 |
| JP | 2001-219873 | 8/2001 |
| JP | 2004-090856 | 3/2004 |
| JP | 2005-206107 | 8/2005 |
| JP | 2005-247178 | 9/2005 |
| JP | 2007-210572 | 8/2007 |
| JP | 2008-230460 | 10/2008 |
| JP | 2009-018724 | 1/2009 |

\* cited by examiner

VEHICLE BODY STRUCTURE

TECHNICAL FIELD

The present invention relates to a vehicle body structure of a passenger vehicle or any other similar vehicle, and particularly to a vehicle body that allows an energy container for storing a variety of types of energy, such as a fuel tank, a battery, or a fuel cell, to be disposed below a driver's seat and below or above a front floor panel, or a vehicle body that allows the energy container to be disposed behind the driver's seat.

BACKGROUND ART

Patent Document 1 discloses a vehicle body in which a fuel tank is disposed below a driver's seat and below a front floor panel. A summary of a front portion of the vehicle body disclosed in Patent Document 1 is described with reference to FIG. 56 hereof. FIG. 56 diagrammatically shows a planar structure of the front portion of the vehicle body disclosed in Patent Document 1.

A front portion of a vehicle body 200 disclosed in Patent Document 1 accommodates left and right front side frames 201, 201 positioned on opposite sides in the vehicle-width direction, left and right floor frames 202, 202 extending rearward from the rear ends of the left and right front side frames 201, 201, and left and right side sills 203, 203 positioned outside the left and right floor frames 202, 202 in the vehicle-width direction, as shown in FIG. 56.

A front floor panel 204 runs between the left and right side sills 203, 203. The front floor panel 204 is a flat plate extending rearward from a lower portion of a dashboard 205, supported by the left and right floor frames 202, 202, and has a tunnel portion 206 having an upwardly protruding shape. The tunnel portion 206 extends from the lower end of a vehicle-width direction center portion of the dashboard 205 to a rear portion of the front floor panel 204. The front ends of the left and right floor frames 202, 202 are connected to the front ends of the left and right side sills 203, 203 by left and right outriggers 207, 207. Front portions of the left and right floor frames 202, 202 are connected to each other by a front cross-member 208. The rear ends of the left and right floor frames 202, 202 are connected to each other by a rear cross-member 209, which runs between the left and right side sills 203, 203.

A fuel tank 210 is disposed in a narrow space Sp200 under the front floor panel 204, between the left and right floor frames 202, 202, and behind the front cross-member 208.

When an impact acts on the front surface of the vehicle or when what is called a head-on collision occurs, the impact from the front side is transmitted through the left and right front side frames 201, 201 to the left and right floor frames 202, 202. Part of the impact is transmitted from the left and right floor frames 202, 202 through the left and right outriggers 207, 207 to the left and right side sills 203, 203. That is, the impact is distributed to the left and right floor frames 202, 202 and the left and right side sills 203, 203.

The front impact acts in the direction from the front to the rear of the vehicle body 200. On the other hand, the left and right outriggers 207, 207 extend in the vehicle-width direction. The direction in which the front impact acts greatly differs from the direction in which the left and right outriggers 207, 207 extend, which means that only the left and right floor frames 202, 202 receive most of the impact, and consideration therefore needs to be given to ensuring sufficient strength and rigidity of the left and right floor frames 202, 202. It is, however, noted that simply reinforcing the left and right floor frames 202, 202 disadvantageously increases the weight of the vehicle body 200.

PRIOR ART LITERATURE

Patent Literature

Patent Document 1: Japanese Patent Application Laid-Open Publication No. 2007-210572

SUMMARY OF INVENTION

Technical Problem

An object of the invention is to provide a technology for efficiently distributing an impact acting on the front surface of a vehicle, produced when what is called a head-on collision occurs, to left and right side sills and a tunnel portion.

Solution to Problem

According to the invention as defined in claim 1, there is provided a vehicle body structure comprising left and right front side frames located in a front portion of a vehicle body on left and right sides thereof and extending in a longitudinal direction of the vehicle body, a dashboard located behind the left and right front side frames and partitioning the vehicle body into the front portion and a rear portion, left and right side sills located behind the dashboard and on outer sides of the left and right front side frames in a vehicle-width direction and extending in the longitudinal direction of the vehicle body, a floor panel running between the left and right side sills and extending rearward from a lower portion of the dashboard, and a tunnel portion protruding upward from the floor panel and extending from a vehicle-width direction center and lower end of the dashboard to a rear portion of the floor panel, the vehicle body structure further comprising: a tunnel cross-member extending in the vehicle-width direction along a lower surface of a front portion of the tunnel portion and running across the tunnel portion; and left and right side frame extensions extending rearward from rear ends of the left and right front side frames and located along a lower surface of the dashboard, wherein the left and right side frame extensions have left and right bifurcating portions under the dashboard where the left and right side frame extensions bifurcate into left and right side-sill-side extensions and left and right tunnel-side extensions, the left and right side-sill-side extensions extend from the left and right bifurcating portions outward in the vehicle-width direction and obliquely rearward and are bonded to the left and right side sills, the left and right tunnel-side extensions extend from the left and right bifurcating portions inward in the vehicle-width direction and obliquely rearward and are bonded to the tunnel cross-member, and a first tilt angle by which the left and right side-sill-side extensions are inclined outward in the vehicle-width direction and rearward is set to be equal to or substantially equal to a second tilt angle by which the left and right tunnel-side extensions are inclined inward in the vehicle-width direction and rearward.

According to the invention as defined in claim 2, the vehicle body structure further comprises a front cross-member located behind the left and right tunnel-side extensions and extending in the vehicle-width direction, and the left and right side-sill-side extensions, the left and right tunnel-side extensions, and the front cross-member form left and right first triangular frame structures each of which having a substantially triangular shape.

According to the invention as defined in claim 3, the vehicle body structure further comprises left and right connecting members connecting front ends of the left and right side sills to the left and right bifurcating portions, the left and right connecting members, the left and right side sills, and the left and right side-sill-side extensions form left and right second triangular frame structures, each of which having a substantially triangular shape; and each of the second triangular frame structures is adjacent to the first triangular frame structure.

According to the invention as defined in claim 4, in the vehicle body structure each of the left and right side frame extensions forms a closed cross-section, and an area or a width of the closed cross-section of each of the left and right side frame extensions is set to be maximized at the corresponding bifurcating portion.

According to the invention as defined in claim 5, the vehicle body structure further comprises left and right tunnel frames located on opposite sides of the tunnel portion in the vehicle-width direction and extending in the longitudinal direction of the vehicle body, and rear ends of the left and right tunnel-side extensions are bonded to the left and right tunnel frames.

According to the invention as defined in claim 6, in the vehicle body structure, front portions of the left and right tunnel frames extend outward in the vehicle-width direction while being curved in opposite directions, and the front portions are connected to each other by the tunnel cross-member.

According to the invention as defined in claim 7, the vehicle body structure further comprises left and right connecting members connecting front ends of the left and right side sills to front portions of the left and right side-sill-side extensions, and the combination of the left and right connecting members and the left and right side-sill-side extensions forms left and right outriggers.

According to the invention as defined in claim 8, in the vehicle body structure, bottom surfaces of the left and right bifurcating portions are substantially flush with bottom surfaces of the side-sill-side extensions and bottom surfaces of the tunnel-side extensions at a level of a horizontal portion of the lower surface of the dashboard.

According to the invention as defined in claim 9, the vehicle body structure further comprises a sub-frame, part of the sub-frame detachably attached to lower portions of the left and right front side frames, and each of the left and right side frame extensions has a sub-frame attaching portion for detachably attaching the sub-frame.

According to the invention as defined in claim 10, the vehicle body structure, the left and right tunnel frames are curved to pass above an energy container disposed under the floor panel, and the left and right tunnel frames extend along a lower surface of the floor panel.

According to the invention as defined in claim 11, in the vehicle body structure, each of the left and right side frame extensions has an inverted hat-shaped cross-section, and the left and right side-sill-side extensions are formed integrally with the left and right side frame extensions so that the inverted hat-shaped cross-sections thereof seamlessly continue.

According to the invention as defined in claim 12, in the vehicle body structure, the left and right tunnel-side extensions are members separate from the left and right side frame extensions and the left and right side-sill-side extensions, each of the left and right side-sill-side extensions and the left and right tunnel-side extensions is formed in a closed cross-section, and an area of the closed cross-section of each of the left and right side-sill-side extensions is set to be greater than an area of the closed cross-section of each of the left and right tunnel-side extensions.

According to the invention as defined in claim 13, the vehicle body structure further comprises: a front cross-member located behind and in the vicinity of the tunnel cross-member and intersecting the tunnel portion while extending in the vehicle-width direction along an upper surface of the floor panel; a rear cross-member capable of being located behind the front cross-member and in front of a fuel tank disposed in a rear portion of the vehicle body, and extending in the vehicle-width direction; and left and right tunnel frames extending from the rear cross-member to the left and right tunnel-side extensions and located on opposite sides of the tunnel portion in the vehicle-width direction, wherein the left and right tunnel frames are continuous with the left and right tunnel-side extensions, and the left and right tunnel-side extensions, the left and right side-sill-side extensions, and the front cross-member form left and right triangular frame structures, each of which having a substantially triangular shape.

According to the invention as defined in claim 14, the vehicle body structure further comprises a rear cross-member running between the left and right side sills along a lower surface of a rear portion of the tunnel portion, the left and right side sills are comprised of left and right side sill inner portions located on the inner side in the vehicle-width direction and left and right side sill outer portions located on the outer side in the vehicle-width direction, a reinforcing member is provided on a vehicle-width outer surface of each of the left and right side sill inner portions, front ends of the left and right reinforcing members are positioned at rear ends of the left and right side-sill-side extensions, and rear ends of the left and right reinforcing members are positioned at regions of the rear cross-member.

According to the invention as defined in claim 15, the vehicle body structure further comprises a front cross-member running between the left and right side sills along a lower surface of a front portion of the tunnel portion, and the front ends of the left and right reinforcing members are positioned at portions of the front cross-member as well as at the rear ends of the left and right side-sill-side extensions.

According to the invention as defined in claim 16, the strength and rigidity of the tunnel portion are set to be greater than strength and rigidity of the floor panel in the vehicle body structure.

According to the invention as defined in claim 17, the vehicle body structure further comprises a tunnel stiffener provided in the tunnel portion and disposed above the floor panel, and the tunnel stiffener extends in the longitudinal direction along the tunnel portion and forms a closed cross-section.

According to the invention as defined in claim 18, the vehicle body structure further comprises a front cross-member running between the left and right side sills along an upper surface of the floor panel, and the front cross-member is positioned in, or is diagonally adjacent to, a portion of the tunnel cross-member with the floor panel therebetween.

According to the invention as defined in claim 19, the vehicle body structure further comprises: left and right tunnel frames located on opposite sides of the tunnel portion in the vehicle-width direction and extending in the longitudinal direction of the vehicle body; and left and right divided cross-members connecting the left and right tunnel frames to the left and right side sills respectively, wherein the left and right divided cross-members are aligned with the tunnel cross-member linearly in the vehicle-width direction.

According to the invention as defined in claim 20, in the vehicle body structure, the front cross-member coincides with the tunnel cross-member in the longitudinal direction of the vehicle body.

According to the invention as defined in claim 21, the vehicle body structure further comprises a front cross-member running between the left and right side sills along an upper surface of the floor panel, the front cross-member has a first flange to be placed on and bonded to the upper surface of the floor panel, the tunnel cross-member has a second flange to be placed on and bonded to a lower surface of the floor panel, and the first flange and the second flange overlap with each other and are integrated with each other in the vertical direction with the floor panel therebetween.

Advantageous Effects of Invention

In the invention of claim 1, each of the side frame extensions bifurcates into the side-sill-side extension and the tunnel-side extension in the vehicle-width direction at the same angle or substantially the same angle. When the vehicle undergoes a head-on collision, a front impact is therefore transmitted from the front side frames to the side frame extensions and further distributed from the rear ends of the side frame extensions through the side-sill-side extensions and the tunnel-side extensions to the side sills and the tunnel cross-member in a generally uniform, efficient manner. That is, the transmission of the front impact is suppressed so that the tunnel cross-member and the tunnel portion do not receive a major part of the impact. The tunnel cross-member and the tunnel portion are strong enough to receive the impact transmitted in the controlled manner described above. It is therefore not necessary to reinforce the tunnel portion or the floor panel, or the reinforcement can be minimized. On the other hand, the side sills, which form an outer frame of the vehicle body, are high-strength, high-rigidity members. The side sills are therefore strong enough to receive the transmitted impact in the distributed manner described above. It is therefore not necessary to reinforce the side sills.

As described above, in the invention of claim 1, the front impact is distributed to the side sills and the tunnel cross-member in a generally uniform, efficient manner. It is therefore not necessary to reinforce the vehicle body against the impact that is distributed in a generally uniform manner, or the reinforcement can be minimized. The weight of the vehicle body can therefore be reduced.

In the invention of claim 2, the left and right front cross-members positioned behind the left and right tunnel-side extensions and extending in the vehicle-width direction, the left and right side-sill-side extensions, and the left and right tunnel-side extensions form left and right first triangular frame structures. The left and right first triangular frame structures, each of which has a substantially triangular shape in a bottom view, are therefore strong and rigid against a front impact transmitted from the left and right side frame extensions. The strength and rigidity of the left and right first triangular frame structures can therefore be reduced by using a thin member for at least one of the components that form the first triangular frame structures, specifically, the front cross-members, the side-sill-side extensions, and the tunnel-side extensions. The weight of the vehicle body can thus be reduced.

In the invention of claim 3, left and right connecting members that connect front ends of the left and right side sills to the left and right bifurcating portions, the left and right side sills, and the left and right side-sill-side extensions form left and right second triangular frame structures each having a substantially triangular shape. When an impact acts on a side surface of the vehicle in the widthwise direction or when what is called a lateral collision occurs, the left and right second triangular frame structures, each of which has a substantially triangular shape in a bottom view, therefore exhibits strength against the impact transmitted from the side surface of the vehicle body (hereinafter referred to as lateral impact). At least one of the components that form the side-sill-side triangular frame structures, specifically, the connecting members, the side sills, and the side-sill-side extensions, can therefore be a thin member. The weight of the vehicle body can thus be reduced. Further, since the second triangular frame structures are adjacent to the first triangular frame structures, torsional rigidity of the floor panel increases.

Further, since a front impact can be uniformly and efficiently distributed to the side sills and the tunnel cross-member, the side-sill-side extensions and the tunnel-side extensions can be greatly inclined obliquely rearward with respect to the front side frames. The angle on the "outer side" in the vehicle-width direction between each of the side frame extensions and the corresponding one of the side-sill-side extensions is preferably set to be an obtuse angle of, for example, "150°±10°." Similarly, the angle on the "inner side" in the vehicle-width direction between each of the side frame extensions and the corresponding one of the tunnel-side extensions is preferably set to be an obtuse angle of, for example, "150°±10°." Employing the configuration described above still ensures the left and right second triangular frame structures will be strong enough against a lateral impact transmitted through the vehicle body in the lateral direction because the connecting members are present.

In the invention of claim 4, the area or the width of the closed cross-section of each of the left and right side frame extensions is maximized at the corresponding bifurcating portion. The left and right side frame extensions, the side-sill-side extensions, and the tunnel-side extensions therefore have large bending rigidity. A front impact can be efficiently distributed from the bifurcating portions through the side-sill-side extensions and the tunnel-side extensions to the side sills and the tunnel cross-member.

In the invention of claim 5, the rear ends of the left and right tunnel-side extensions are bonded to the tunnel cross-member and the left and right tunnel frames. It is therefore possible to transmit a larger front impact from the left and right tunnel-side extensions to the tunnel portion and portions therearound, and the amount of impact to be transmitted to the left and right side sills may be reduced accordingly. The rigidity of the left and right side sills and hence the weight thereof can therefore be reduced by reducing the front impact distributed from the left and right side frame extensions to the left and right side sills. The front impact can thus be more uniformly distributed to the side sills and the tunnel cross-member.

In the invention of claim 6, front portions of the left and right tunnel frames are connected to each other by the tunnel cross-member which extends in in the vehicle-width direction. The combination of the tunnel portion, the left and right tunnel frames, and the tunnel cross-member therefore has high rigidity. Further, the front portions of the left and right tunnel frames extend while being curved in opposite directions. A larger front impact can therefore be transmitted from the left and right tunnel-side extensions to the tunnel portion and portions therearound.

In the invention of claim 7, the left and right connecting members and the left and right side-sill-side extensions serve as left and right outriggers. The left and right connecting members connect the front ends of the left and right side sills to the left and right bifurcating portions. A lateral impact to the vehicle is therefore efficiently transmitted from one of the left and right side sills through the corresponding one of the left and right connecting members to the corresponding one of the left and right side frame extensions. On the other hand, the left and right side-sill-side extensions are inclined and extend outward in the vehicle-width direction and rearward from the left and right bifurcating portions and are bonded to the left and right side sills. A front impact is therefore efficiently transmitted from the left and right side frame extensions through the left and right side-sill-side extensions to the left and right side sills. As described above, a lateral impact or a front impact can be efficiently transmitted to the center of each of the side-sill-side extensions and the center of each of the connecting members. It is therefore not necessary or hardly necessary to reinforce the vehicle body, whereby the weight of the vehicle body can be reduced.

In the invention of claim 8, the bottom surfaces of the bifurcating portions are substantially flush with the bottom surfaces of the side-sill-side extensions and the bottom surfaces of the tunnel-side extensions. A front impact can therefore be efficiently distributed from the side frame extensions to the side-sill-side extensions and the tunnel-side extensions.

In the invention of claim 9, the left and right side frame extensions have sub-frame attaching portions for detachably attaching the sub-frame. The sub-frame typically supports a power system, a suspension system, and a steering system. The left and right side frame extensions receive not only a front impact transmitted from the left and right front side frames but also a load transmitted from the sub-frame. Both the front impact and the load transmitted from the sub-frame can be efficiently distributed from the left and right side frame extensions to the left and right side-sill-side extensions and the left and right tunnel-side extensions.

In the invention of claim 10, the left and right tunnel frames are curved so that they can pass over an energy container disposed under the floor panel and are positioned so as to extend along the lower surface of the floor panel. The left and right tunnel frames therefore do not interfere with the energy container disposed under the floor panel. A space where the energy container is disposed can thus be provided under the floor panel. For example, a wide energy container can be disposed in a space surrounded by the left and right side sills and the floor panel. A wide energy container can ensure predetermined capacity even when the energy container is thin.

In the invention of claim 11, the left and right side-sill-side extensions are formed integrally with the left and right side frame extensions. Further, the inverted hat-shaped cross-section of each of the left and right side frame extensions seamlessly continues with the inverted hat-shaped cross-section of the corresponding one of the left and right side-sill-side extensions. A front impact transmitted from the left and right front side frames to the left and right side frame extensions therefore tends to be distributed to the left and right side-sill-side extensions. The distributed impact is then directly transmitted to the highly rigid left and right side sills. The amount of front impact distributed to the left and right side-sill-side extensions increases, whereas the amount of impact distributed to the left and right tunnel-side extensions decreases accordingly. The strength and rigidity of the left and right tunnel-side extensions can therefore be reduced. As a result, the weight of the vehicle body can be reduced.

In the invention of claim 12, the closed cross-sectional area of each of the left and right side-sill-side extensions is greater than the closed cross-sectional area of each of the left and right tunnel-side extensions. The left and right side-sill-side extensions are therefore stronger and more rigid than the left and right tunnel-side extensions. An impact can therefore be distributed to the left and right side-sill-side extensions and transmitted to the left and right side sills more efficiently.

Further, in the invention of claim 12, the left and right tunnel-side extensions are members separate from the left and right side frame extensions, which extend along the lower surface of the dashboard. The separate configuration allows, even when, for example, a portion of the dashboard that is in the vehicle-width center has a complicated shape, the left and right side frame extensions, the left and right side-sill-side extensions, and the left and right tunnel-side extensions to be readily manufactured in accordance with the complicated shape.

In the invention of claim 13, the front cross-member located behind and in the vicinity of the tunnel cross-member, the left and right tunnel-side extensions, and the left and right side-sill-side extensions form left and right triangular frame structures each having a substantially triangular shape. The left and right triangular frame structures, each of which has a substantially triangular shape in a bottom view, are strong and rigid against a front impact transmitted from the left and right side frame extensions, whereby the tunnel cross-member is reinforced and can withstand a large load.

Further, in the invention of claim 13, the rear cross-member is located in front of a fuel tank disposed in a rear portion of the vehicle body but behind the front cross-member. This configuration can prevent an impact from the front side of the vehicle body from locally acting on the fuel tank located behind the rear cross-member.

In the invention of claim 14, the left and right reinforcing members are provided on the vehicle-width outer surfaces of the left and right side sill inner portions. The positions of the front ends of the left and right reinforcing members coincide with the positions of the rear ends of the left and right side-sill-side extensions. The positions of the rear ends of the left and right reinforcing members coincide with the positions of portions of the rear cross-member. A lateral impact acting on the vehicle can therefore be efficiently distributed to the corresponding side-sill-side extension and rear cross-member.

In the invention of claim 15, the positions of the front ends of the left and right reinforcing members coincide with the positions of portions of the front cross-member as well as the positions of the rear ends of the left and right side-sill-side extensions. A lateral impact acting on the vehicle can therefore be efficiently distributed to the corresponding side-sill-side extension, the front cross-member, and the rear cross-member.

In the invention of claim 16, the strength and rigidity of the tunnel portion are greater than the strength and rigidity of the floor panel. For example, the plate thickness of the tunnel portion is set to be greater than the plate thickness of the floor panel, or the material of the tunnel portion is selected to be stronger and more rigid than the material of the floor panel, whereby the weight of the vehicle body can be reduced.

In the invention of claim 17, the tunnel portion is reinforced by the tunnel stiffener extending in the longitudinal direction along the tunnel portion and forming a closed cross-section. The strength and rigidity of the tunnel portion are therefore increased. The tunnel portion is strong and rigid enough to receive a large front impact. Further, the tunnel stiffener, which is provided above the floor panel, does not protrude downward beyond the floor panel. For example, when the energy container is disposed under the floor panel, the tunnel stiffener therefore does not interfere with the energy container. The capacity of the energy container can be large enough.

In the invention of claim 18, the front cross-member runs between the left and right side sills along the upper surface of the floor panel and is positioned in, or adjacent to, a region of a portion of the tunnel cross-member with the floor panel therebetween. A lateral impact can therefore be efficiently distributed from one of the side sills through the front cross-member to the other side sill, the tunnel cross-member, and the tunnel portion.

In the invention of claim 19, the left and right divided cross-members are aligned with the tunnel cross-member linearly in the vehicle-width direction and connect the left and right tunnel frames to the left and right side sills. That is, the tunnel cross-members and the left and right divided cross-members are aligned with each other linearly in the vehicle-width direction along the lower surface of the tunnel portion and connect the left and right side sills to each other. Further, the front cross-member is positioned in, or adjacent to, a region of the tunnel cross-member with the floor panel therebetween, as described above. The lower-side continuous cross-member, which is the combination of the tunnel cross-members and the left and right divided cross-members, and the front cross-member are positioned vertically on opposite sides of the floor panel. An impact transmitted from a side of the vehicle body to the corresponding one of the side sills is transmitted through both the lower-side continuous cross-member and the front cross-member to the other side sill and the tunnel portion. The lateral impact can be efficiently distributed to the other side sill and the tunnel portion through both the lower-side continuous cross-member and the front cross-member.

In the invention of claim 20, the front cross-member coincides with the tunnel cross-member in the longitudinal direction of the vehicle body. Further, the front cross-member and the tunnel cross-member are positioned vertically on opposite sides with the floor panel therebetween as described above. A lateral impact can therefore be efficiently distributed from one of the side sills through the front cross-member to the other side sill, the tunnel cross-member, and the tunnel portion. Moreover, since the front cross-member and the tunnel cross-member face each other in the vertical direction with the floor panel therebetween, the strength and rigidity of the floor panel can be increased.

DESCRIPTION OF EMBODIMENTS

Certain embodiments of the present invention will be described below with reference to the accompanying drawings.

First Embodiment

Figure 1:
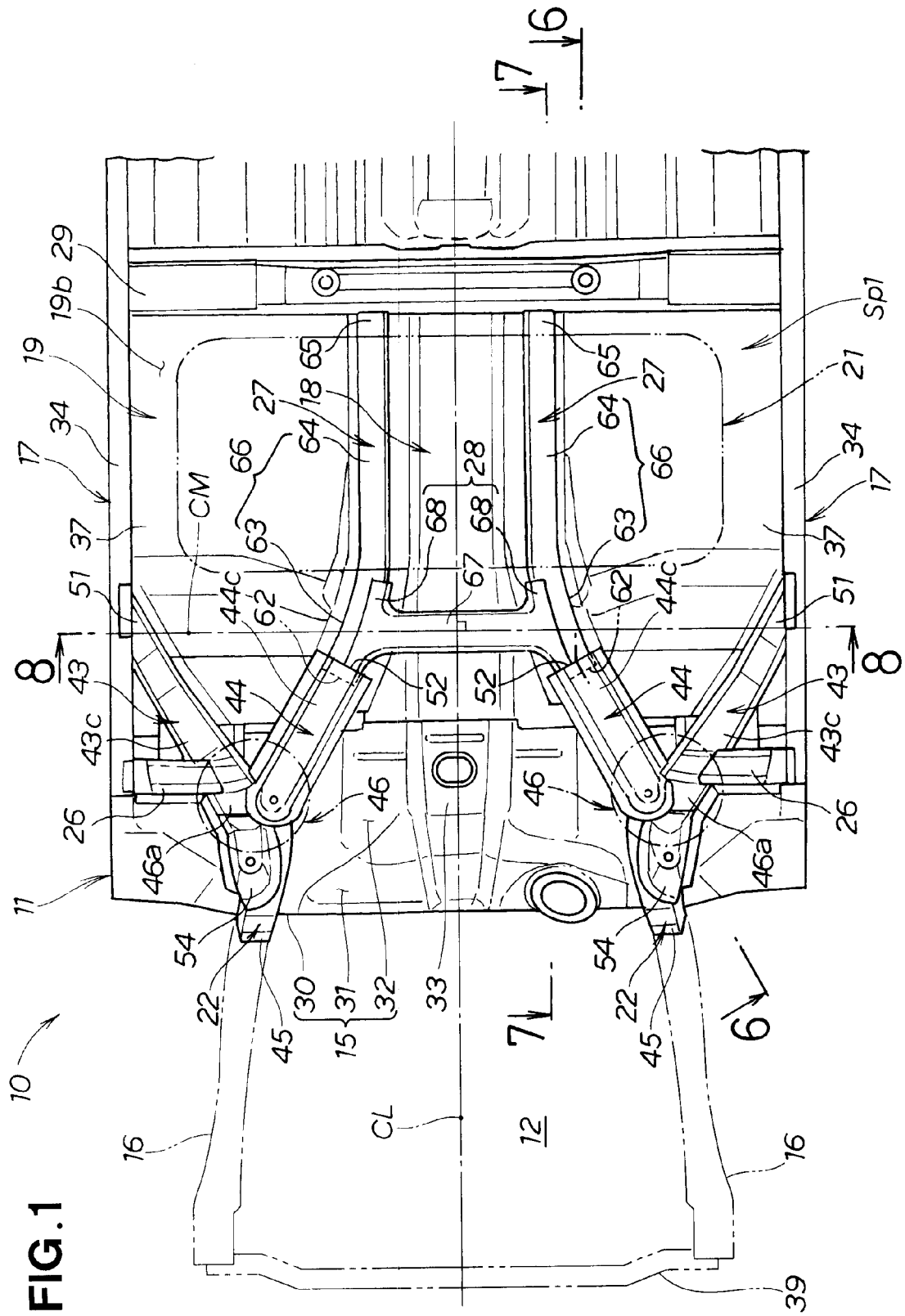
FIG. 1 is a bottom view of a front portion of a vehicle body according to a first embodiment of the present invention.
Figure 2:
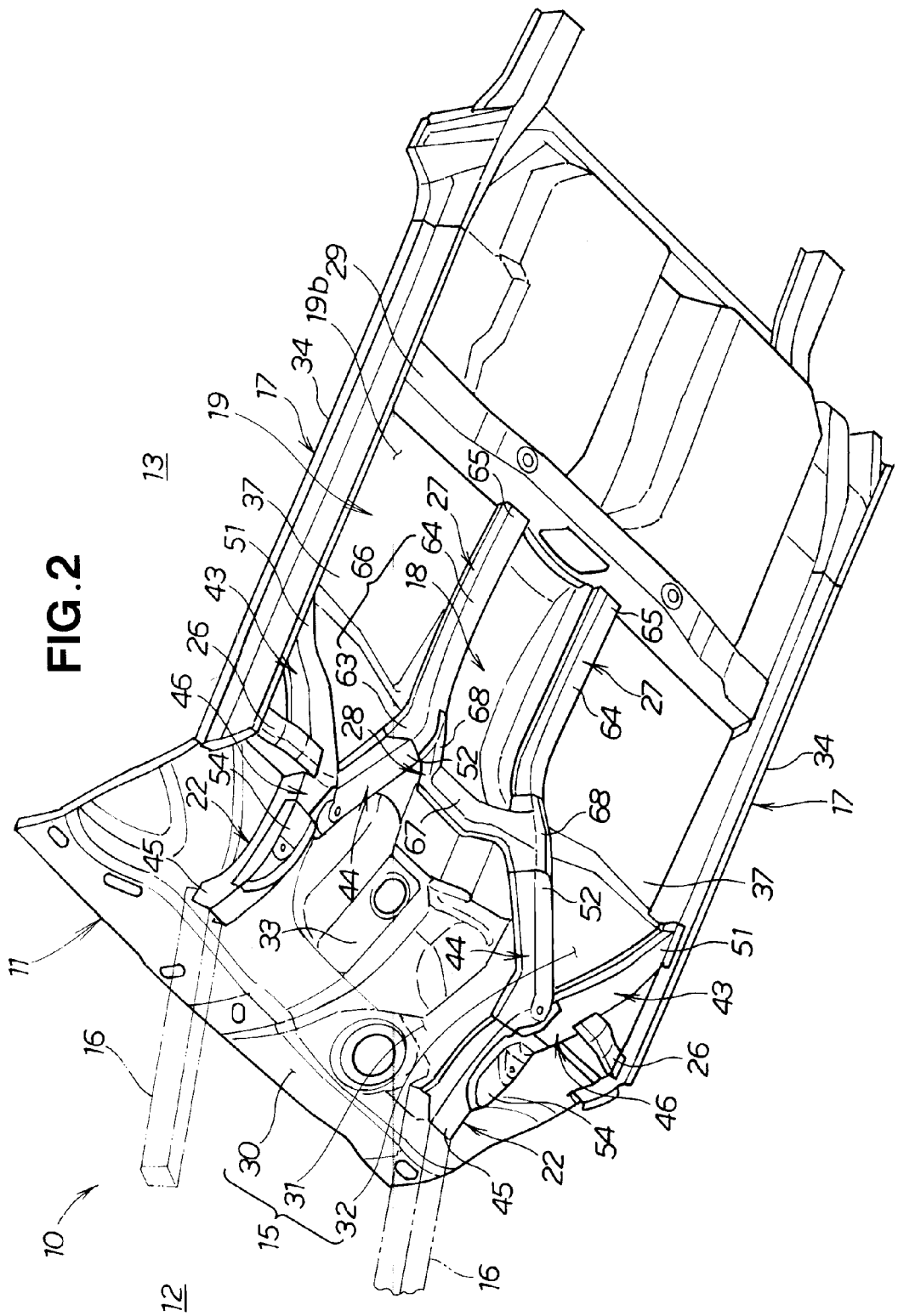
FIG. 2 is a perspective view of the front portion of the vehicle body according to the first embodiment of the invention, as viewed downward and to the front.

A vehicle body structure according to a first embodiment is described with reference to FIGS. 1 to 11. A vehicle 10 in the first embodiment is a passenger vehicle, and a vehicle body 11 accommodates an engine compartment 12 formed in a front portion and a passenger compartment 13 located immediately behind the engine compartment 12, as shown in FIGS. 1 and 2. The vehicle 10 has a fuel tank 21 incorporated in a front-half portion of the vehicle body 11.

The vehicle body 11 is formed of a unitary body and bilaterally symmetric with respect to a vehicle-width direction center line CL passing through the widthwise center of the vehicle 10 and extending in the vehicle's longitudinal direction. The front-half portion of the vehicle body 11 accommodates a dashboard 15, left and right front side frames 16, 16, left and right side sills 17, 17, a tunnel portion 18, a floor panel 19, left and right side frame extensions 22, 22, left and right connecting members 26, 26, left and right tunnel frames 27, 27, and a rear cross-member 29.

Figure 6:
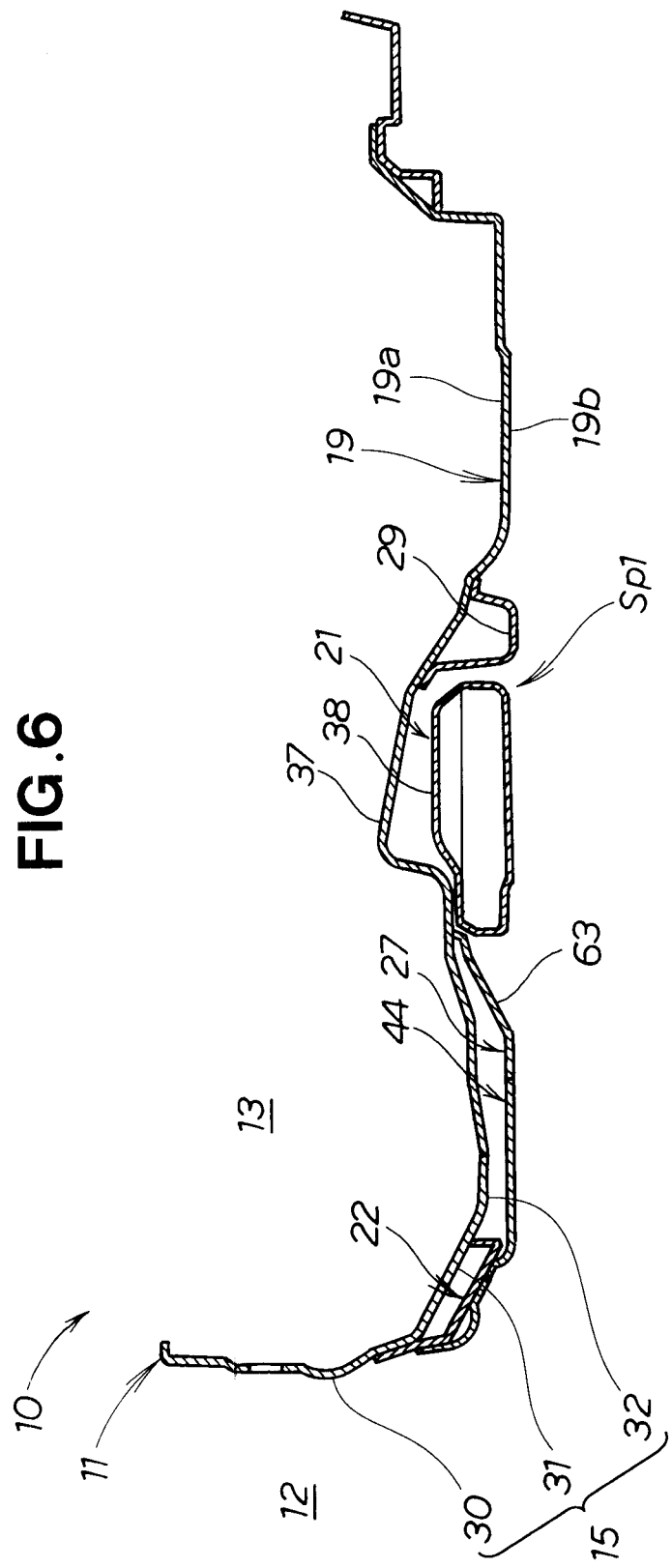
FIG. 6 is a cross-sectional view taken along line 6-6 of FIG. 1.

The dashboard 15 is a partition that is positioned behind the left and right front side frames 16, 16; partitions the vehicle body 11 into front and rear portions, that is, divides the vehicle body 11 into the front engine compartment 12 and the rear passenger compartment 13, and has a rough L shape in a side view, as shown in FIGS. 2 and 6. Specifically, the dashboard 15 is obtained by integrating a vertical plate 30 that divides the vehicle body 11 into the engine compartment 12 and the passenger compartment 13, an inclined plate 31 extending rearward and downward from the lower end of the vertical plate 30, and a horizontal plate 32 extending rearward from the rear end of the inclined plate 31.

The left and right front side frames 16, 16 are positioned on the left and right sides of the front portion of the vehicle body 11 (portion in front of dashboard 15) and extend in the longitudinal direction of the vehicle body 11, as shown in FIGS. 1 and 2. A bumper beam 39 runs between the front ends of the left and right front side frames 16, 16.

Figure 3:
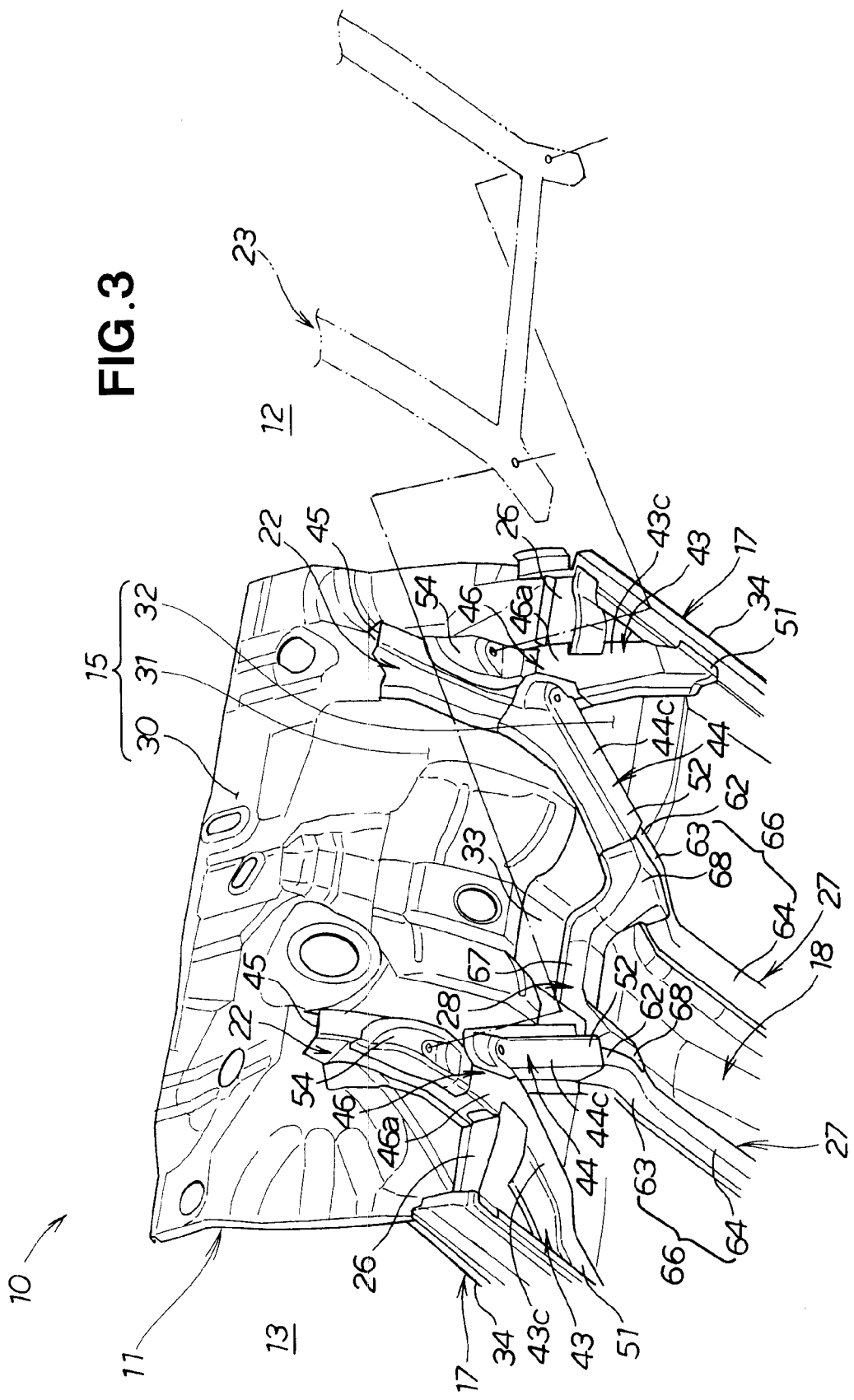
FIG. 3 is a perspective view showing a relationship between the front portion of the vehicle body of FIG. 2 and a sub-frame.
Figure 4:
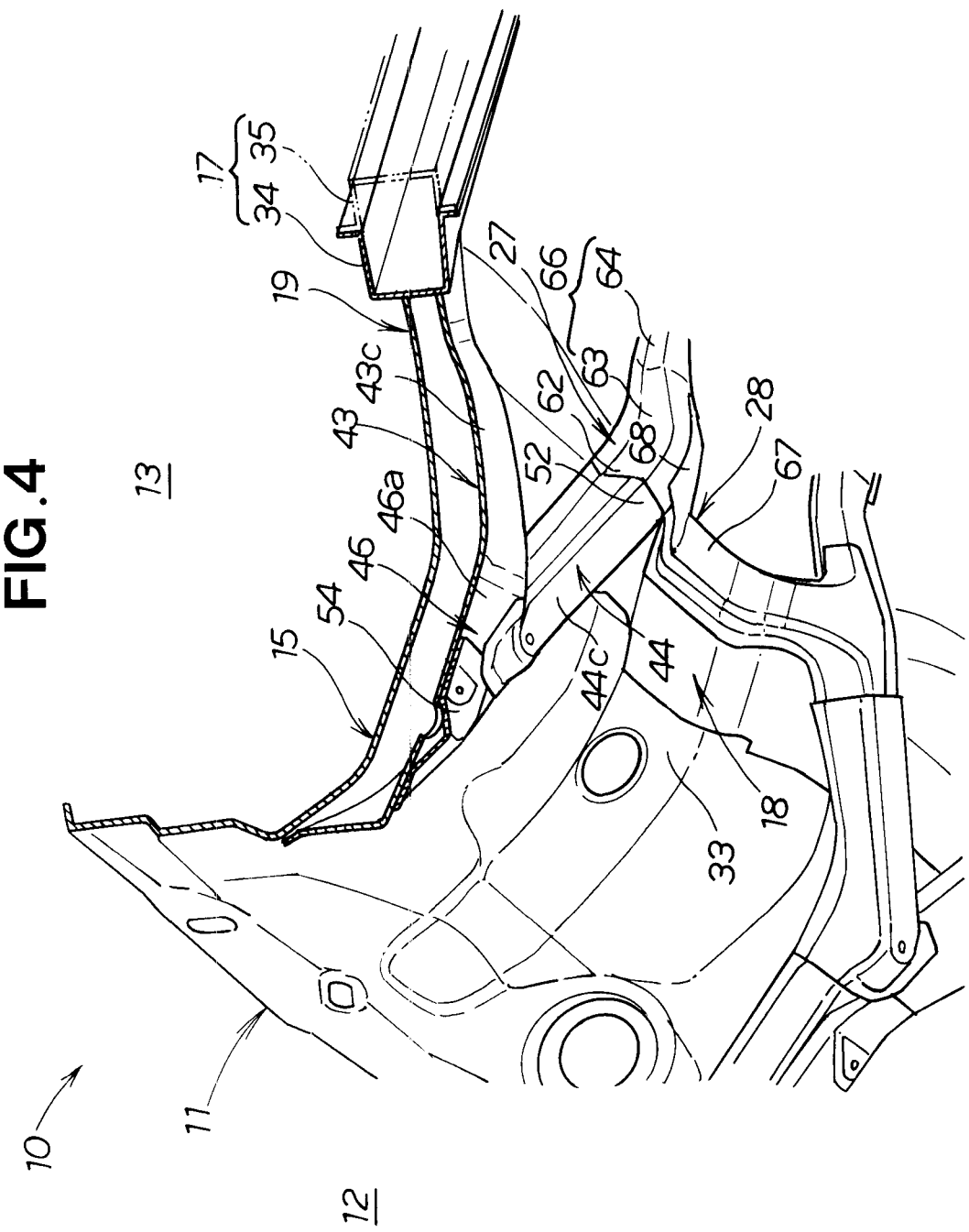
FIG. 4 is a cutaway perspective view of part of a side-sill-side extension of FIG. 2.
Figure 8:
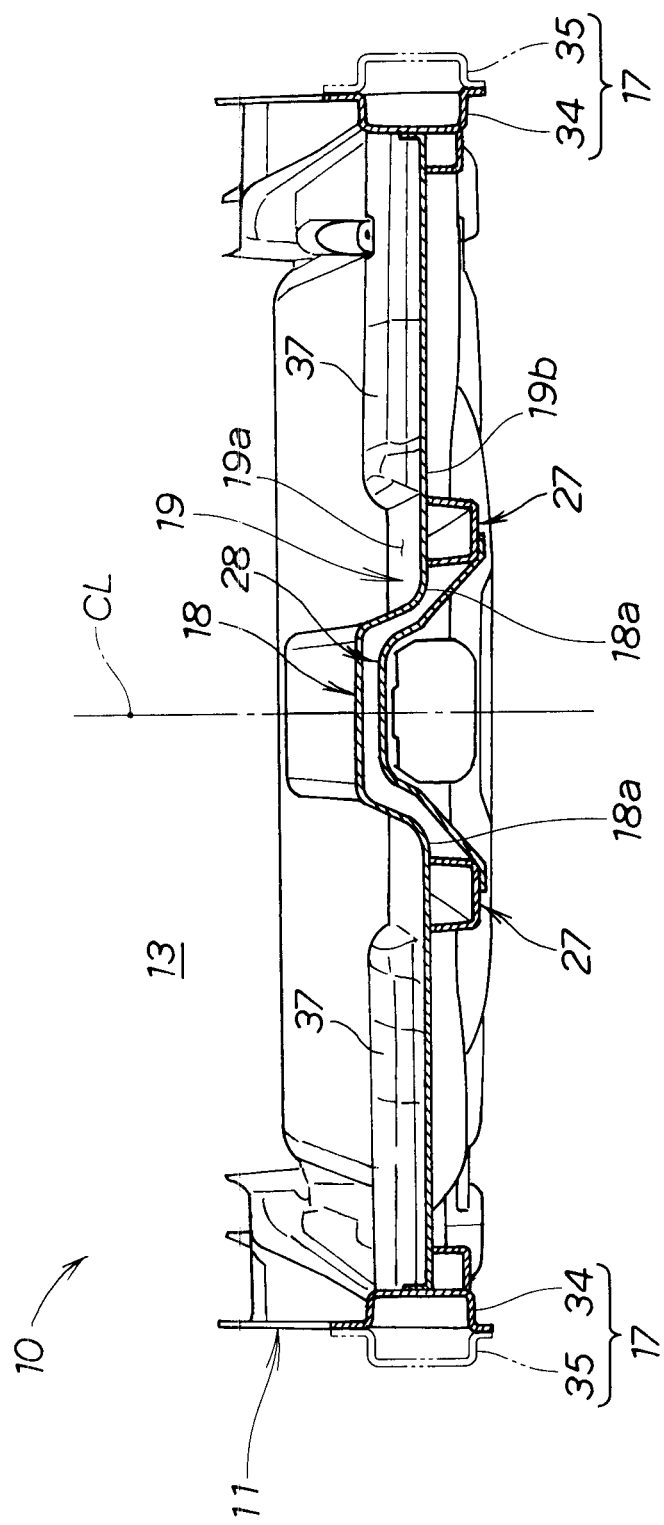
FIG. 8 is a cross-sectional view taken along line 8-8 of FIG. 1.

The left and right side sills 17, 17 are positioned behind the dashboard 15 and outside the left and right front side frames 16, 16 in the vehicle-width direction and extend in the longitudinal direction of the vehicle body 11, as shown in FIGS. 1 to 4 and 8. That is, the left and right side sills 17, 17 are positioned on the left and right sides of a central portion of the vehicle body 11. The left and right side sills 17, 17 are formed of side sill inner portions 34, 34 located on the inner side in the vehicle-width direction (toward the passenger compartment 13) and side sill outer portions 35, 35 located on the outer side in the vehicle-width direction, as shown in FIGS. 4 and 8.

Each of the left and right side sill inner portions 34, 34 has a substantially hat-shaped cross-section open outward in the vehicle-width direction. On the other hand, each of the side sill outer portions 35, 35 has a substantially hat-shaped cross-section open inward in the vehicle-width direction. Each of the left and right side sills 17, 17 is formed by aligning the open end of the side sill inner portion 34 with the open end of the side sill outer portion 35 in the vehicle-width direction and bonding the open ends to each other. In the following description, the bonding includes spot welding and other types of welding.

The floor panel 19 is a flat-plate-shaped member running between the left and right side sills 17, 17 and extends rearward from a lower portion of the dashboard 15, as shown in FIGS. 1, 2, 7, and 8. That is, the front end of the floor panel 19 is bonded to the inclined plate 31 and the horizontal plate 32 of the dashboard 15.

The floor panel 19 has left and right protrusions 37, 37 (raised portions 37, 37) protruding into the passenger compartment 13, as shown in FIGS. 1, 6, and 8. The left and right protrusions 37, 37 are positioned in a portion where seat rails 36 (see FIG. 7) for slidably supporting front seats 41 (see FIG. 7), such as a driver's seat and a front passenger seat, are attached, and are wide in the vehicle-width direction. Further, the upper surface of each of the left and right protrusions 37, 37 is inclined downward toward the rear of the vehicle body 11 to provide a space where the legs of a vehicle occupant who is seated on a rear seat (not shown) rest.

The tunnel portion 18 (floor tunnel 18) is a portion protruding from the floor panel 19 into the passenger compartment 13, has a substantially inverted U-shaped cross-section, is positioned at the vehicle-width center of the vehicle body 11 (on the vehicle-width direction center line CL), and extends in the longitudinal direction of the vehicle body 11, as shown in FIGS. 1, 2, and 8. Specifically, the dashboard 15 has a concave portion 33 at the vehicle-width center of the inclined plate 31 and the horizontal plate 32. The concave portion 33 is recessed from a lower portion of the dashboard 15, that is, the inclined surface 31 and the horizontal surface 32, into the passenger compartment 13. A front end portion of the tunnel portion 18 is fit into and bonded to the concave portion 33. As a result, the front end portion of the tunnel portion 18 is bonded to the inclined plate 31 and the horizontal plate 32 of the dashboard 15. The concave portion 33 serves as a front portion of the tunnel portion 18. As described above, the tunnel portion 18 extends from the lower end of the vehicle-width direction center portion of the dashboard 15 to a rear portion of the floor panel 19 and protrudes upward from the floor panel 19.

The left and right side frame extensions 22, 22 are members extending rearward and downward from the rear ends of the left and right front side frames 16, 16 along the lower surface of the dashboard 15, that is, the inclined surface 31 and the horizontal surface 32 of the dashboard 15, toward the floor panel 19, as shown in FIGS. 1 and 3. For example, front connectors 45, 45 at the front ends of the left and right side frame extensions 22, 22 are bonded to the rear ends of the left and right front side frames 16, 16.

Sub-frame attaching portions 54, 54 (sub-frame attaching points) are provided at front portions of the left and right side frame extensions 22, 22, as shown in FIGS. 1 to 5. The left and right sub-frame attaching portions 54, 54 are portions to which part of a rear end portion of a sub-frame 23 indicated by the phantom line in FIG. 3 is detachably attached. The sub-frame 23, which is detachably attached to the lower side of the left and right front side frames 16, 16 and the lower side of the left and right sub-frame attaching portions 54, 54, is a member for supporting a power system including an engine; a suspension system; and a steering system.

The rear cross-member 29 (also referred to as rear floor cross-member 29) runs between the longitudinal center of the left side sill 17 and the longitudinal center of the right side sill 17, as shown in FIGS. 1, 2, 6, and 7. The floor panel 19 is placed on and bonded to the upper surface of the rear cross-member 29 so that the floor panel 19 is supported by the rear cross-member 29. The rear end of the tunnel portion 18 and the rear ends of the left and right tunnel frames 27, 27 are bonded to the rear cross-member 29.

Figure 7:
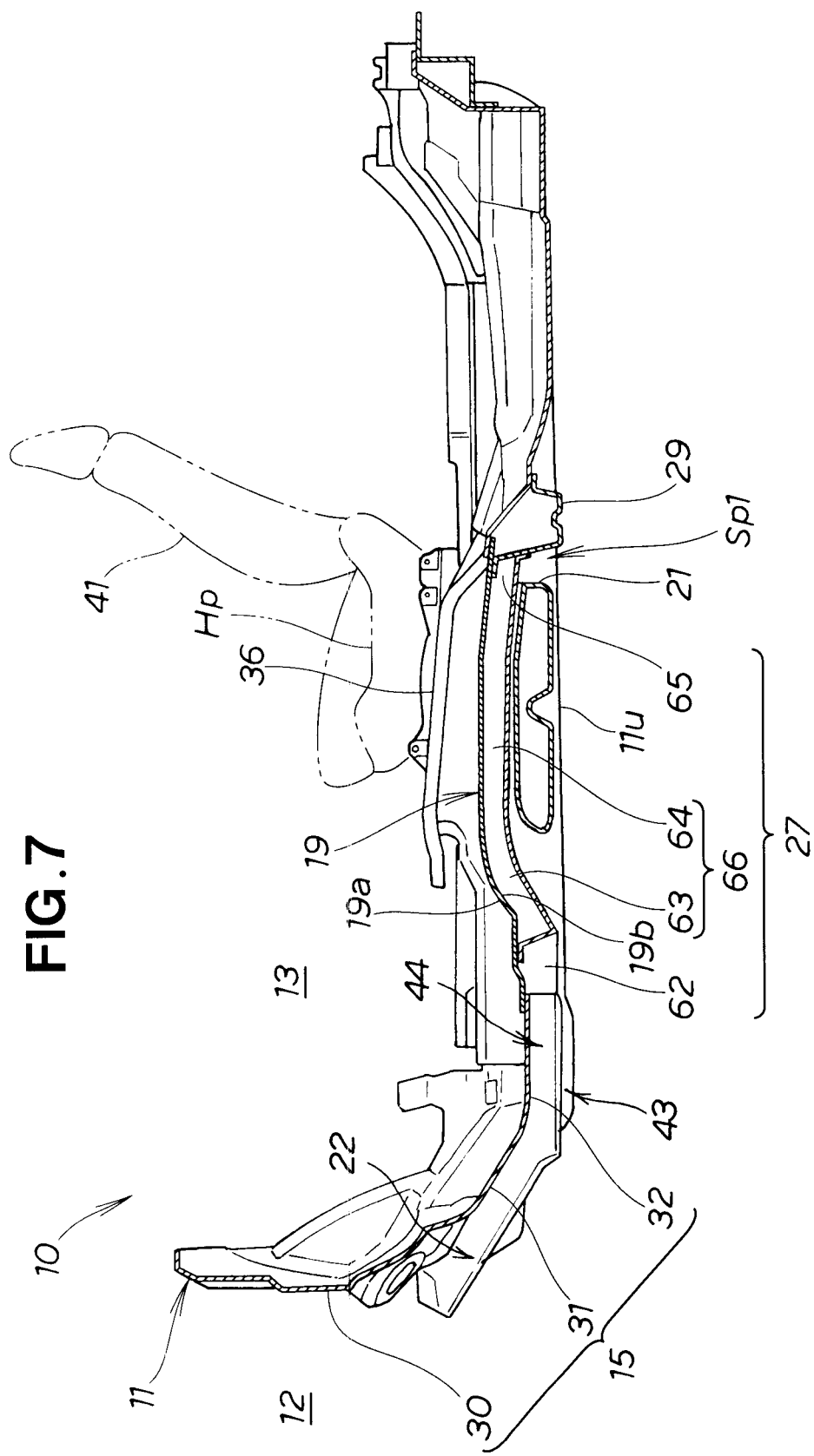
FIG. 7 is a cross-sectional view taken along line 7-7 of FIG. 1.

The fuel tank 21 is disposed in a space Sp1 surrounded by the floor panel 19, the left and right side sills 17, 17, and the rear cross-member 29 and attached to the vehicle body 11, as shown in FIGS. 1, 6, and 7. The fuel tank 21 has a low-profile shape that can be disposed in the narrow space Sp1 between the lowest surface 11*u* of the vehicle body 11 (see FIG. 7) and a lower surface 19*b* of the floor panel 19. The fuel tank 21 also has an elongated shape extending in the vehicle-width direction from a point in the vicinity of the left side sill 17 to a point in the vicinity of the right side sill 17. The fuel tank 21 is a kind of energy container and is positioned under the tunnel portion 18 and the left and right tunnel frames 27, 27 and under the front seat 41, that is, at the longitudinal center of the vehicle body 11. The fuel tank 21 can therefore be called a "central tank."

The upper surface of the fuel tank 21 has raised portions 38 raised toward the backside of the left and right protrusions 37, 37 of the floor panel 19, as shown in FIGS. 6 and 8. The raised portions 38 can be filled with a fuel. The raised portions 38 therefore add an extra tank capacity to the fuel tank 21.

The left and right tunnel frames 27, 27 are elongated members positioned on opposite sides of the tunnel portion 18 in the vehicle-width direction and extending in the longitudinal direction of the vehicle body 11, and are bonded to the lower surface 19*b* of the floor panel 19, as shown in FIGS. 1, 2, 7, and 8. Front portions of the left and right tunnel frames 27, 27 are curved and extend outward in the vehicle-width direction.

Specifically, each of the left and right tunnel frames 27, 27 is formed of a front-end connector 62, a front curved portion 63, a rear curved portion 64, and a rear-end connector 65. The rear-end connector 65 is bonded to the rear cross-member 29. The rear curved portion 64 linearly extends from the rear-end connector 65 toward the front of the vehicle body and is curved upward so that it passes through the gap above the fuel tank 21. The front curved portion 63 extends from the front end of the rear curved portion 64 toward the front of the vehicle body while being curved upward and outward in the vehicle-width direction. The front-end connector 62 is attached to the front end of the front curved portion 63. The front curved portion 63 and the rear curved portion 64 form a curved portion 66.

Front portions of the left and right tunnel frames 27, 27, that is, the left and right front curved portions 63, 63, extend while being curved in opposite directions (outward in vehicle-width direction). The left and right front curved portions 63, 63 are connected to each other by a tunnel cross-member 28.

The tunnel cross-member 28 is raised along a lower surface 18*a* of the tunnel portion 18 and bonded to the left and right tunnel frames 27, 27, as shown in FIGS. 1 and 8. When the vehicle 10 undergoes a head-on collision, a front impact can therefore be distributed from the tunnel cross-member 28 to the entire tunnel portion 18.

Specifically, the tunnel cross-member 28 is an reinforcing member having a rough H shape in a bottom view and formed of a body 67 elongated in the vehicle-width direction and left and right connectors 68, 68 extending from the left and right ends of the body 67 in the longitudinal direction of the vehicle body, as shown in FIGS. 1 to 5. The body 67 has an upwardly convex shape along the lower surface 18*a* of the tunnel portion 18 having an inverted U shaped cross-section and is bonded to the tunnel portion 18 or positioned in the vicinity thereof with a small gap therebetween. The left and right connectors 68, 68 have shapes that follow the left and right front curved portions 63, 63, are substantially the same length as that of the left and right front curved portions 63, 63, and are bonded to the left and right front-end connectors 62, 62 and the left and right front curved portions 63, 63.

Further, the tunnel cross-member 28 has a substantially hat-shaped cross-section open toward the lower surface 19*b* of the floor panel 19. Flanges provided at the upper open end of the tunnel cross-member 28 are placed on and bonded to the lower surface 19*b* of the floor panel 19 and the lower surface 18*a* of the tunnel portion 18.

Each of the left and right side frame extensions 22, 22 described above bifurcates at the rear end thereof in the vehicle-width direction, as shown in FIGS. 1 to 5. The bifurcating configuration of the left side frame extension 22 is described below. The bifurcating configuration of the right side frame extension 22 is not described because it is the same as the bifurcating configuration of the left side frame extension 22 in a bilaterally symmetric manner.

The rear end of the left side frame extension 22 bifurcates below the dashboard 15 into a side-sill-side extension 43, which extends outward in the vehicle-width direction, and a tunnel-side extension 44, which extends inward in the vehicle-width direction. The left side frame extension 22, the left side-sill-side extension 43, and the left tunnel-side extension 44 collectively form a rough Y shape in a bottom view.

Figure 9:
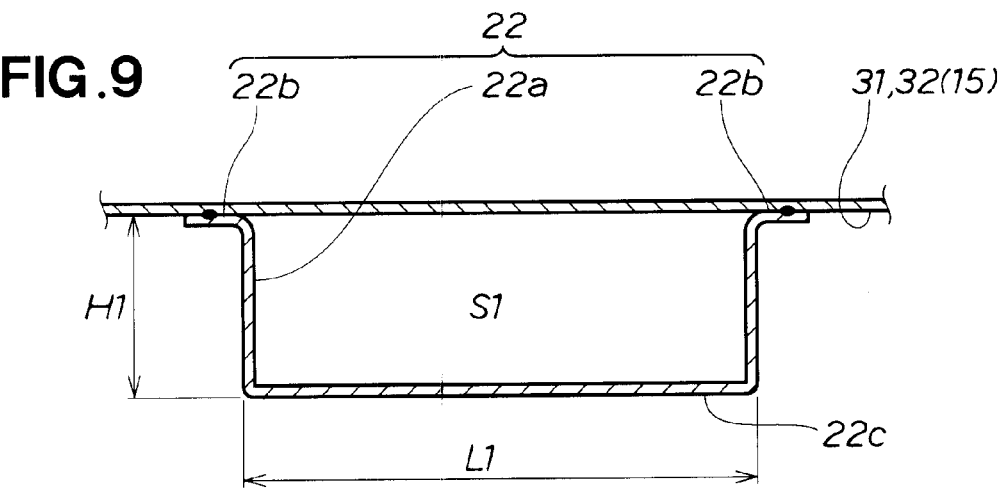
FIG. 9 is a cross-sectional view of the side frame extension of FIG. 1.

Each of the side frame extensions 22 has a hat-shaped cross-section which opens upward, and the open end is placed on and bonded to the inclined surface 31 and the horizontal surface 32 of the dashboard 15 from below, as shown in FIG. 9. That is, the side frame extension 22 is formed of a body 22a having a substantially U-shaped cross-section, and substantially horizontal flanges 22b, 22b extending from opposite edges of the open end of the body 22a in the widthwise direction. A bottom surface 22c of the body 22a is flat. The side frame extension 22, the upper end of which is bonded to the lower surface of the dashboard 15 (inclined surface 31 and horizontal surface 32), forms a rectangular closed cross-section having a height H1 and a width L1. The side frame extension 22 has a cross-sectional area S1 (S1=H1×L1).

Figure 10:
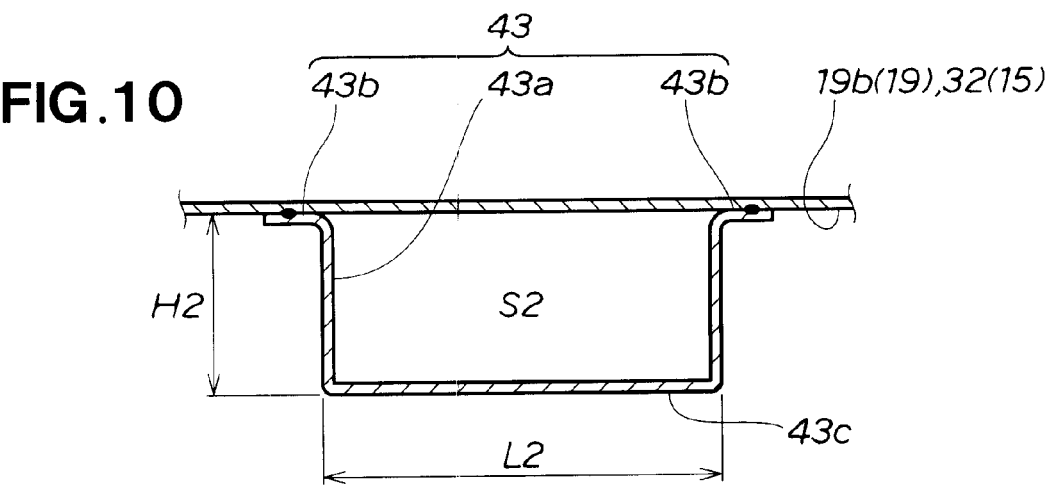
FIG. 10 is a cross-sectional view of the side-sill-side extension of FIG. 1.
Figure 11:
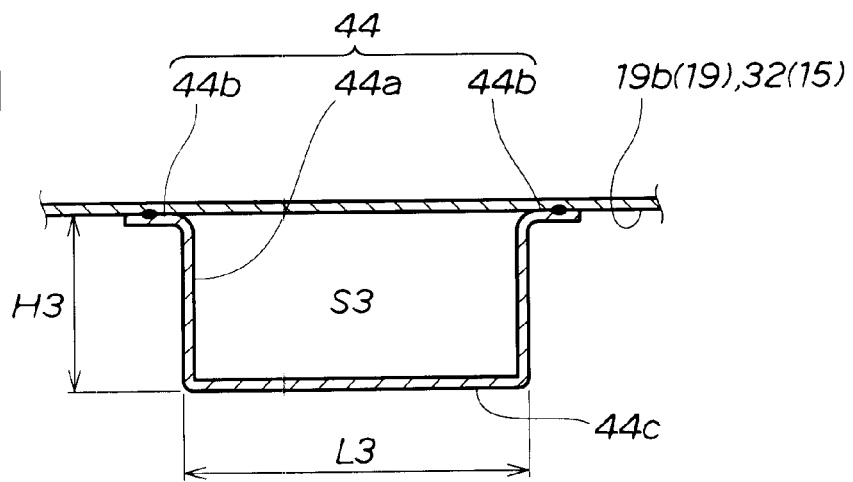
FIG. 11 is a cross-sectional view of the tunnel-side extension of FIG. 1.

Each of the side-sill-side extensions 43 and the tunnel-side extension 44 has a hat-shaped cross-section which opens upward, and the open end is placed on and bonded to the lower surface of the dashboard 15 (inclined surface 31 and horizontal surface 32) and the lower surface 19b of the floor panel 19, as shown in FIGS. 10 and 11.

That is, each of the side-sill-side extension 43 is formed of a body 43a having a substantially U-shape cross-section and substantially horizontal flanges 43b, 43b extending from opposite edges of the open end of the body 43a in the widthwise direction. A bottom surface 43c of the body 43a is flat. The upper end of the side-sill-side extension 43 is bonded to the horizontal surface 32 of the dashboard 15 and the lower surface 19b of the floor panel 19, thereby forming a rectangular closed cross-section having a height H2 and a width L2. The side-sill-side extension 43 has a cross-sectional area S2 (S2=H2×L2).

The tunnel-side extension 44 is formed of a body 44a having a substantially U-shaped cross-section and substantially horizontal flanges 44b, 44b extending from opposite edges of the open end of the body 44a in the widthwise direction. A bottom surface 44c of the body 44a is flat. The tunnel-side extension 44, the upper end of which is bonded to the horizontal surface 32 of the dashboard 15 and the lower surface 19b of the floor panel 19, forms a rectangular closed cross-section having a height H3 and a width L3. The tunnel-side extension 44 has a cross-sectional area S3 (S3=H3×L3).

The heights H1, H2, and H3 are set to be the same or substantially the same. The width L2 of the side-sill-side extension 43 is set to be greater than the width L3 of the tunnel-side extension 44 (L2>L3). As a result, since the cross-sectional area S2 of the side-sill-side extension 43 is set to be greater than the cross-sectional area S3 of the tunnel-side extension 44 (S2>S3), the side-sill-side extension 43 is more rigid than the tunnel-side extension 44. An impact can therefore be distributed to the left and right side-sill-side extensions 43, 43 and transmitted to the left and right side sills 17, 17 more efficiently. Front impact acting on the tunnel portion 18, which is located between the tunnel-side extensions 44, 44, can therefore be reduced. As a result, the tunnel portion 18 and any member that reinforces the tunnel portion 18 can be reduced in weight.

Figure 5:
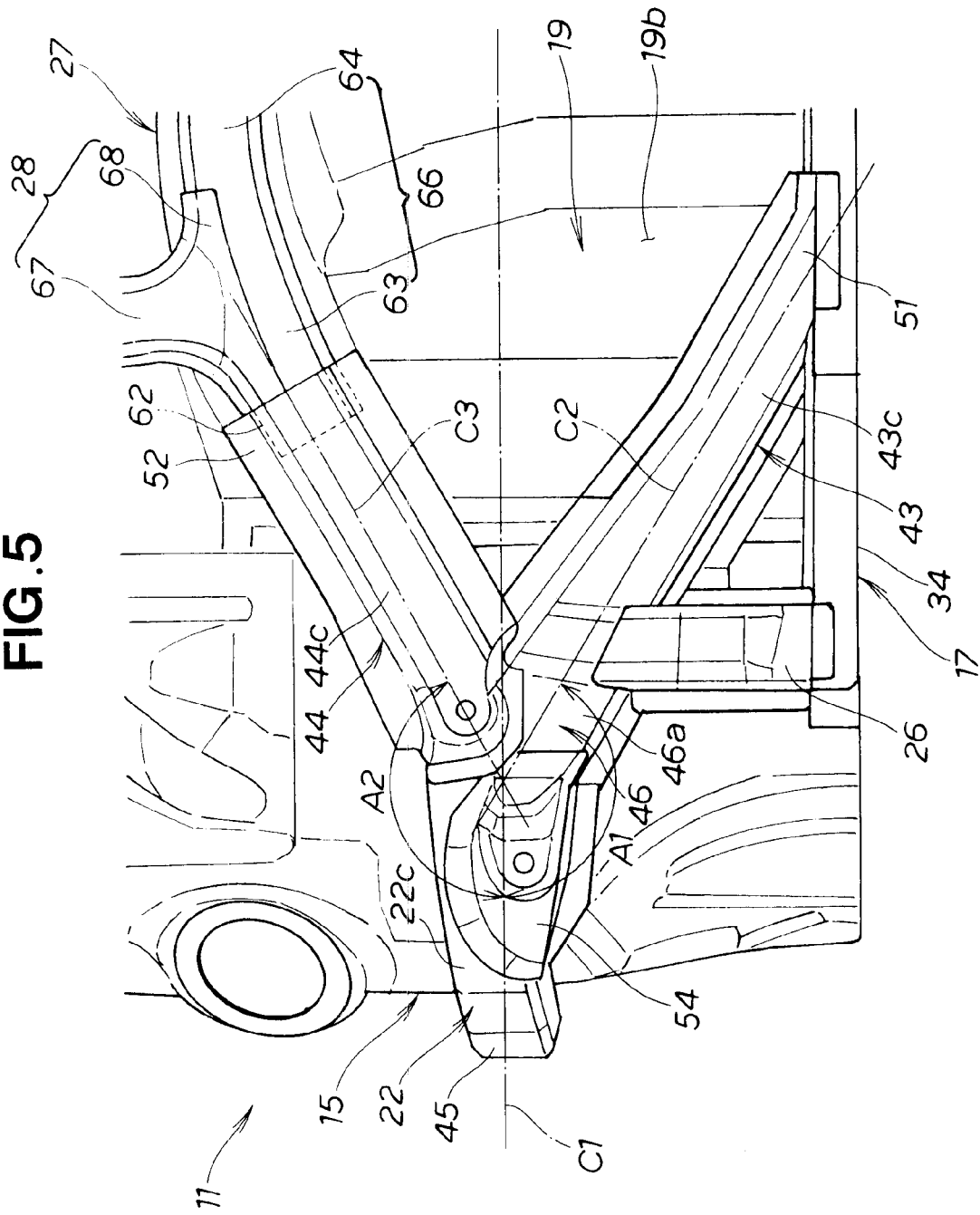
FIG. 5 is an enlarged view of a bifurcating portion where a side frame extension of FIG. 1 bifurcates into a side-sill-side extension and a tunnel-side extension.

Each of the side frame extensions 22 and the corresponding side-sill-side extension 43 form a unitary structure having a seamless hat cross-sectional shape, as shown in FIGS. 1 and 5.

In the following description, the rear end 46 of the left side frame extension 22, where it bifurcates into the left side-sill-side extension 43 and the left tunnel-side extension 44, is instead called a "bifurcating portion 46" as appropriate. The bifurcating portion 46 is a portion which is located below the dashboard 15 and in front of the fuel tank 21 and where the width or the closed cross-sectional area of the extension is maximized. A bottom surface 46a of the bifurcating portion 46 is positioned below the dashboard 15 and substantially flush with the bottom surface 43c of the side-sill-side extension 43 and the bottom surface 44c of the tunnel-side extension 44 in a horizontal plane.

The left side-sill-side extension 43 is a member formed integrally with the left side frame extension 22 and curved horizontally outward from the left bifurcating portion 46 in the vehicle-width direction. Specifically, the left side-sill-side extension 43 extends obliquely rearward from the rear end 46 of the left side frame extension 22 (left bifurcating portion 46) to the left side sill 17 positioned on the outer side in the vehicle-width direction. A rear end 51 of the left side-sill-side extension 43, that is, a side sill bonded portion 51, is bonded to the left side sill 17.

Now, a straight line CM passing through the widthwise center of the body 67 of the tunnel cross-member 28 and extending in the vehicle-width direction is referred to as a "cross-member extension line CM." The cross-member extension line CM intersects the vehicle-width direction center line CL at right angles. The left side sill bonded portion 51 is located on the cross-member extension line CM.

The left tunnel-side extension 44 is a member separate from the left side frame extension 22 and runs between the left bifurcating portion 46 and the front end of the left tunnel frame 27. Specifically, the left tunnel-side extension 44 extends obliquely rearward from the rear end of the left side frame extension 22 (left bifurcating portion 46) to the left tunnel frame 27, which is located on the inner side in the vehicle-width direction. The rear end of the left tunnel-side extension 44, that is, an extension bonded portion 52, is bonded to the front-end connector 62 of the left tunnel frame 27.

The left tunnel-side extension 44 is a member separate from the left side frame extension 22, which extends along the lower surface of the dashboard 15. The separate configuration allows, even when, for example, a vehicle-width direction center portion of the dashboard 15 has a complicated shape, the left side frame extension 22, the left side-sill-side extension 43, and the left tunnel-side extension 44 to be readily manufactured in accordance with the complicated shape.

The hat-shaped cross-section of each of the side frame extensions 22 has a width that gradually increases as the side frame extension 22 extends obliquely rearward and downward and is maximized at the bifurcating portion 46. To this end, the side frame extension 22 has a closed cross-section. The area S1 or the width L1 of the closed cross-section of the side frame extension 22 shown in FIG. 9 is set to be maximized at the bifurcating portion 46. As a result, the side frame extension 22, the side-sill-side extension 43, and the tunnel-side extension 44 have large bending rigidity. A front impact can be efficiently distributed from the bifurcating portion 46 through the side-sill-side extension 43 and the tunnel-side extension 44 to the side sill 17 and the tunnel cross-member 28.

The side-sill-side extension 43 is a member formed integrally with the side frame extension 22 and curved horizontally outward from the bifurcating portion 46 in the vehicle-width direction. The width of the hat-shaped cross-section of the side-sill-side extension 43 decreases in the direction from the bifurcating portion 46 toward the side sill 17.

A tilt angle A1 on the outer side in the vehicle-width direction between the side frame extension 22 and the side-sill-side extension 43 (first tilt angle A1) is set to be an obtuse angle of, for example, "150°±10°," which is a shallow angle, as shown in FIG. 5. Further, a tilt angle A2 on the inner side in the vehicle-width direction between the side frame extension 22 and the tunnel-side extension 44 (second tilt angle A2) is also set to be an obtuse angle of, for example, "150°±10°," which is a shallow angle.

The first tilt angle A1 is set to be equal or substantially equal to the second tilt angle A2 (A1=A2 or A1≈A2). The side frame extension 22 thus bifurcates to the left and right into the side-sill-side extension 43 and the tunnel-side extension 44 at substantially the same angle.

More specifically, a central line C1 passing through the widthwise center of the side frame extension 22, which is elongated in the longitudinal direction of the vehicle body 11, is parallel to the vehicle-width direction center line CL (see FIG. 1). The central line C1 of the side frame extension 22 and a central line C2 of the side-sill-side extension 43 form the first tilt angle A1 on the outer side in the vehicle-width direction. The central line C1 of the side frame extension 22 and a central line C3 of the tunnel-side extension 44 form the second tilt angle A2 on the inner side in the vehicle-width direction.

When the first and second tilt angles A1, A2 are too small, a front impact may produce very large bending stress in the left and right side-sill-side extensions 43, 43 and the left and right tunnel-side extensions 44, 44. On the other hand, too large tilt angles A1, A2 do not provide an optimum configuration that efficiently distributes a front impact to the left and right side sills 17, 17 and the tunnel portion 18.

In contrast, the first and second tilt angles A1, A2 are set at "150°±10°" in the first embodiment. A front impact therefore does not produce very large bending stress in the left and right side-sill-side extensions 43, 43 or the left and right tunnel-side extensions 44, 44. That is, the front impact is not allowed to abruptly bend the left and right side-sill-side extensions 43, 43 or the left and right tunnel-side extensions 44, 44. Further, the front impact can be smoothly and efficiently distributed to the left and right side sills 17, 17 and the tunnel portion 18.

Each of the tunnel-side extensions 44 and the corresponding tunnel frame 27 are connected to each other along a curved line. The tunnel frame 27 extends rearward while curving upward along the raised portion 38 of the fuel tank 21 to form the curved portion 66 described above.

When a front impact acts from one of the left and right bifurcating portions 46 on the corresponding one of the front curved portions 63, the curved portion 66 tends to bend upward and inward relative to the vehicle body. The tunnel cross-member 28, however, runs between the front curved portions 63, 63 of the left and right curved portions 66, 66. The front curved portions 63, 63 of the left and right curved portions 66, 66 therefore support each other via the tunnel cross-member 28. The configuration therefore can minimize the bending of the curved portions 66 resulting from a front impact.

The left and right connecting members 26, 26 run between the front ends of the left and right side sills 17, 17 and the left and right bifurcating portions 46. The left and right connecting members 26, 26, which extend in the vehicle-width direction, can bear a lateral load acting on a side portion of the vehicle body 11. The left and right side-sill-side extensions 43, 43 can bear a front load acting on the front end of the vehicle body 11. The left and right connecting members 26, 26 and the left and right side-sill-side extensions 43, 43 form left and right outriggers.

The above description of the first embodiment is summarized as follows. In the first embodiment, the left and right side frame extensions 22, 22 bifurcate at points below the dashboard 15 and in front of the fuel tank 21 into the left and right side-sill-side extensions 43, 43 and the left and right tunnel-side extensions 44, 44, as shown in FIGS. 1 to 8. A front impact (load) is therefore efficiently distributed and transmitted from the left and right front side frames 16, 16 through the left and right side frame extensions 22, 22 to the left and right side sills 17, 17 and the tunnel portion 18.

In general, the tunnel portion 18, which has a shape protruding upward from the floor panel 19 and elongated in the longitudinal direction of the vehicle body, is rigid and strong enough against a load in the longitudinal direction of the vehicle body. When the tunnel portion 18 is made of a material stronger and more rigid than the material of the floor panel 19, for example, when the tunnel portion 18 is made of a high-tensile steel plate, the rigidity and the strength can be further increased.

Instead, in the first embodiment, the left and right side frame extensions 22, 22 are configured to bifurcate into the side-sill-side extensions 43 connected to the left and right side sills 17, 17 and the left and right tunnel-side extensions 44, 44 connected to the tunnel portion 18 via the tunnel cross-member 28. As a result, a front impact transmitted to the left and right front side frames 16, 16 can be efficiently distributed to a rear portion of the vehicle body 11.

Further, no floor frame, which is provided in a typical vehicle body, is required to support the floor panel 19. It is noted that the floor frame is a member elongated in the longitudinal direction of the vehicle body and typically provided along the center line of the space between each of the left and right side sills 17, 17 and the tunnel portion 18.

As described above, no floor frame is present under the floor panel 19 and between the left and right side sills 17, 17 in the first embodiment. The space Sp1 surrounded by the floor panel 19, the left and right side sills 17, 17, and the rear cross-member 29 is therefore relatively wide. The fuel tank 21 (energy container 21) can be disposed in the wide space Sp1. The fuel tank 21 can therefore be thinner and wider than that in a typical vehicle body. For example, a fuel tank 21 that is thinner but is wider in the vehicle-width direction can still be large enough to ensure predetermined capacity of the fuel tank 21.

As a result, when the fuel tank 21 is disposed under the seat 41 as shown in FIG. 7, reducing the thickness of the fuel tank 21 can lower the surface of the seat 41 where a vehicle occupant is seated. Therefore, a hip point Hp (seated position Hp) of a vehicle occupant who is seated on the seat 41 can be lowered, and the height of the vehicle 10 can be lowered.

Further, the left and right tunnel frames 27, 27 are so curved that they can pass over the fuel tank 21 disposed under the floor panel 19 and extend along the lower surface 19b of the floor panel 19, as shown in FIGS. 1 and 7. The left and right tunnel frames 27, 27 therefore do not interfere with the fuel tank 21 disposed under the floor panel 19. The space Sp1 where the fuel tank 21 is disposed can thus be provided under the floor panel 19. For example, a wide fuel tank 21 can be disposed in the space Sp1 surrounded by the left and right side sills 17, 17 and the floor panel 19. A wide fuel tank 21 can ensure predetermined capacity even when the fuel tank 21 is thin. Further, the hip point Hp of a vehicle occupant who is seated on the seat 41 can be lowered.

Moreover, in the first embodiment, the left and right side frame extensions 22, 22 bifurcate into the left and right side-sill-side extensions 43, 43 and the left and right tunnel-side extensions 44, 44 in the vehicle-width direction at the same angle or substantially the same angle (A1=A2 or A1≈A2), as shown in FIGS. 1 and 5. Therefore, a front impact is transmitted from the left and right front side frames 16, 16 to the left and right side frame extensions 22, 22 and further distributed from the rear ends 46, 46 of the left and right side frame extensions 22, 22 (left and right bifurcating portions 46, 46), through the left and right side-sill-side extensions 43, 43, and the left and right tunnel-side extensions 44, 44, to the left and right side sills 17, 17 and the tunnel cross-member 28 in a generally uniform, efficient manner.

That is, the transmission of a front impact is so controlled that the tunnel cross-member 28 and the tunnel portion 18 do not receive a major part of the impact. The tunnel cross-member 28 and the tunnel portion 18 are strong enough to receive the impact transmitted in the controlled manner described above. It is therefore not necessary to reinforce the tunnel portion 18 or the floor panel 19, or the reinforcement can be minimized. On the other hand, the left and right side sills 17, 17, which form an outer frame of the vehicle body 11, are high-strength, high-rigidity members. The left and right side sills 17, 17 are therefore strong enough to receive the transmitted impact in the distributed manner described above. It is therefore not necessary to reinforce the left and right side sills 17, 17.

As described above, in the first embodiment, the front impact is distributed to the left and right side sills 17, 17 and the tunnel cross-member 28 in a generally uniform, efficient manner. It is therefore not necessary to reinforce the vehicle body 11 against the impact that is distributed in a generally uniform manner, or the reinforcement can be minimized. The weight of the vehicle body 11 can therefore be reduced.

Further, in the first embodiment, the area S1 or the width L1 of the closed cross-section of left and right side frame extensions 22, 22 (see FIG. 9) and hence the bending rigidity thereof are high at the left and right bifurcating portions 46, 46. The left and right side frame extensions 22, 22, the left and right side-sill-side extensions 43, 43, and the left and right tunnel-side extensions 44, 44 therefore have large bending rigidity. A front impact can be efficiently distributed from the left and right bifurcating portions 46, 46 through the left and right side-sill-side extensions 43, 43 and the left and right tunnel-side extensions 44, 44 to the left and right side sills 17, 17, the tunnel cross-member 28, and the tunnel portion 18.

Further, in the first embodiment, the rear ends of the left and right tunnel-side extensions 44, 44 are bonded to the tunnel cross-member 28 and the left and right tunnel frames 27, 27. It is therefore possible to transmit a larger front impact from the left and right tunnel-side extensions 44, 44 to the tunnel portion 18 and portions therearound, and the amount of impact to be transmitted to the left and right side sills 17, 17 may be reduced accordingly. The rigidity of the left and right side sills 17, 17 and hence the weight thereof can therefore be reduced by reducing the front impact distributed from the left and right side frame extensions 22, 22 to the left and right side sills 17, 17. The front impact can thus be more uniformly distributed to the left and right side sills 17, 17 and the tunnel cross-member 28.

Further, in the first embodiment, the front portions of the left and right tunnel frames 27, 27, that is, the left and right front curved portions 63, 63, which are curved, are connected to each other by the tunnel cross-member 28. The combination of the tunnel portion 18, the left and right tunnel frames 27, 27, and the tunnel cross-member 28 therefore has high rigidity. A larger front impact can therefore be smoothly and efficiently transmitted from the left and right tunnel-side extensions 44, 44 to the left and right tunnel frames 27, 27, which are curved, the tunnel cross-member 28, and the tunnel portion 18, that is, portions around the tunnel portion 18.

Further, since the left and right tunnel frames 27, 27 are connected to each other by the tunnel cross-member 28, the tunnel cross-member 28, for example, prevents a front impact from bending only one of the tunnel frames 27 in the vehicle-width direction or in the vertical direction.

Further, each of the left and right tunnel-side extensions 44, 44 and the left and right tunnel frames 27, 27 has an inverted hat-shaped cross-section, as shown in FIGS. 8 and 11. Since the open end of the inverted hat-shaped cross-section is bonded to the lower surface 19b of the floor panel 19, each of the left and right tunnel-side extensions 44, 44 and the left and right tunnel frames 27, 27 forms a closed cross-section. The floor panel 19 is therefore reinforced by the left and right tunnel-side extensions 44, 44 and the left and right tunnel frames 27, 27, whereby deformation will be adequately prevented.

Further, in the first embodiment, the left and right connecting members 26, 26 and the left and right side-sill-side extensions 43, 43 serve as left and right outriggers. The left and right connecting members 26, 26 connect the front ends of the left and right side sills 17, 17 to the left and right bifurcating portions 46, 46. The left and right bifurcating portions 46, 46 are where the strength and rigidity of the left and right side frame extensions 22, 22 are maximized.

A lateral impact to the vehicle 10 is therefore efficiently transmitted from one of the left and right side sills 17, 17 through the corresponding one of the left and right connecting members 26, 26 to the corresponding one of the left and right side frame extensions 22, 22. On the other hand, the left and right side-sill-side extensions 43, 43 are inclined and extend outward in the vehicle-width direction and rearward from the left and right bifurcating portions 46, 46 and are bonded to the left and right side sills 17, 17. A front impact is therefore efficiently transmitted from the left and right side frame extensions 22, 22 through the left and right side-sill-side extensions 43, 43 to the left and right side sills 17, 17. As described above, a lateral impact and a front impact can be efficiently transmitted to the widthwise center of each of the side-sill-side extensions 43 and the widthwise center of each of the connecting members 26. It is therefore not necessary or hardly necessary to reinforce the vehicle body 11, whereby the weight of the vehicle body 11 can be reduced.

Further, in the first embodiment, the bottom surfaces 46a, 46a of the left and right bifurcating portions 46, 46 are substantially flush with the bottom surfaces 43c, 43c of the left and right side-sill-side extensions 43, 43 and the bottom surfaces 44c, 44c of the left and right tunnel-side extensions 44, 44. A front impact can therefore be efficiently distributed from the left and right side frame extensions 22, 22 to the left and right side-sill-side extensions 43, 43 and the left and right tunnel-side extensions 44, 44.

Further, in the first embodiment, the left and right side frame extensions 22, 22 have the sub-frame attaching portions 54, 54 for detachably attaching the sub-frame 23. The sub-frame 23 typically supports a power system, a suspension system, and a steering system (not shown). The left and right side frame extensions 22, 22 receive not only a front impact transmitted from the left and right front side frames 16, 16 but also a load transmitted from the sub-frame 23. Both the front impact and the load transmitted from the sub-frame 23 can be efficiently distributed from the left and right side frame extensions 22, 22 to the left and right side-sill-side extensions 43, 43 and the left and right tunnel-side extensions 44, 44.

Second Embodiment

Figure 12:
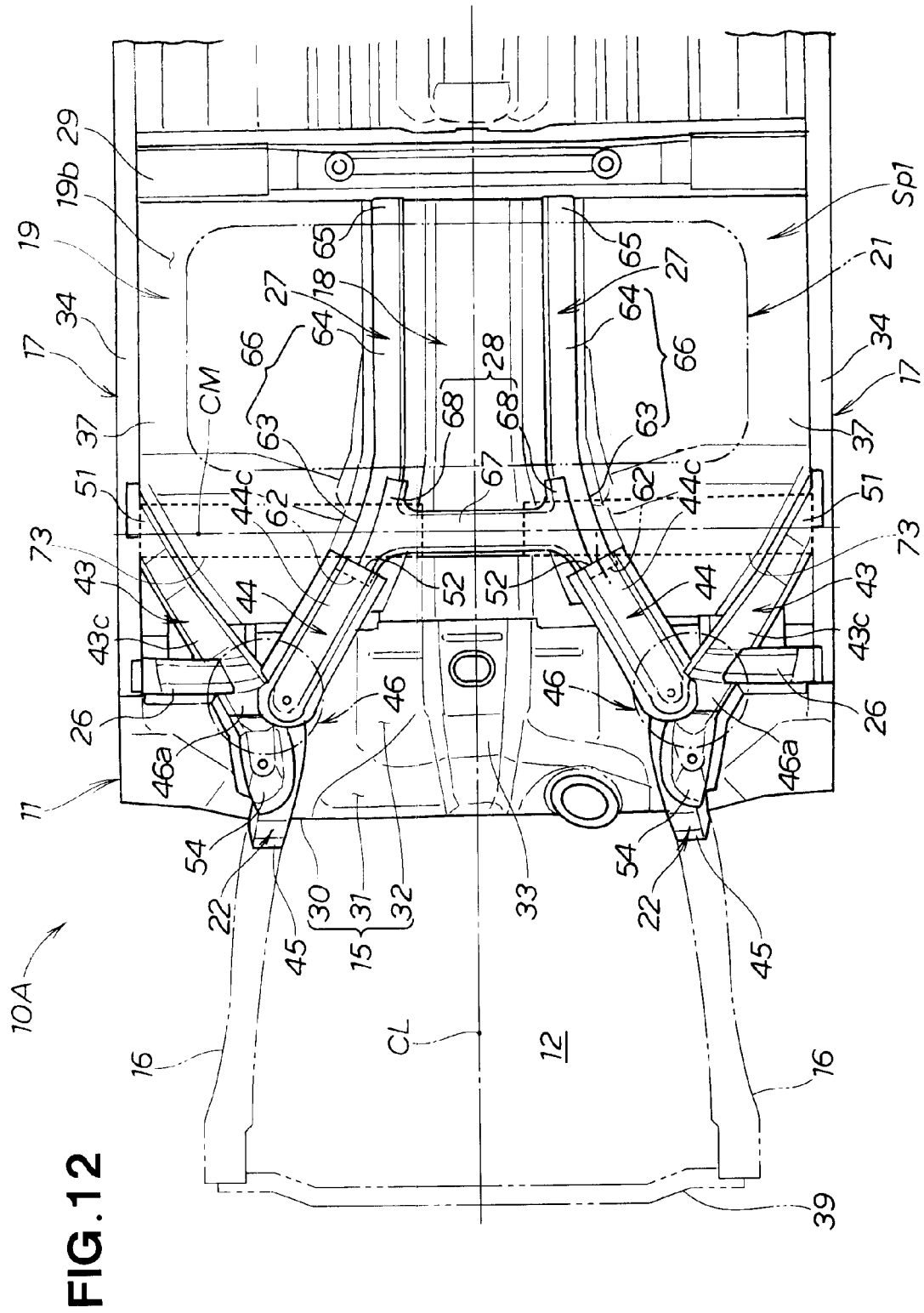
FIG. 12 is a bottom view of a front portion of a vehicle body according to a second embodiment of the present invention.

A vehicle body structure according to a second embodiment is described with reference to FIGS. 12 and 13. A vehicle body 11 of a vehicle 10A according to the second embodiment shown in FIG. 12 is characterized in that left and right front cross-members 73, 73 are added to the vehicle body 11 of the vehicle 10 according to the first embodiment shown in FIG. 1. The other components are substantially the same as those shown in FIGS. 1 to 11, and these components have the same reference characters and are not described.

The left and right front cross-members 73, 73 extend in the vehicle-width direction along the cross-member extension line CM and are placed on and bonded to an upper surface 19a of the floor panel 19, as shown in FIG. 12. The ends of the left and right front cross-members 73, 73 on the inner side in the vehicle-width direction overlap with the body 67 of the tunnel cross-member 28 and the left and right front curved portions 63. The ends of the left and right front cross-members 73, 73 on the outer side in the vehicle-width direction overlap with the left and right side sill bonded portions 51, 51 in a plan view. The left and right front cross-members 73, 73 are thus located behind the left and right tunnel-side extensions 44, 44. The left and right front cross-members 73, 73 are also called in-compartment cross-members because they are located in the passenger compartment 13.

Specifically, the left front cross-member 73 runs between the side surface of the left side sill 17 and the left side surface of the tunnel portion 18. The right front cross-member 73 extends in the vehicle-width direction and runs between the side surface of the right side sill 17 and the right side surface of the tunnel portion 18. As described above, the left and right front cross-members 73, 73 are located behind the left and right tunnel-side extensions 44, 44 in the passenger compartment 13 and extend in the vehicle-width direction.

Each of the left and right front cross-members 73, 73 has a hat-shaped cross-section which opens downward, and the open end is placed on and bonded to the upper surface 19a of the floor panel 19 from above. The lower end of each of the left and right front cross-members 73, 73 is bonded to the upper surface 19a of the floor panel 19, thereby forming a rectangular closed cross-section.

The left and right front cross-members 73, 73 may be integrated with each other and pass through the tunnel portion 18. The left and right front cross-members 73, 73 are also called front-side cross-members 73, 73.

Figure 13:
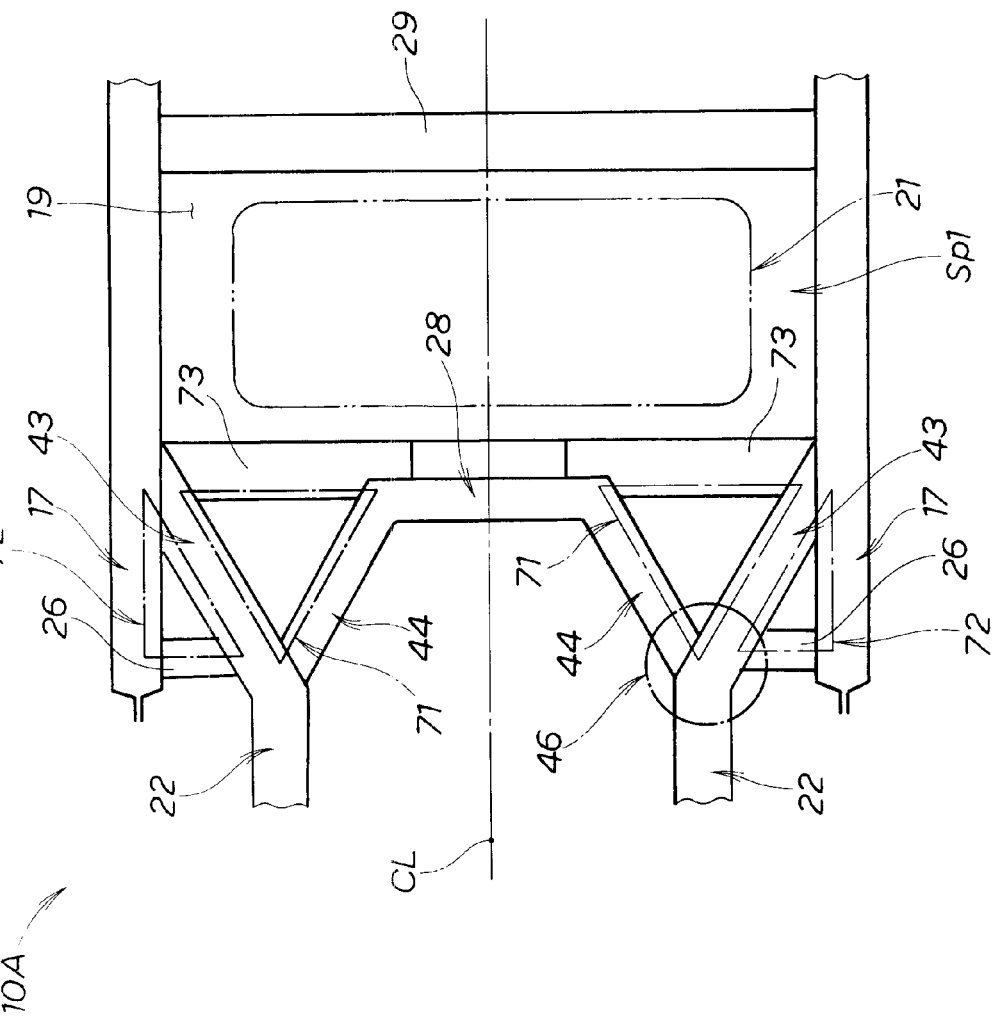
FIG. 13 is a bottom view diagrammatically showing the front portion of the vehicle body of FIG. 12.

The vehicle body 11 according to the second embodiment has left and right first triangular frame structures 71, 71 and left and right second triangular frame structures 72, 72, as shown in FIG. 13.

The left and right first triangular frame structures 71, 71 include the side-sill-side extensions 43 inclined outward in the vehicle-width direction, the tunnel-side extensions 44 inclined inward in the vehicle-width direction, and the front cross-members 73 extending in the vehicle-width direction, which form left and right rough truss shapes in a bottom view, as shown in FIGS. 12 and 13. Each of the truss shapes is obtained by connecting the corresponding side-sill-side extension 43 and tunnel-side extension 44 to the respective ends of the corresponding front cross-member 73 to form a triangle. It is noted that the side-sill-side extension 43 and the tunnel-side extension 44 are rigidly connected to the front cross-member 73 by welding them via the floor panel 19.

The left and right first triangular frame structures 71, 71, each of which has a truss shape (substantially triangular shape in a bottom view), are strong and rigid against a front impact transmitted from the left and right side frame extensions 22, 22, whereby the tunnel cross-member 28 is reinforced and can withstand a large load. The strength and rigidity of the left and right first triangular frame structures 71, 71 can therefore be reduced by replacing at least one of the components that form the left and right first triangular frame structures 71, 71, specifically, the left and right front cross-members 73, 73, the left and right side-sill-side extensions 43, 43, and the left and right tunnel-side extensions 44, 44, with a thin member. The weight of the vehicle body 11 can thus be reduced.

The left and right second triangular frame structures 72, 72 include the side sills 17 extending in the longitudinal direction of the vehicle body, the connecting members 26 extending in the vehicle-width direction, and the side-sill-side extensions 43 inclined outward in the vehicle-width direction, which form left and right rough truss shapes in a bottom view. The second triangular frame structures 72 are adjacent to the first triangular frame structures 71.

When an impact acts on a side surface of the vehicle 10A in the widthwise direction or when what is called a lateral collision occurs, the left and right second triangular frame structures 72, 72, each of which has a truss shape (substantially triangular shape in a bottom view), is strong against the lateral impact. At least one of the components that form the second triangular frame structures 72, 72, specifically, the connecting members 26, 26, the side sills 17, 17, and the side-sill-side extensions 43, 43, can therefore be a thin member. The weight of the vehicle body 11 can thus be reduced. Further, since the second triangular frame structures 72, 72 are adjacent to the first triangular frame structures 71, 71, torsional rigidity of the floor panel 19 increases.

Further, since the first and second triangular frame structures allow a front impact to be uniformly and efficiently distributed to the side sills 17, 17 and the tunnel cross-member 28, the side-sill-side extensions 43, 43 and the tunnel-side extensions 44, 44 can be greatly inclined obliquely rearward with respect to the front side frames 16, 16. The angle on the "outer side" in the vehicle-width direction between each of the side frame extensions 22, 22 and the corresponding one of the side-sill-side extensions 43, 43, that is, a tilt angle, is preferably set to be an obtuse angle of, for example, "150°±10°." Similarly, the angle on the "inner side" in the vehicle-width direction between each of the side frame extensions 22, 22 and the corresponding one of the tunnel-side extensions 44, 44, that is, a tilt angle, is preferably set to be an obtuse angle of, for example, "150°±10°." Employing the configuration described above still allows the left and right second triangular frame structures 72, 72 to be strong enough against a lateral impact transmitted from the vehicle body 11 in the lateral direction because the connecting members 26, 26 are present.

Further, a laterally long battery 21 (energy container 21) can be disposed on the upper surface 19a of the floor panel 19 by limiting the tunnel portion 18 to the front cross-members 73 and forming a flat portion of the floor panel 19 behind the front cross-member 73 without providing any tunnel frame.

Third Embodiment

A vehicle body structure according to a third embodiment is described with reference to FIGS. 14 to 16. It shall be noted that the front panel 19 has not been included for A vehicle body 11 of a vehicle 10B according to the third embodiment shown in FIGS. 14 and 15 differs from the vehicle body 11 according to the second embodiment shown in FIG. 12 in terms of the following two points. The other components are substantially the same as those shown in FIGS. 1 to 13, and these components have the same reference characters and are not described. A first difference is that the positions of the left and right front cross-members 73, 73 are changed. A second difference is that the position where the fuel tank 21 (energy container 21) is mounted is changed.

Figure 14:
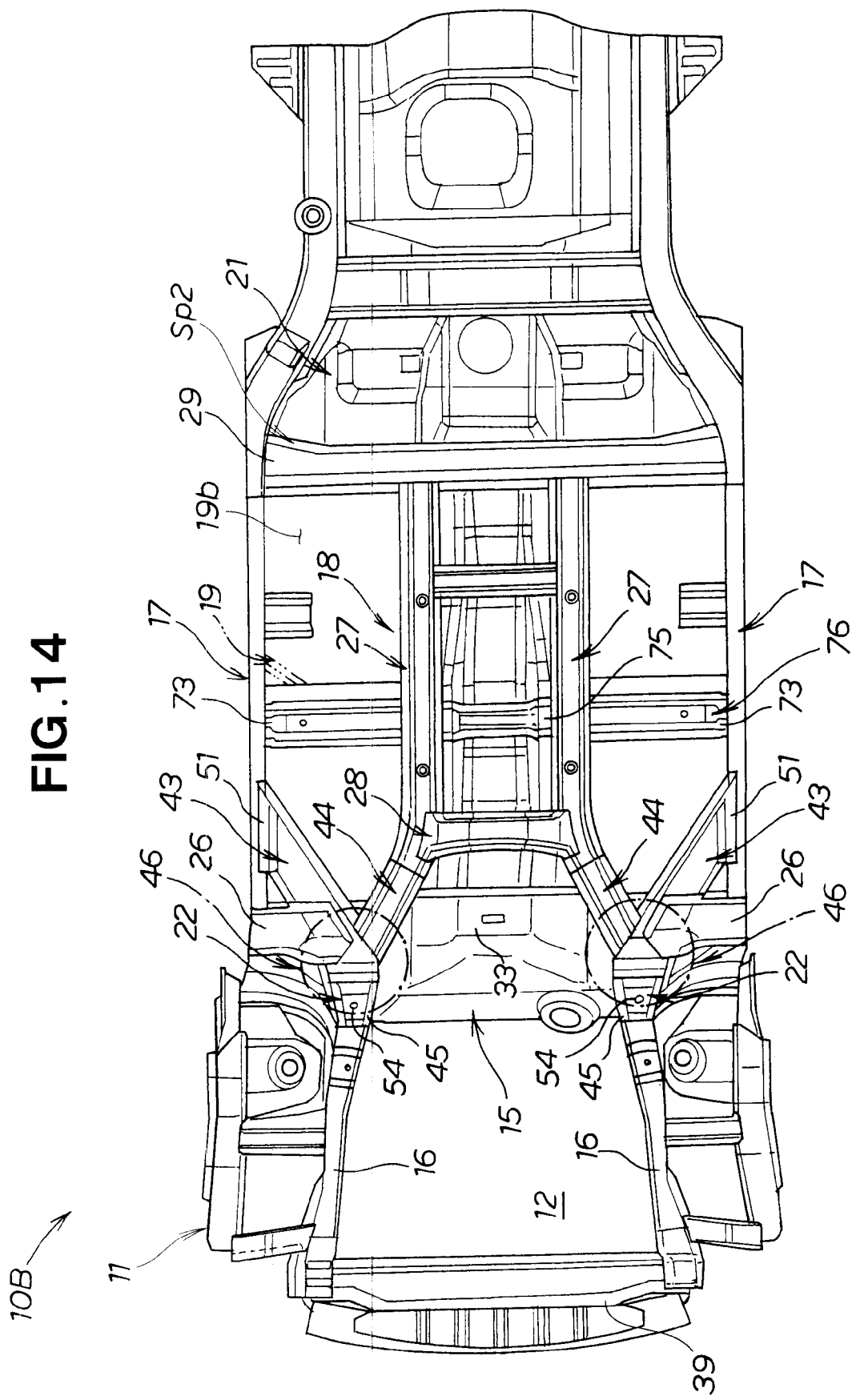
FIG. 14 is a bottom view of a vehicle body according to a third embodiment of the present invention.
Figure 15:
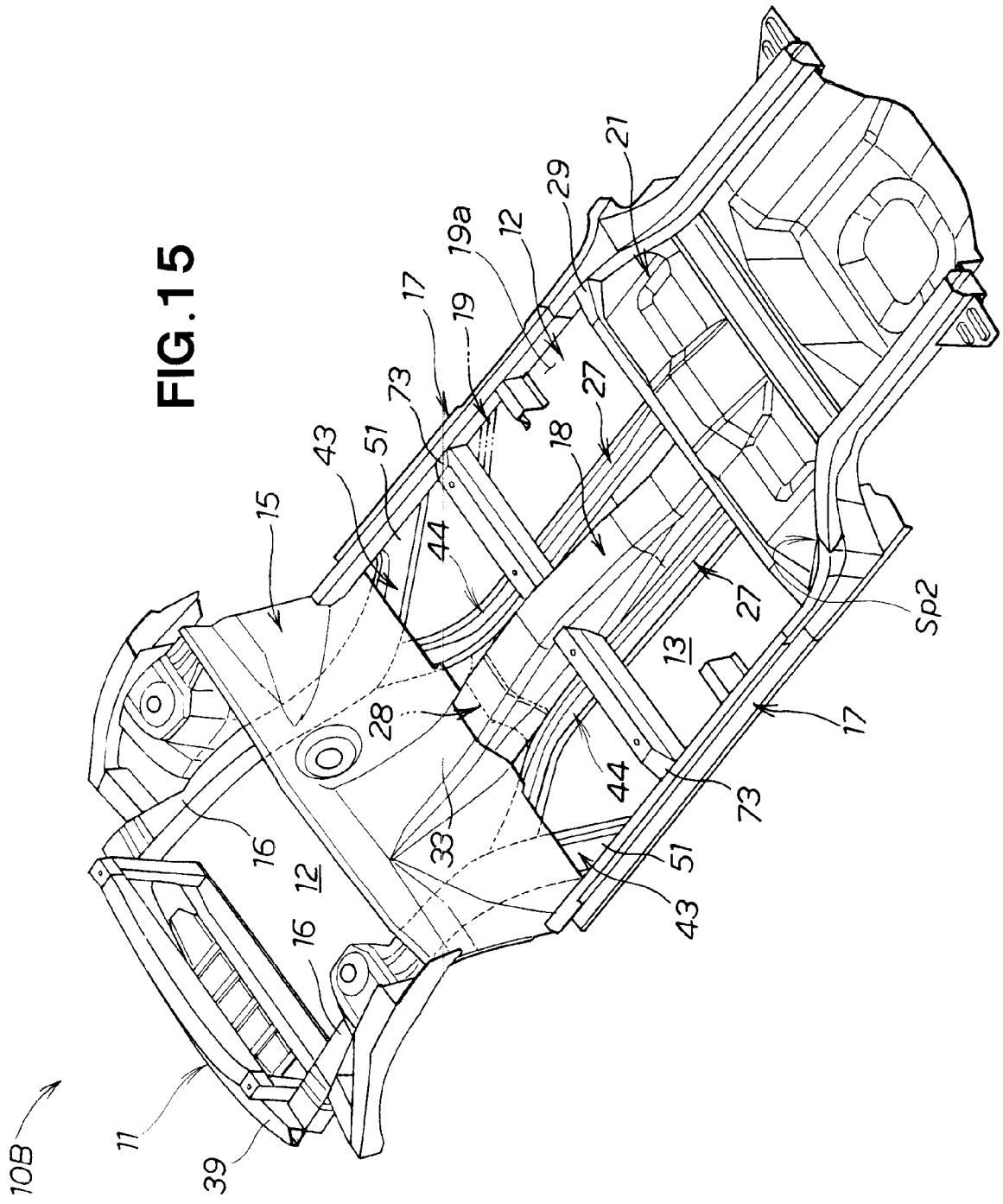
FIG. 15 is a perspective view of the vehicle body according to the third embodiment of the present invention, as viewed from above.

Left and right front cross-members 73, 73 in the third embodiment are positioned behind the tunnel cross-member 28, as shown in FIGS. 14 and 15. A connecting cross-member 75 runs between the inner left side surface and the inner right side surface of the tunnel portion 18. The position of the connecting cross-member 75 coincides with the positions of the left and right front cross-members 73, 73 in the longitudinal direction of the vehicle body 11. The combination of the left and right front cross-members 73, 73 and the connecting cross-member 75 form a rear-side cross-member 76.

The connecting cross-member 75 has a hat-shaped cross-section which is open downward, and the open end is placed on and bonded to the upper surface 19a of the floor panel 19 from above. The lower end of the connecting cross-member 75 is bonded to the upper surface 19a of the floor panel 19, and thereby has a rectangular closed cross-section.

The fuel tank 21 in the third embodiment is located behind the rear cross-member 29. The fuel tank 21 is disposed in a space Sp2 surrounded by the floor panel 19, the left and right side sills 17, 17, and the rear cross-member 29, and is attached to the vehicle body 11.

Figure 16:
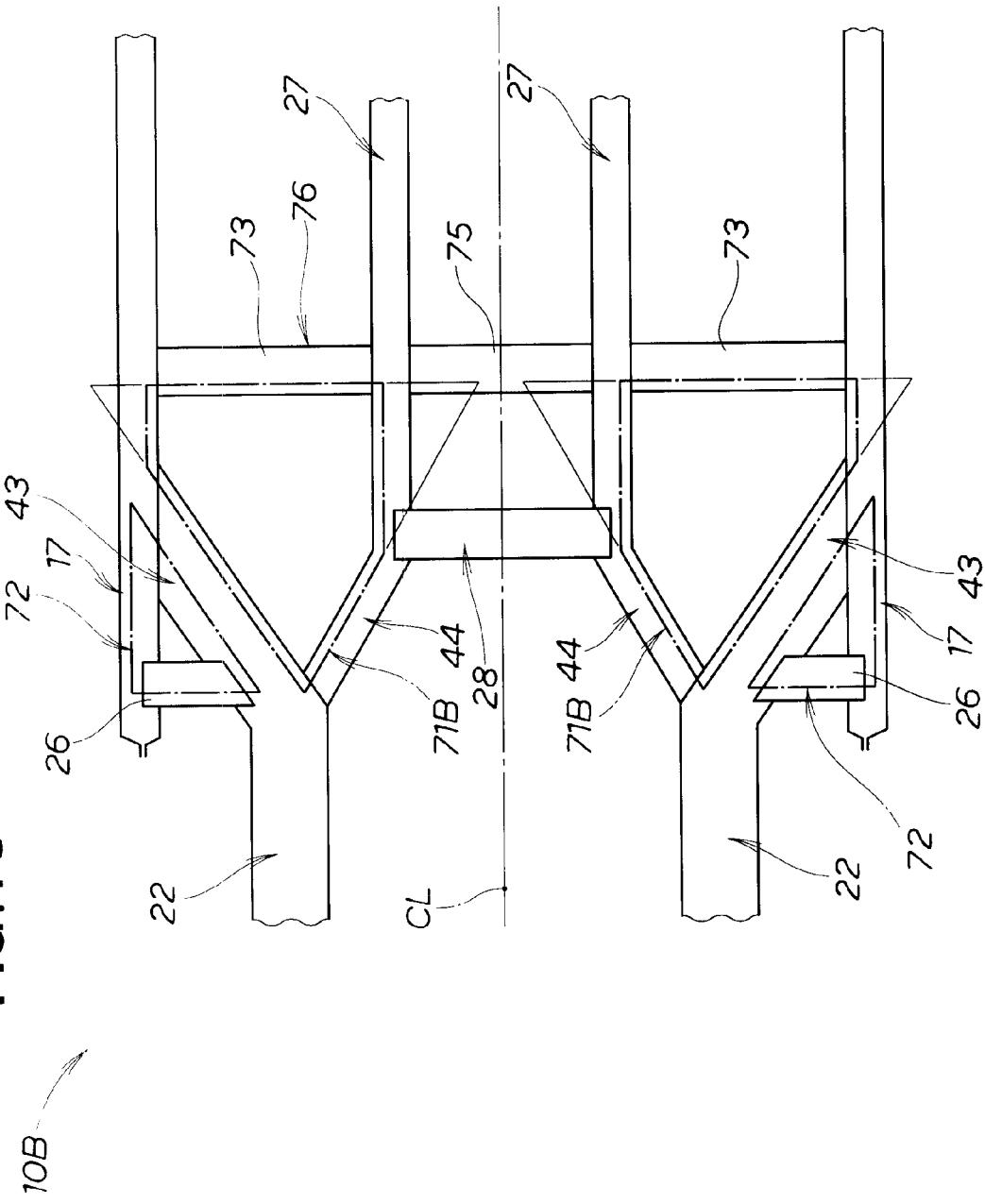
FIG. 16 is a bottom view diagrammatically showing the front portion of the vehicle body of FIG. 14.

The vehicle body 11 according to the third embodiment includes left and right first triangular frame structures 71B, 71B and left and right second triangular frame structures 72, 72, as shown in FIG. 16. The left and right first triangular frame structures 71B, 71B have substantially the same configuration as that of the left and right first triangular frame structures 71, 71 in the second embodiment shown in FIG. 13 but have a substantially pentagonal frame shape. The left and right second triangular frame structures 72, 72 have the same configuration as that of the left and right second triangular frame structures 72, 72 in the second embodiment shown in FIG. 13 and are adjacent to the left and right first triangular frame structures 71B, 71B.

The left and right first triangular frame structures 71B, 71B include side-sill-side extensions 43 inclined outward in the vehicle-width direction, tunnel-side extensions 44 inclined inward in the vehicle-width direction, and front cross-members 73 extending in the vehicle-width direction, which form rough truss shapes in a bottom view, as shown in FIGS. 14 and 16.

The first triangular frame structures 71B, 71B have a truss shape (substantially triangular shape in a bottom view), and therefore are strong and rigid against a front impact transmitted from the left and right side frame extensions 22, 22, whereby the tunnel cross-member 28 is reinforced and can withstand a large load.

Further, the rear cross-members 29 is located in front of the fuel tank 21, which is disposed in a rear portion of the vehicle body 11, but behind the front cross-members 73, 73. The configuration described above can prevent an impact from the front side of the vehicle body from locally acting on the fuel tank 21 located behind the rear cross-member 29.

Fourth Embodiment

A vehicle body structure according to a fourth embodiment is described with reference to FIGS. 17 to 26. A vehicle body 11 of a vehicle 10C according to the fourth embodiment shown in FIGS. 17 and 18 differs from the vehicle body 11 of the vehicle 10 according to the first embodiment shown in FIG. 1 in terms of the following four points. The other components are substantially the same as those shown in FIGS. 1 to 11, and these components have the same reference characters and are not described. A first difference is that the left and right side sills 17, 17 shown in FIG. 1 are changed to left and right side sills 17C, 17C shown in FIG. 17. A second difference is that the left and right tunnel frames 27, 27 are omitted. A third difference is that the tunnel cross-member 28 shown in FIG. 1 is changed to a tunnel cross-member 28C shown in FIG. 17. A fourth difference is that a front cross-member 73C is added.

Figure 25:
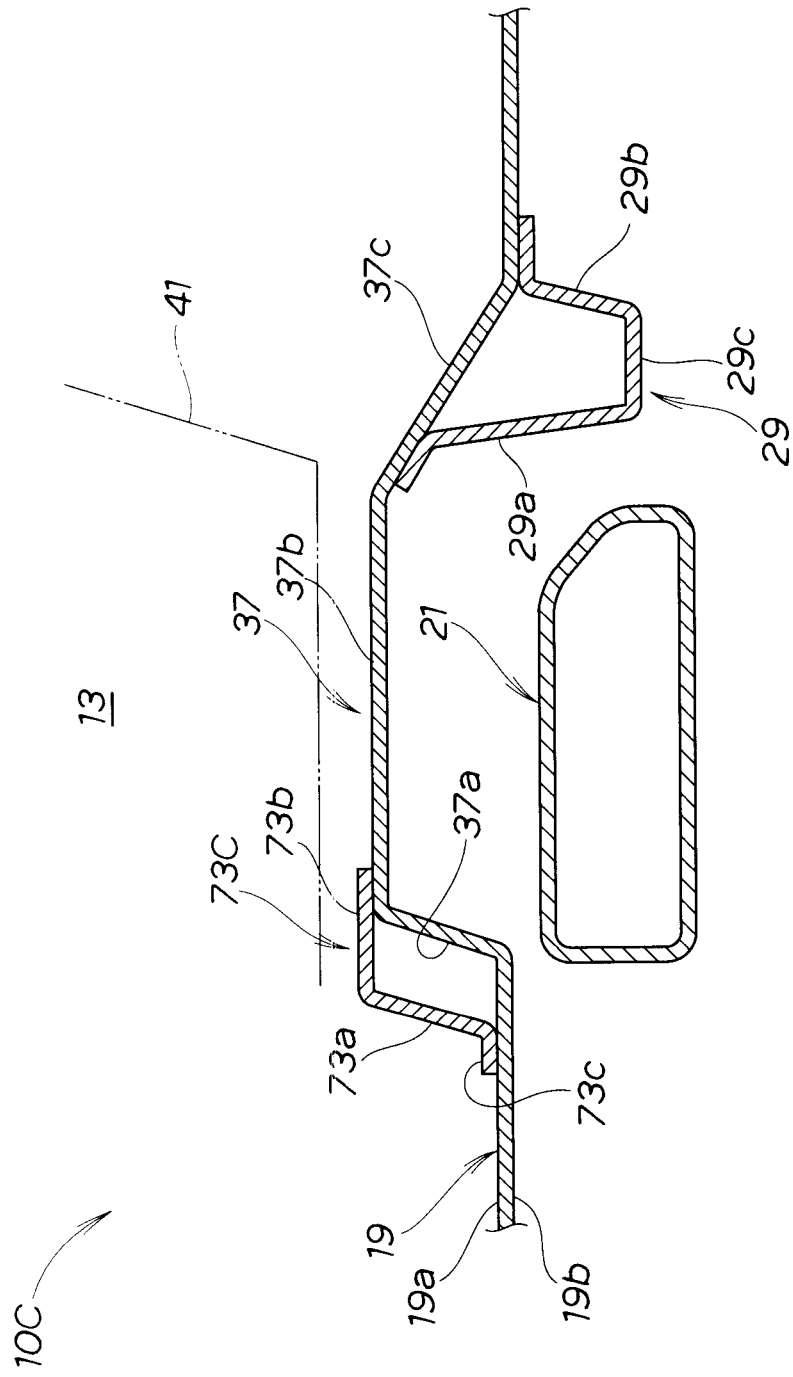
FIG. 25 is a cross-sectional view taken along line 25-25 of FIG. 19.

Each of the left and right raised portions 37, 37 is formed of a front wall 37a that stands upward from the floor panel 19, a substantially horizontal upper wall 37b extending from the upper end of the front wall 37a toward the rear of the vehicle body, and a rear inclined wall 37c extending rearward and downward from the rear end of the upper wall 37b and connected to the floor panel 19, as shown in FIG. 25.

The front cross-member 73C extends along the cross-member extension line CM in the vehicle-width direction and is placed on and bonded to the upper surface 19a of the floor panel 19, as shown in FIGS. 18, 19, 21, and 25. That is, the front cross-member 73C overlaps with a body 111 of the tunnel cross-member 28C. The ends of the front cross-member 73C on the outer side in the vehicle-width direction overlap with the left and right side sill bonded portions 51, 51. The front cross-member 73C is thus located behind the left and right tunnel-side extensions 44, 44.

Specifically, the front cross-member 73C runs between the left and right side sill inner portions 34, 34. As described above, the front cross-member 73C is located behind the left and right tunnel-side extensions 44, 44 and extends in the vehicle-width direction in the passenger compartment 13.

The front cross-member 73C has a substantially inverted L-shaped cross-section and is formed of a front standing wall 73a facing the front wall 37a of the raised portion 37 with a predetermined gap therebetween toward the front of the vehicle body, a horizontal wall 73b extending rearward from the upper end of the front standing wall 73a, and a flange 73c formed at the lower end of the front standing wall 73a, as shown in FIG. 25. The rear end of the horizontal wall 73b is placed on and bonded to the upper wall 37b of the raised portion 37 from above. The flange 73c is placed on and bonded to the upper surface 19a of the floor panel 19. The front cross-member 73C is bonded to the floor panel 19 and the upper walls 37b, thereby forming a rectangular closed cross-section. The front cross-member 73C forms part of the skeleton of the vehicle body 11.

The front cross-member 73C may be configured differently as long as it is located in front of the front walls 37a of the raised portions 37. For example, the front cross-member 73C may have a hat-shaped cross-section which opens downward. In this case, the open end of the front cross-member 73C having a hat-shaped cross-section is placed on and bonded to the upper surface 19a of the floor panel 19 from above.

Figure 18:
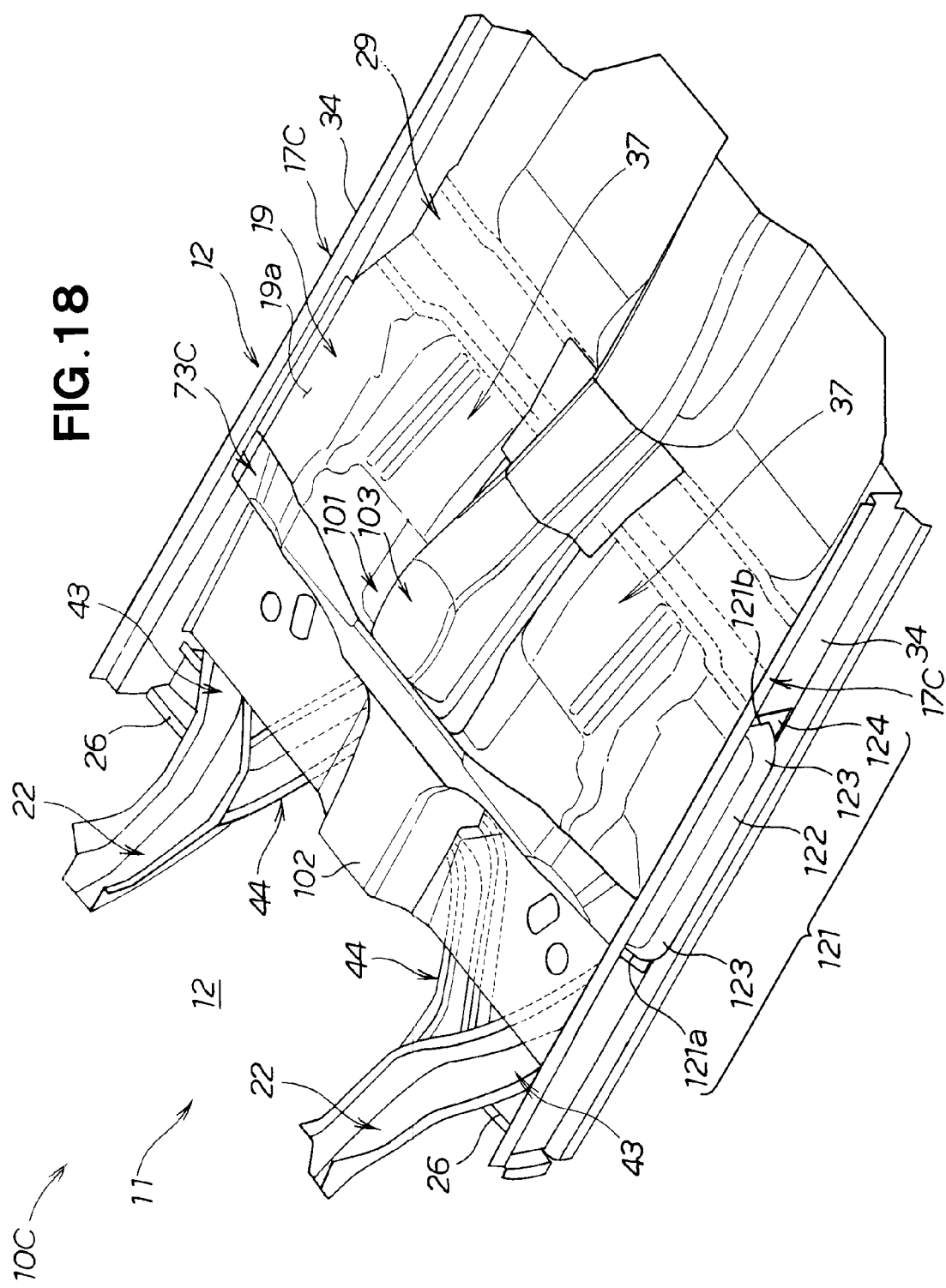
FIG. 18 is a perspective view of the front portion of the vehicle body according to the fourth embodiment of the present invention, as viewed from above.

A rear cross-member 29 in the fourth embodiment is positioned on the lower surfaces of the rear inclined walls 37c of the raised portions 37 and forms part of the skeleton of the vehicle body 11, as shown in FIGS. 18 and 25. The rear cross-member 29 has a hat-shaped cross-section which opens upward, and the open end is placed on and bonded to the lower surfaces of the rear inclined walls 37c from below, as shown in FIG. 25. An upper end of the rear cross-member 29 is bonded to the lower surfaces of the rear inclined wall 37c, thereby forming a rectangular closed cross-section. That is, the rear cross-member 29 is formed of a front standing wall 29a that stands and faces the fuel tank 21, a rear standing wall 29b positioned behind and facing the front standing wall 29a with a predetermined gap therebetween, and a bottom wall 29c that connects the front standing wall 29a and the rear standing wall 29b to each other. Since the floor panel 19 has the rear inclined walls 37c inclined rearward and downward above a rear portion of the fuel tank 21 to provide a space for the legs of vehicle occupants seated on a rear seat, the front standing wall 29a is higher than the rear standing wall 29b.

Figure 17:
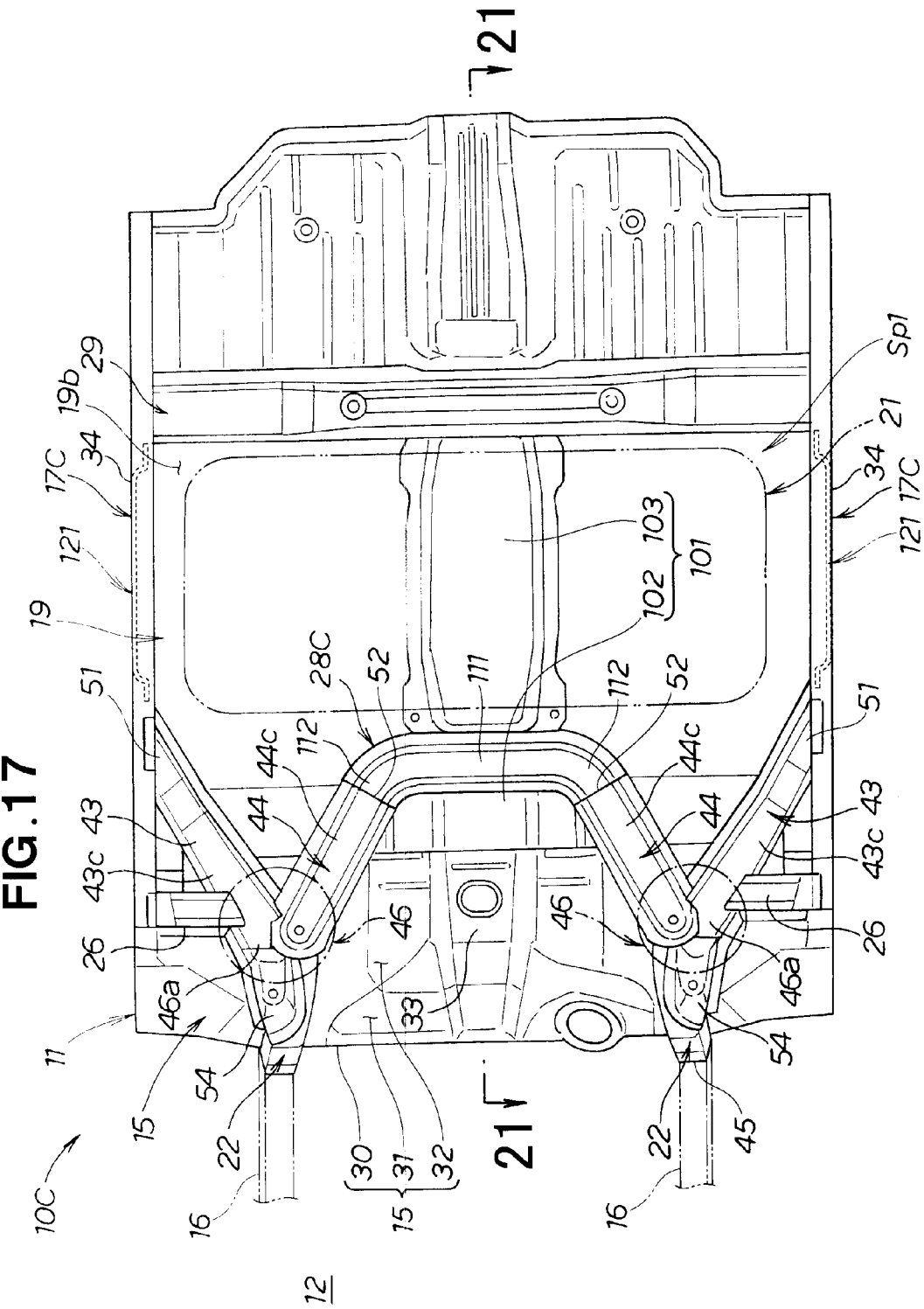
FIG. 17 is a bottom view of a front portion of a vehicle body according to a fourth embodiment of the present invention.
Figure 19:
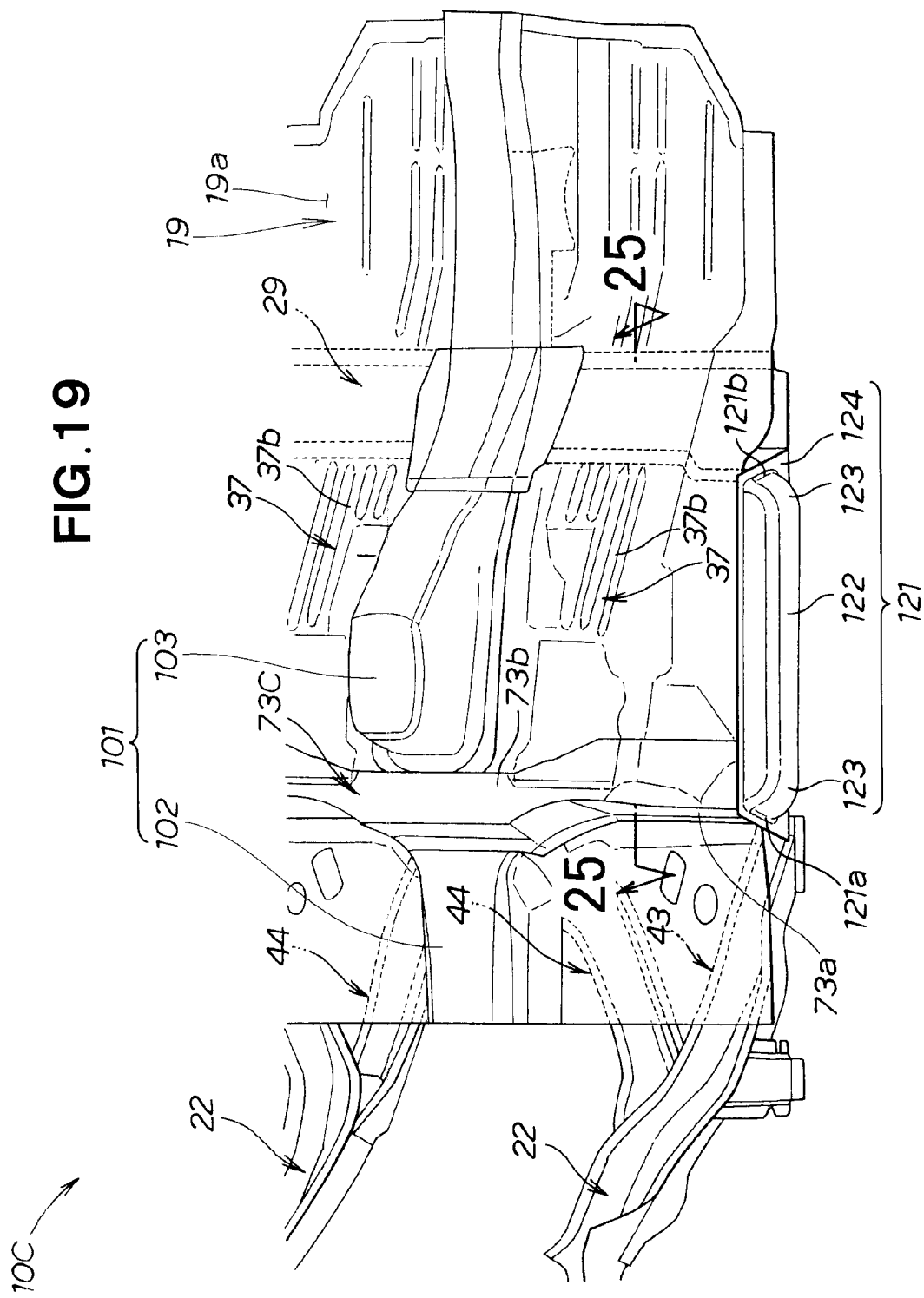
FIG. 19 is a perspective view showing the left half of the front portion of the vehicle body of FIG. 18.

A tunnel portion 101 is formed of a front tunnel body 102 and a rear tunnel body 103, as shown in FIGS. 17 to 19. The front tunnel body 102 is a vehicle-width direction center portion of the floor panel 19 that protrudes upward and continuously extends from the concave portion 33 of the dashboard 15 toward the rear of the vehicle body. The rear tunnel body 103 is connected to the rear end of the front tunnel body 102 and extends in the longitudinal direction of the vehicle body. The rear tunnel body 103 is stronger and more rigid than the floor panel 19. For example, the rear tunnel body 103 is formed of a plate thicker than the floor panel 19 or made of a material stronger and more rigid than that of the floor panel 19 (high-tensile steel, for example).

Figure 21:
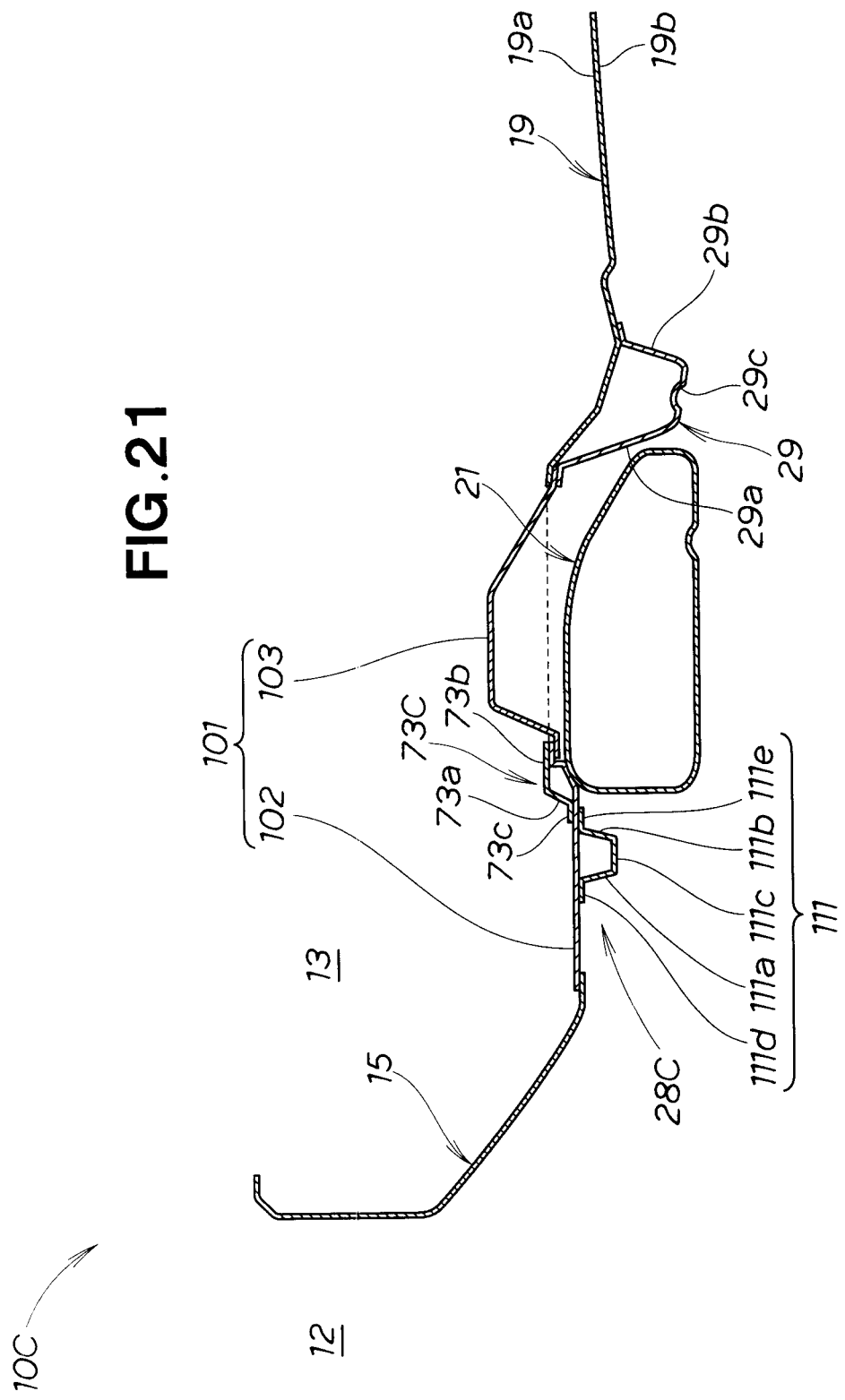
FIG. 21 is a cross-sectional view taken along line 21-21 of FIG. 17.

The tunnel cross-member 28C in the fourth embodiment is formed of a body 111 elongated in the vehicle-width direction and left and right connectors 112, 112 slightly curved from the left and right ends of the body 111 toward the front of the vehicle body, as shown in FIGS. 17 and 21. Each of the body 111 and the connectors 112, 112 has a substantially hat-shaped cross-section open toward the lower surface 19b of the floor panel 19. The tunnel cross-member 28C has an upper end bonded to the lower surface 19b of the floor panel 19, thereby forming a rectangular closed cross-section.

Specifically, the body 111 of the tunnel cross-member 28C is formed of a front standing wall 111a positioned towards the front of the vehicle body, a rear standing wall 111b facing the rear of the vehicle body, a bottom wall 111c that connects the lower end of the front standing wall 111a to the lower end of the rear standing wall 111b, a front flange 111d extending forward from the upper end of the front standing wall 111a, and a rear flange 111e extending rearward from the upper end of the rear standing wall 111b. The front flange 111d and the rear flange 111e are placed on and bonded to the lower surface 19b of the floor panel 19 and the lower surface of the tunnel portion 101. The front flange 111d and the rear flange 111e are called below second flanges 111d and 111e as appropriate. The left and right connectors 112, 112 of the tunnel cross-member 28C have the same configuration as that of the body 111.

The extension bonded portions 52, 52 of the left and right tunnel-side extensions 44, 44 are bonded to the connectors 112, 112 of the tunnel cross-member 28C. Further, the flange 73c of the front cross-member 73C and the rear flange 111e of the body 111 of the tunnel cross-member 28C overlap with each other with the floor panel 19 interposed therebetween, as shown in FIG. 21.

As described above, the front cross-member 73C runs between the left and right side sills 17C, 17C along the upper surface 19a of the floor panel 19 is positioned in, or is adjacent to, a region of the body 111 of the tunnel cross-member 28C interposed by the floor panel 19. A lateral impact can therefore be efficiently distributed from one of the side sills 17C through the front cross-member 73C to the other side sill 17C, the tunnel cross-member 28C, and the tunnel portion 101.

Figure 22:
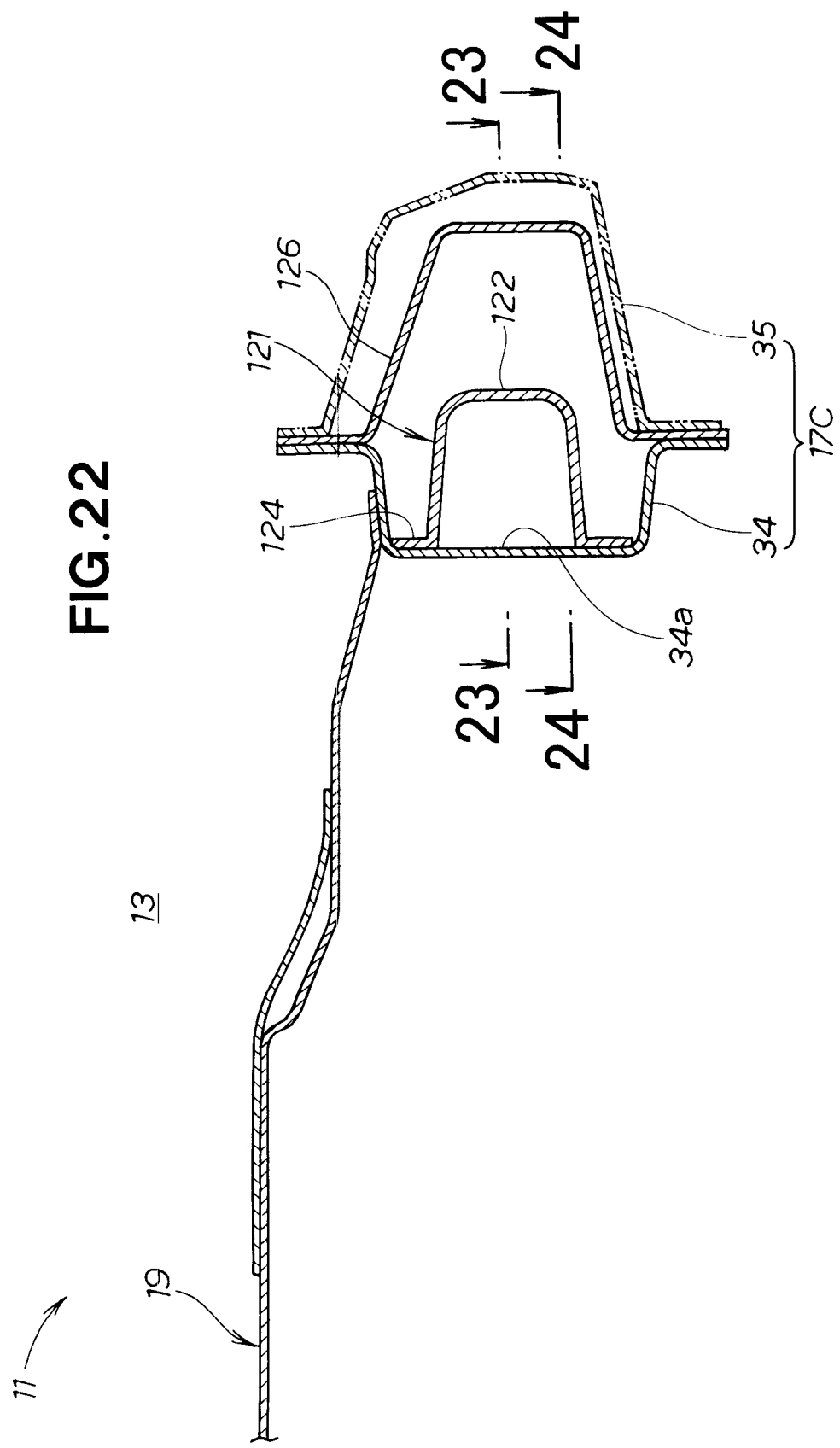
FIG. 22 is a cross-sectional view of a side sill of the vehicle body according to the fourth embodiment of the present invention.
Figure 23:
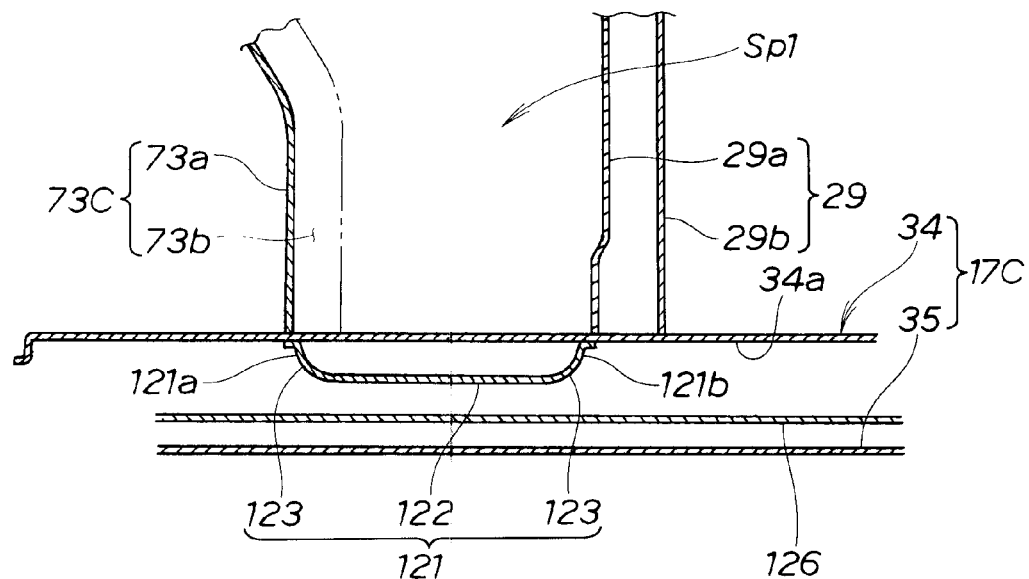
FIG. 23 is a cross-sectional view taken along line 23-23 of FIG. 22.
Figure 24:
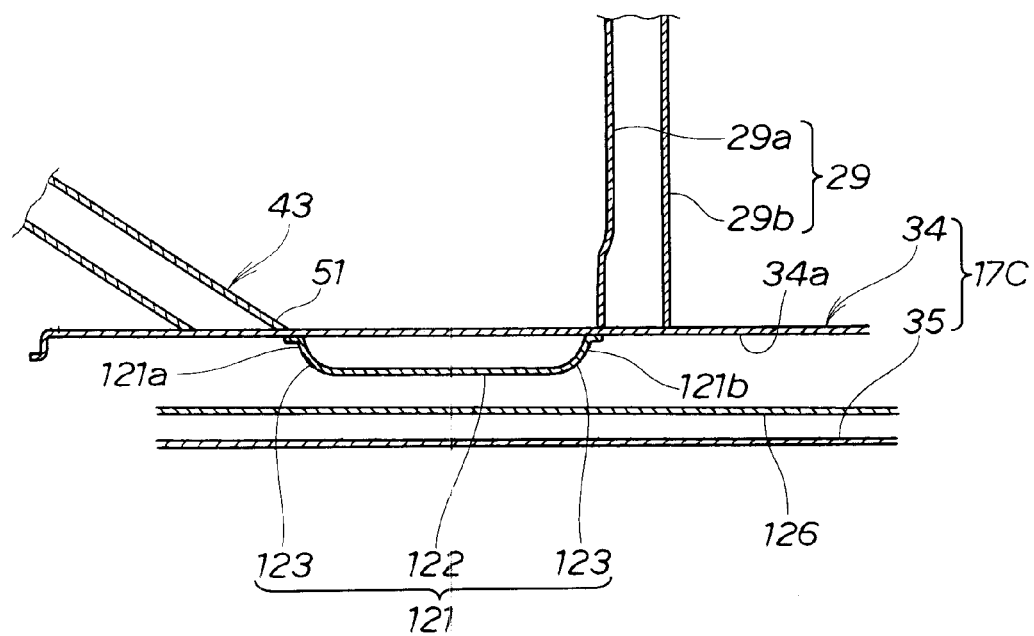
FIG. 24 is a cross-sectional view taken along line 24-24 of FIG. 22.

The left side sill 17C in the fourth embodiment has a reinforcing member 121 and a stiffener 126 provided therein, as shown in FIGS. 22 to 24. The right side sill 17C, which is identical to the left side sill 17C, is not described.

The reinforcing member 121 (reinforcement 121) increases the rigidity and strength of the side sill inner portion 34 and is bonded to an inner bottom surface 34a of the side sill inner portion 34 having a substantially hat-shaped cross-section, that is, a vertical wall surface 34a facing the side sill outer portion 35.

Specifically, the reinforcing member 121 has a substantially U-shaped cross-section open toward the inner bottom surface 34a of the side sill inner portion 34 and is elongated in the longitudinal direction of the vehicle body along the inner bottom surface 34a, and a front end 121a and a rear end 121b of the reinforcing member 121 in the longitudinal direction are closed. Further, the reinforcing member 121 has a flange 124 all around an edge open toward the inner bottom surface 34a. The flange 124 is fixed to the side sill inner portion 34, which is thicker than the side sill outer portion 35. The flange 124 of the reinforcing member 121 is placed on and bonded to the inner bottom surface 34a, and thereby attached integrally to the side sill inner portion 34. As described above, the overall shape of the reinforcing member 121 attached to the side sill inner portion 34, when viewed from above as shown in FIG. 23, is what is called a rough arch (arcuate) cross-sectional shape with the front end 121a and the rear end 121b in the longitudinal direction arcuately shaped and closed.

More specifically, the reinforcing member 121 is formed of a body 122 elongated in the longitudinal direction of the vehicle body, cross-sectional area tapering portions 123, 123 that taper the cross-sectional area of the reinforcing member 121 toward both ends of the body 122 in the longitudinal direction, and the flange 124. The body 122 has a substantially U-shaped cross-section open toward the inner bottom surface 34a of the side sill inner portion 34. The cross-sectional area tapering portions 123, 123 close respective ends of the body 122 in the longitudinal direction (that is, portions corresponding to a front end 121a and rear end 121b of the reinforcing member 121) and have spherical shapes continuous from the body 122 to the front end 121a and the rear end 121b. The flange 124 extends all around the edges of the body 122 and the cross-sectional area tapering portions 123, 123.

The position of the front end 121a of the reinforcing member 121 coincides with not only the position of the front standing wall 73a of the front cross-member 73 in the longitudinal direction of the vehicle body 11 but also the position of the rear end 51 of the side-sill-side extension 43 in the longitudinal direction of the vehicle body 11, as shown in FIGS. 23 and 24. The position of the rear end 121b of the reinforcing member 121 coincides with the position of the front standing wall 29a of the rear cross-member 29 in the longitudinal direction of the vehicle body 11.

Since the reinforcing member 121 is provided in the side sill inner portion 34 as described above, it is not necessary to increase the plate thickness of the entire side sill inner portion 34. The weight of the vehicle body 11 can therefore be reduced as compared with a case where the plate thickness of the entire side sill inner portion 34 is increased. Further, when a lateral impact acts on the vehicle body 11, the amount of deformation of the side sill inner portion 34 can be reduced.

The stiffener 126, which increases the rigidity and strength of the entire side sill 17C, accordingly extends along the entire length of the side sill 17C. The stiffener 126 has a substantially hat-shaped cross-section open toward the inner bottom surface 34a of the side sill inner portion 34 so that the stiffener 126 attached to the side sill inner portion 34 surrounds the reinforcing member 121 from outside the reinforcing member 121 in the vehicle-width direction. Flanges of the stiffener 126 are interposed between and bonded to the flanges of the side sill inner portion 34 and the flanges of the side sill outer portion 35.

Figure 20:
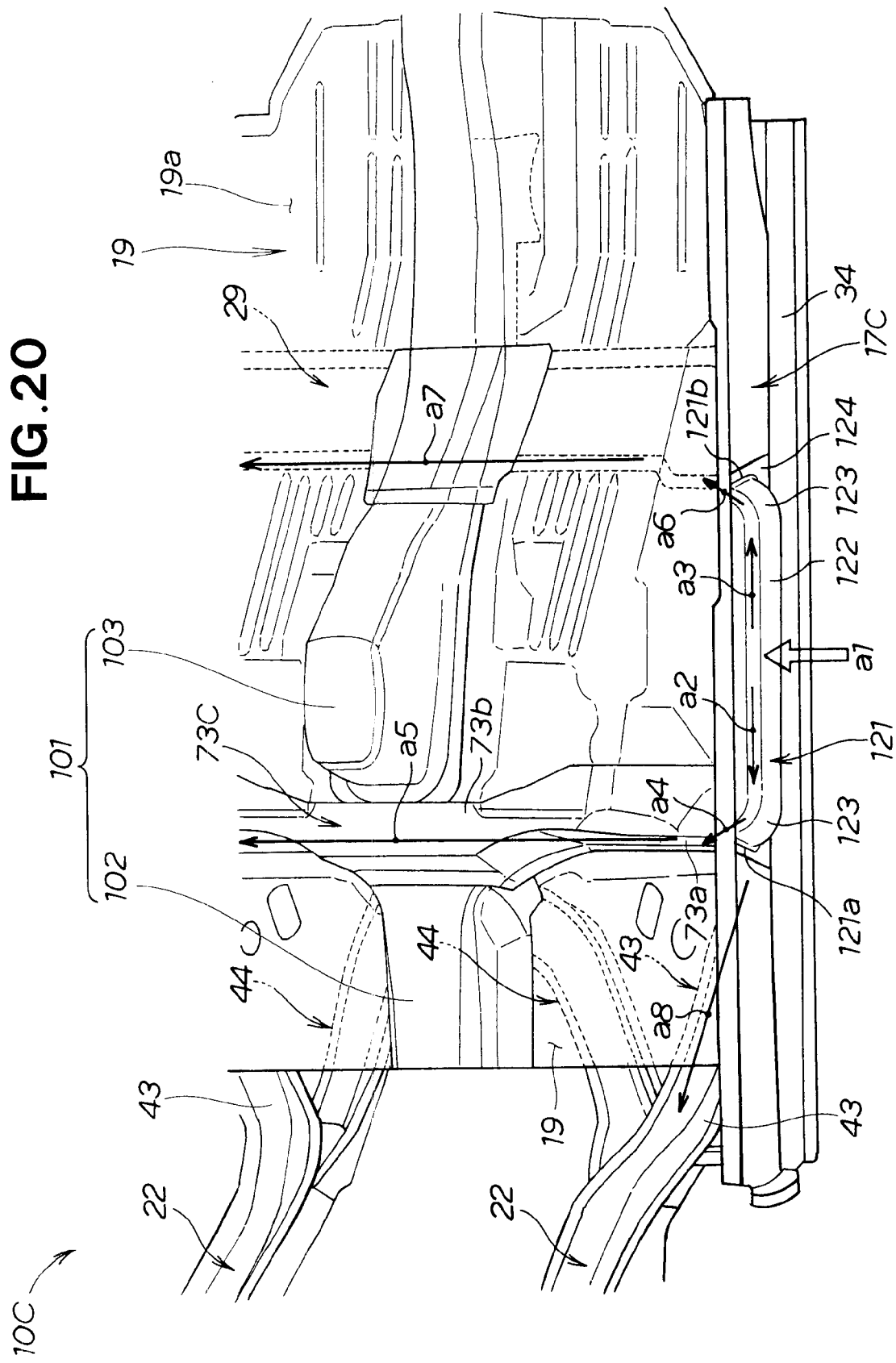
FIG. 20 illustrates the functioning of the left half of the front portion of the vehicle body shown in FIG. 19.

When an impact a1 acts on a side surface of the vehicle 10C in the widthwise direction thereof or what is called a lateral collision occurs, the impact a1 is transmitted from the side of the vehicle body 11 to the corresponding side sill 17C, as shown in FIG. 20. Further, the impact a1 is transmitted from the side sill inner portion 34 to the reinforcing member 121 and distributed to the front end 121a and the rear end 121b of the reinforcing member 121, as indicated by the arrows a2 and a3. The impact a1 distributed to the front end 121a is further distributed to the front cross-member 73C and the side-sill-side extension 43, as indicated by the arrows a4 and a8. The impact a1 distributed to the front cross-member 73C is transmitted to the right side sill inner portion 34 (see FIG. 1), as indicated by the arrow a5. The impact a1 distributed to the side-sill-side extension 43 is transmitted through the side frame extension 22 to the front side frame 16 (see FIG. 1). On the other hand, the impact a1 distributed to the rear end 121b is transmitted through the rear cross-member 29 to the right side sill inner portion 34 (see FIG. 1), as indicated by the arrows a6 and a7. The impact a1 produced by the lateral collision is thus efficiently transmitted to several members that form the vehicle body 11.

The fuel tank 21 is surrounded by the front and rear cross-members 73C, 29 and the left and right reinforcing members 121, 121. Accordingly, the vehicle body 11 has a greater capability of protecting the fuel tank 21 against an impact produced by a head-on or lateral collision, and sufficient protection can thus be provided.

Figure 56:
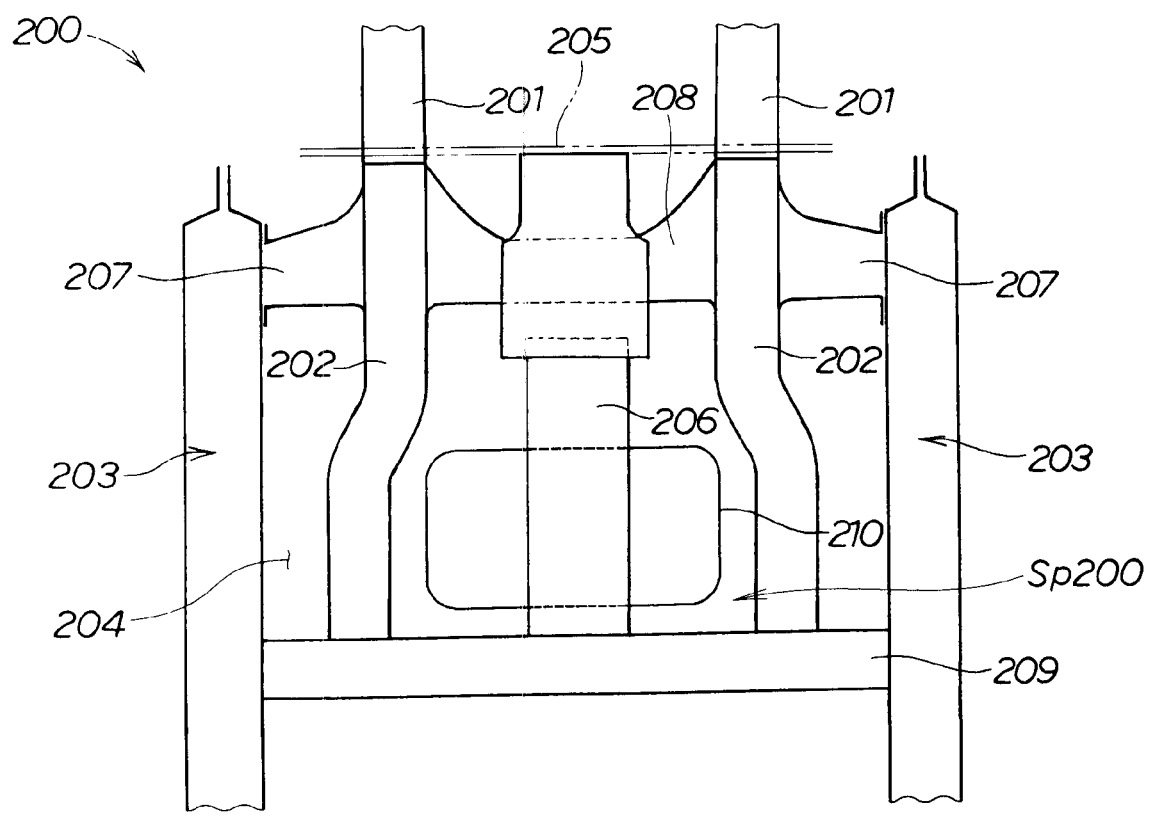
FIG. 56 is a schematic view illustrating a front portion of a conventional vehicle body.

In the vehicle body 200 of related art shown in FIG. 56, the fuel tank 210 is disposed in the narrow space Sp200 surrounded by the left and right floor frames 202, 202 and the front and rear cross-members 208, 207 under the front floor panel 204. Since the space Sp200 is narrow, the fuel tank 210 cannot have a wide, thin shape.

Figure 26:
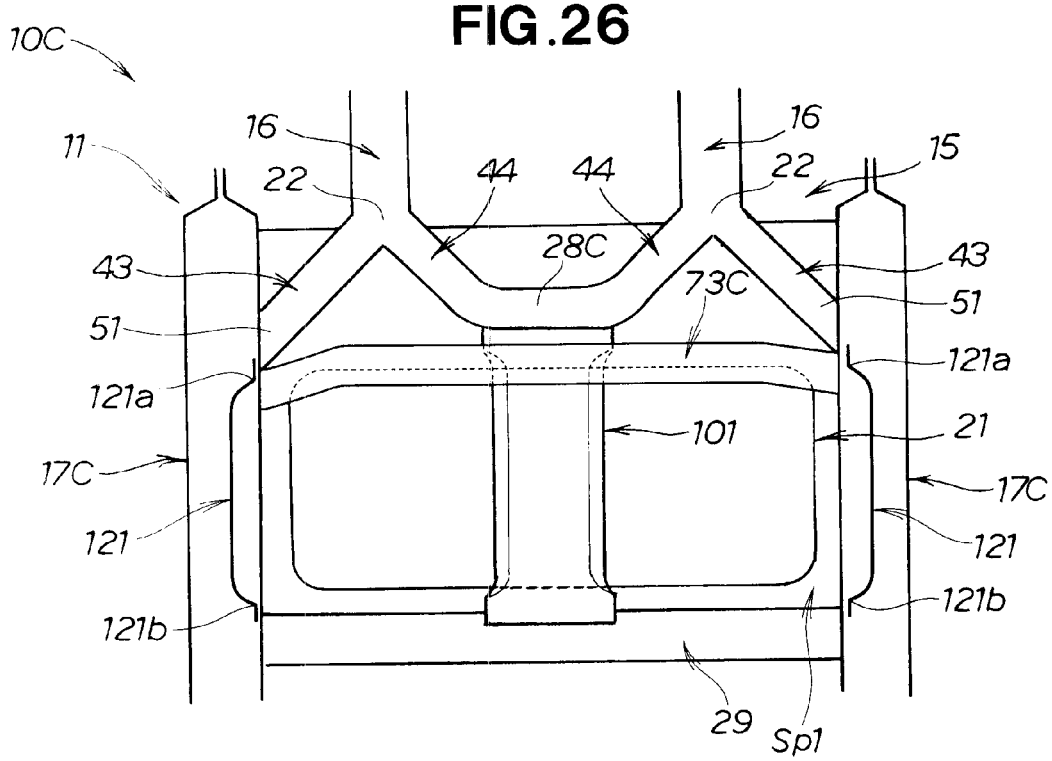
FIG. 26 is a bottom view diagrammatically showing the front portion of the vehicle body of FIG. 17.

FIG. 26 diagrammatically shows a front portion of the vehicle body 10C according to the fourth embodiment. In the fourth embodiment, the floor panel 19 has the raised portions 37, each of which is raised in the vehicle-width direction between the left and right side sill inner portions 34, 34 and under the front seat 41 and is formed of the front wall 37a, the upper wall 37b, and the rear inclined wall 37c; and the fuel tank 21 is disposed under the raised portions 37 between the left and right side sill inner portions 34, 34, as shown in FIG. 26. Further, the front cross-member 73C is provided between the left and right side sill inner portions 34, 34 away from the passenger compartment 13 side on the front wall 37a of the raised portion 37; the rear cross-member 29 is provided outside the compartment between the left and right side sill inner portions 34, 34 and below the rear inclined walls 37c of the raised portions 37; and the reinforcing members 121, 121 are provided outside the left and right side sill inner portions 34, 34.

Each of the reinforcing members 121 is so configured that the position of the front end 121a coincides with the position of the front standing wall 73a of the front cross-member 73C, which is part of the vehicle body skeleton, and the position of the rear end 121b coincides with the position of the front standing wall 29a, which is vertically longer than the rear standing wall 29b of the rear cross-member 29, which is part of the vehicle body skeleton, as shown in FIG. 23. An impact produced by a lateral collision can therefore be effectively distributed and transmitted to the front cross-member 73C and the rear cross-member 29. Further, the fuel tank 21 can be protected by disposing it in a rigid space Sp1 surrounded by the front and rear cross-members 73C and 29 and the side sill inner portions 34, 34 provided with the reinforcing members 121, 121. The fuel tank 21 can thereby be sufficiently protected from a lateral collision.

Each of the side frame extensions 22 bifurcates into the side-sill-side extension 43, which is connected to the corresponding side sill inner portion 34, and the tunnel-side extension 44, which is connected to the tunnel portion 101.

Further, since the position of the front end 121a of the reinforcing member 121 coincides with the position of the rear end 51 of the side-sill-side extension 43 (side sill connector 51) as shown in FIG. 24, an impact produced by a lateral collision can also be distributed from the side-sill-side extension 43 of the side frame extension 22 to the front side frame 16. As a result, lateral impact load transmission efficiency can be improved.

Further, the front end 121a and the rear end 121b of each of the reinforcing members 121 are supported by the front and rear cross-members 73C and 29. Since the reinforcing member 121 has an arch cross-sectional shape when viewed from above, when a lateral collision occurs in an arbitrary position in the longitudinal direction of the vehicle body, the impact is consistently distributed to the front and rear cross-members 73C and 29.

The above description of the fourth embodiment is summarized as follows. In the fourth embodiment, the left and right reinforcing members 121, 121 are provided on the vehicle-width outer surfaces 34a, 34a of the left and right side sill inner portions 34; the positions of the front ends 121a, 121a of the left and right reinforcing members 121, 121 coincide with the positions of the rear ends 51, 51 of the left and right side-sill-side extensions 43, 43; and the positions of the rear ends 121b, 121b of the left and right reinforcing members 121, 121 coincide with the position of the region of the rear cross-member 29. A lateral impact acting on the vehicle 10C can therefore be efficiently distributed to the corresponding side-sill-side extension 43 and the rear cross-member 29.

Further, in the fourth embodiment, the positions of the front ends 121a, 121a of the left and right reinforcing members 121, 121 coincide with the positions of portions of the front cross-member 73C as well as the positions of the rear ends 51, 51 of the left and right side-sill-side extensions 43, 43. A lateral impact acting on the vehicle 10C can therefore be efficiently distributed to the corresponding side-sill-side extension 43, the front cross-member 73C, and the rear cross-member 29.

Fifth Embodiment

A vehicle body structure according to a fifth embodiment is described with reference to FIG. 27. The vehicle body structure according to the fifth embodiment is characterized in that the left and right reinforcing members 121, 121 in the vehicle 10C according to the fourth embodiment shown in FIGS. 17, 23, and 26 are changed to left and right reinforcing members 121D, 121D in a vehicle 10D according to the fifth embodiment shown in FIG. 27. The other components are substantially the same as those shown in FIGS. 17 to 26 described above, and these components therefore have the same reference characters and are not described.

Figure 27:
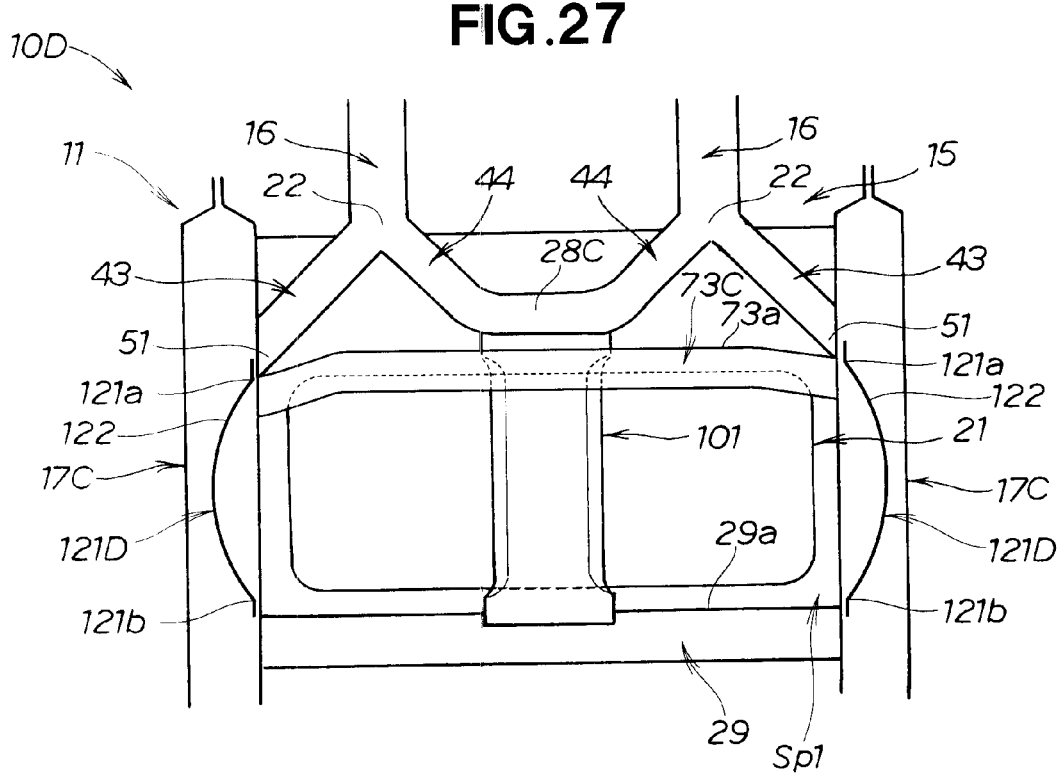
FIG. 27 diagrammatically shows the bottom of a front portion of a vehicle body according to a fifth embodiment of the present invention.

The left and right reinforcing members 121D, 121D in the fifth embodiment are so formed that entire bodies 122, 122 from front ends 121a, 121a to rear ends 121b, 121b have an arcuate cross-sectional shape when viewed from above, that is, an arch cross-sectional shape curved as a whole along the longitudinal direction of the vehicle body, as shown in FIG. 27. An impact produced by a lateral collision can therefore be efficiently distributed from the corresponding side sill 17C through the reinforcing member 121D to the side-sill-side extension 43, the front cross-member 73C, and the rear cross-member 29.

Sixth Embodiment

A vehicle body structure according to a sixth embodiment is described with reference to FIGS. 28 to 35. A vehicle body 11 of a vehicle 10E according to the sixth embodiment shown in FIGS. 28 to 35 differs from the vehicle body 11 of the vehicle 10C according to the fourth embodiment shown in FIGS. 17 to 26 in terms of the following two points. The other components are substantially the same as those shown in FIGS. 17 to 26 described above, and these components therefore have the same reference characters and are not described. A first difference is that the left and right side sills 17C, 17C shown in FIG. 17 are changed back to the left and right side sills 17, 17 shown in FIG. 28. A second difference is that the front cross-member 73C shown in FIG. 18 is omitted.

Figure 33:
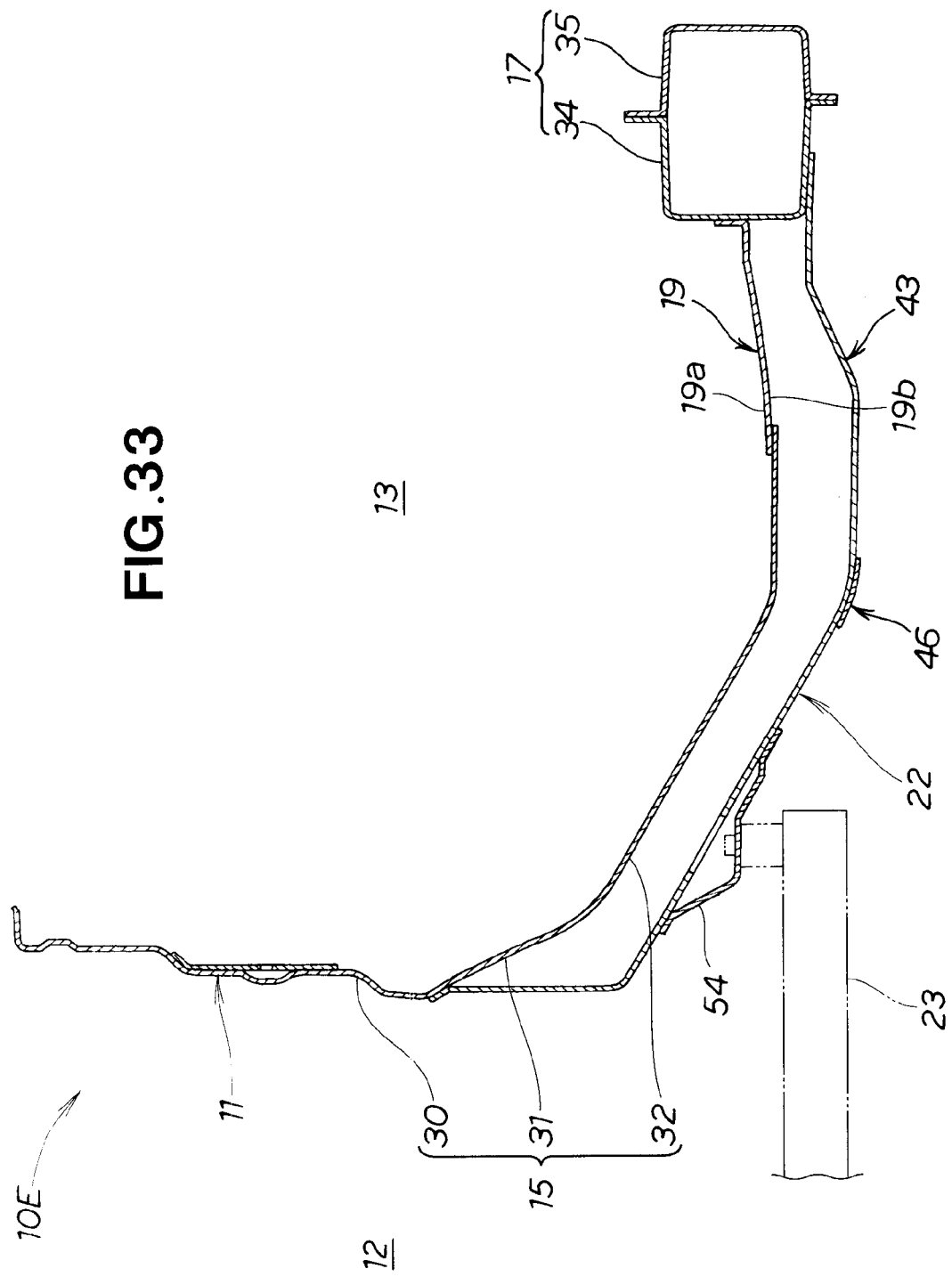
FIG. 33 is a cross-sectional view taken along line 33-33 of FIG. 28.
Figure 34:
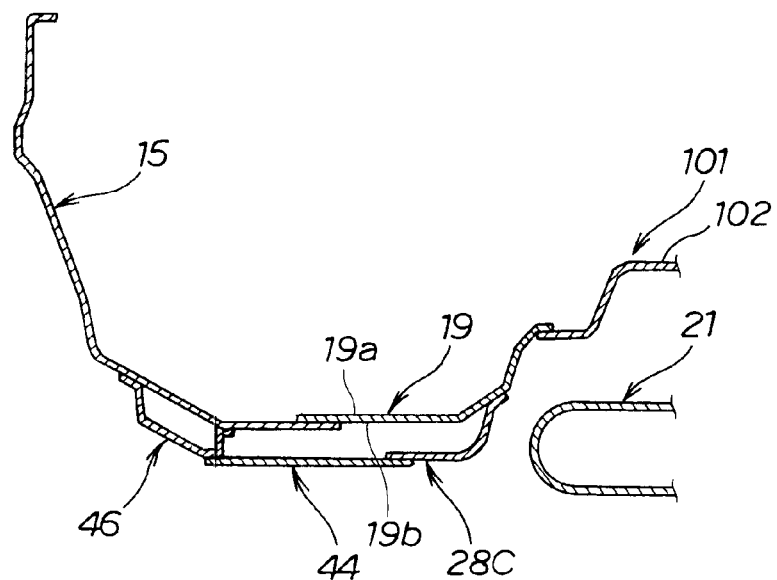
FIG. 34 is a cross-sectional view taken along line 34-34 of FIG. 28.
Figure 35:
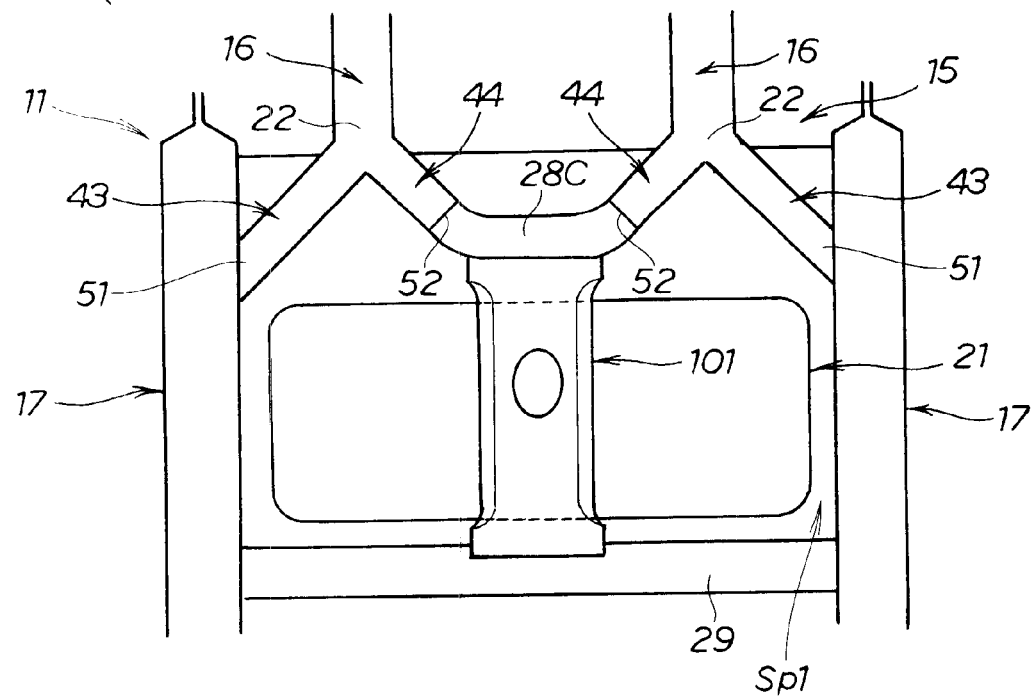
FIG. 35 is a bottom view diagrammatically showing the front portion of the vehicle body of FIG. 28.

A rear end portion of the sub-frame 23 indicated by the phantom line is detachably attached to the lower ends of the sub-frame attaching portions 54 by mounting members, as shown in FIG. 33. The side frame extensions 22 can receive a load transmitted from the sub-frame 23 and efficiently distribute the load to the side-sill-side extensions 43 (see FIG. 31) and the tunnel-side extensions 44 (see FIGS. 28, 29, and 34).

Figure 28:
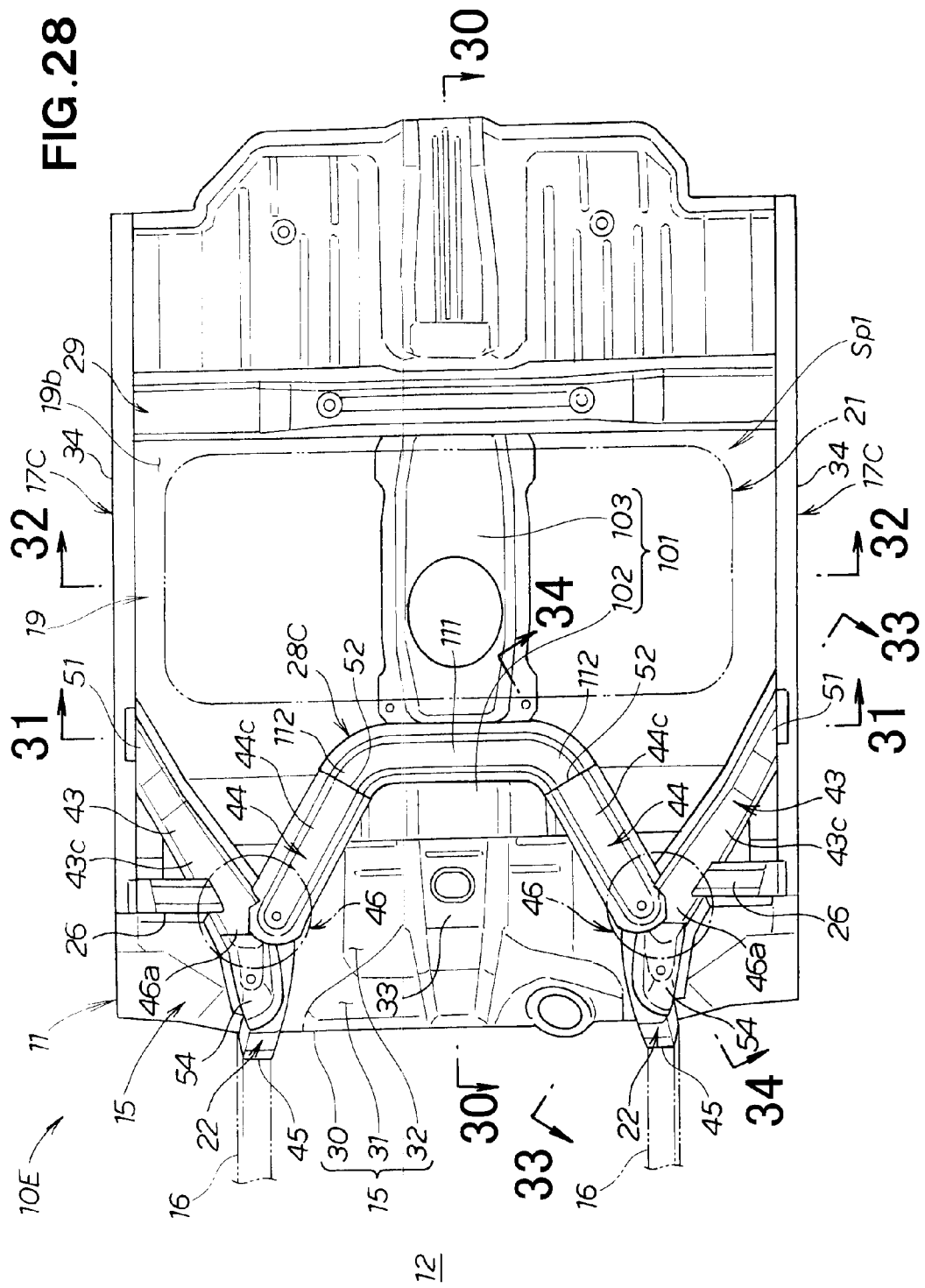
FIG. 28 is a bottom view of a front portion of a vehicle body according to a sixth embodiment of the present invention.
Figure 29:
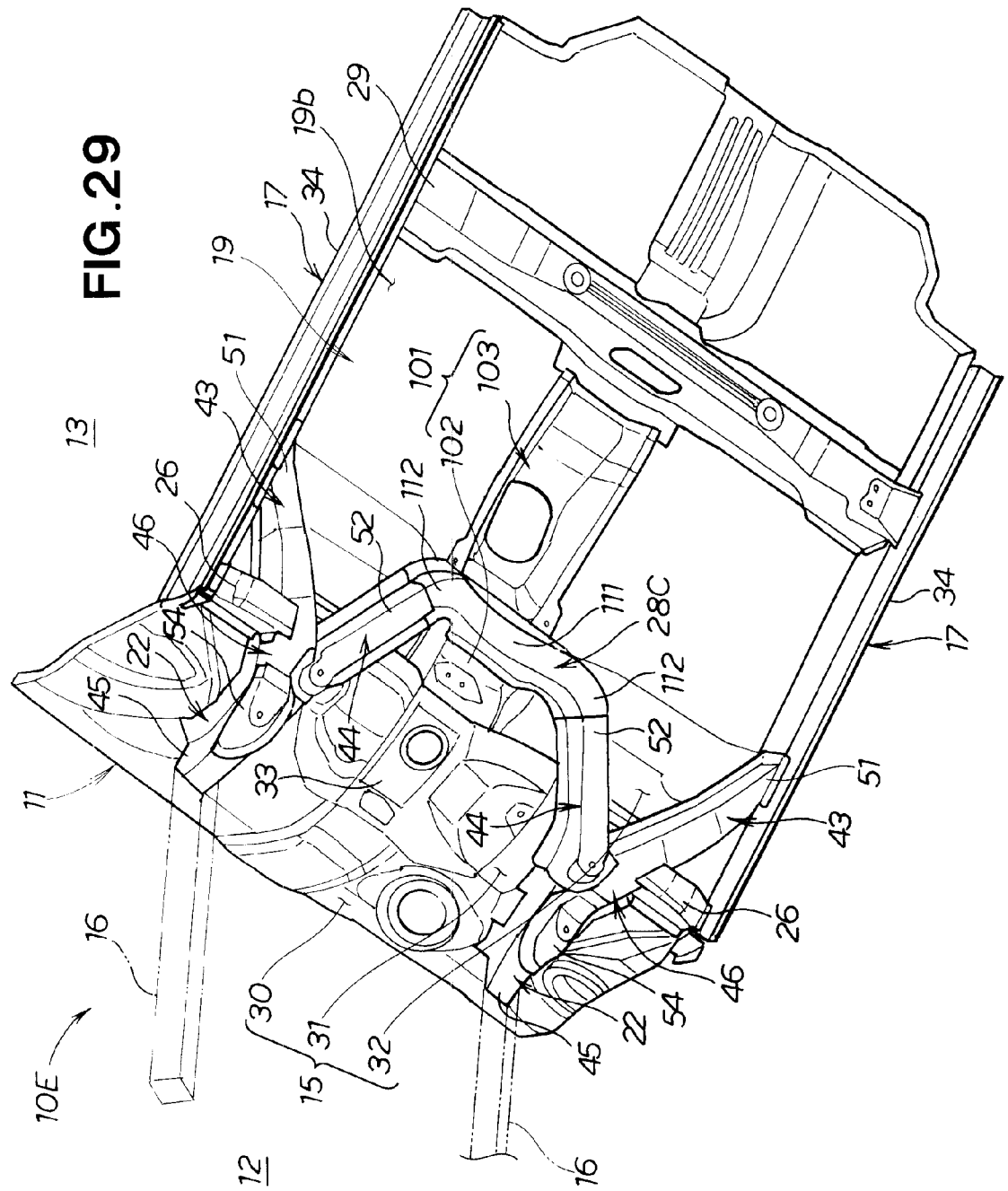
FIG. 29 is a perspective view of the front portion of the vehicle body according to the sixth embodiment of the present invention, as viewed downward and to the front.
Figure 30:
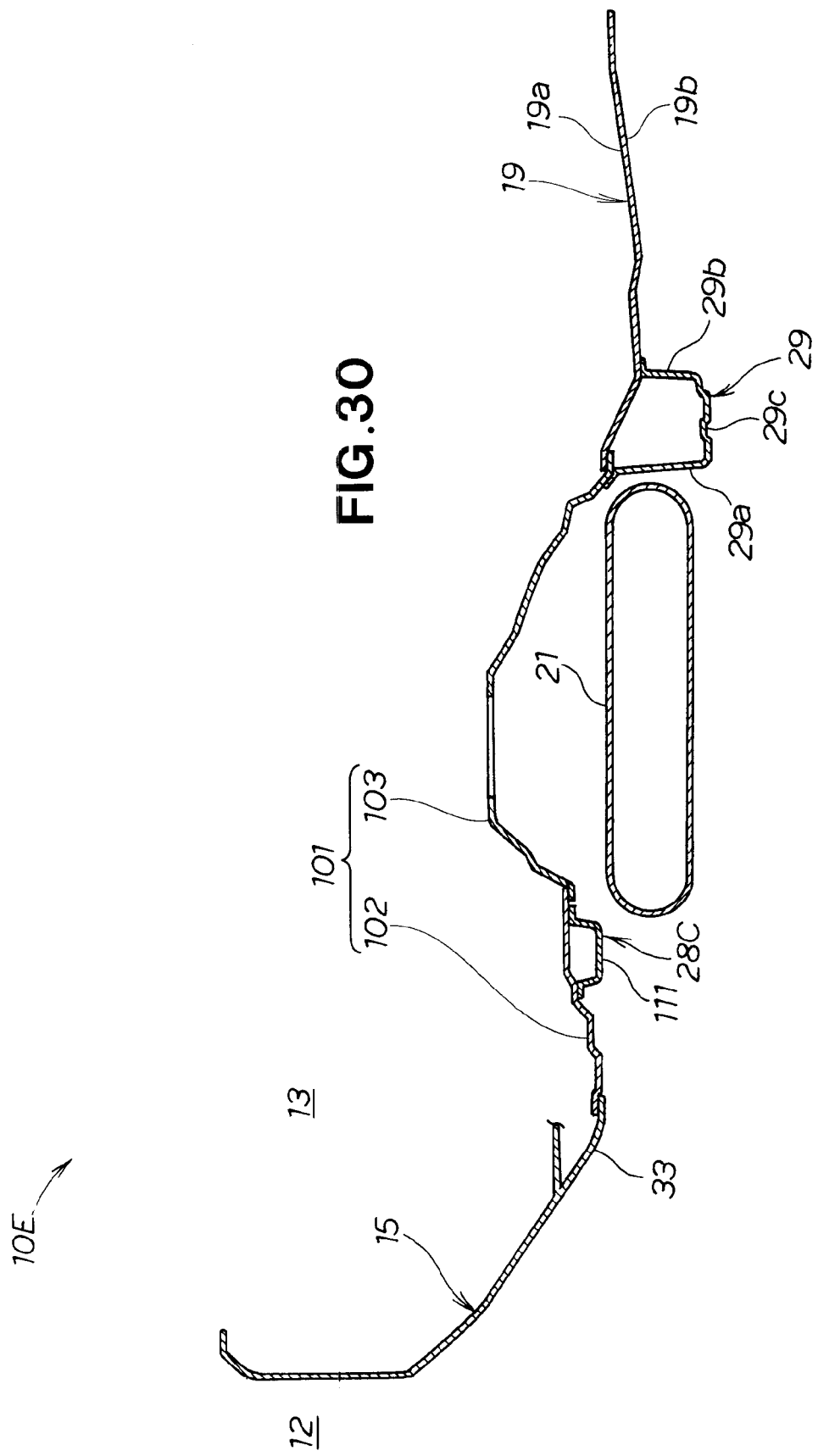
FIG. 30 is a cross-sectional view taken along line 30-30 of FIG. 28.
Figure 31:
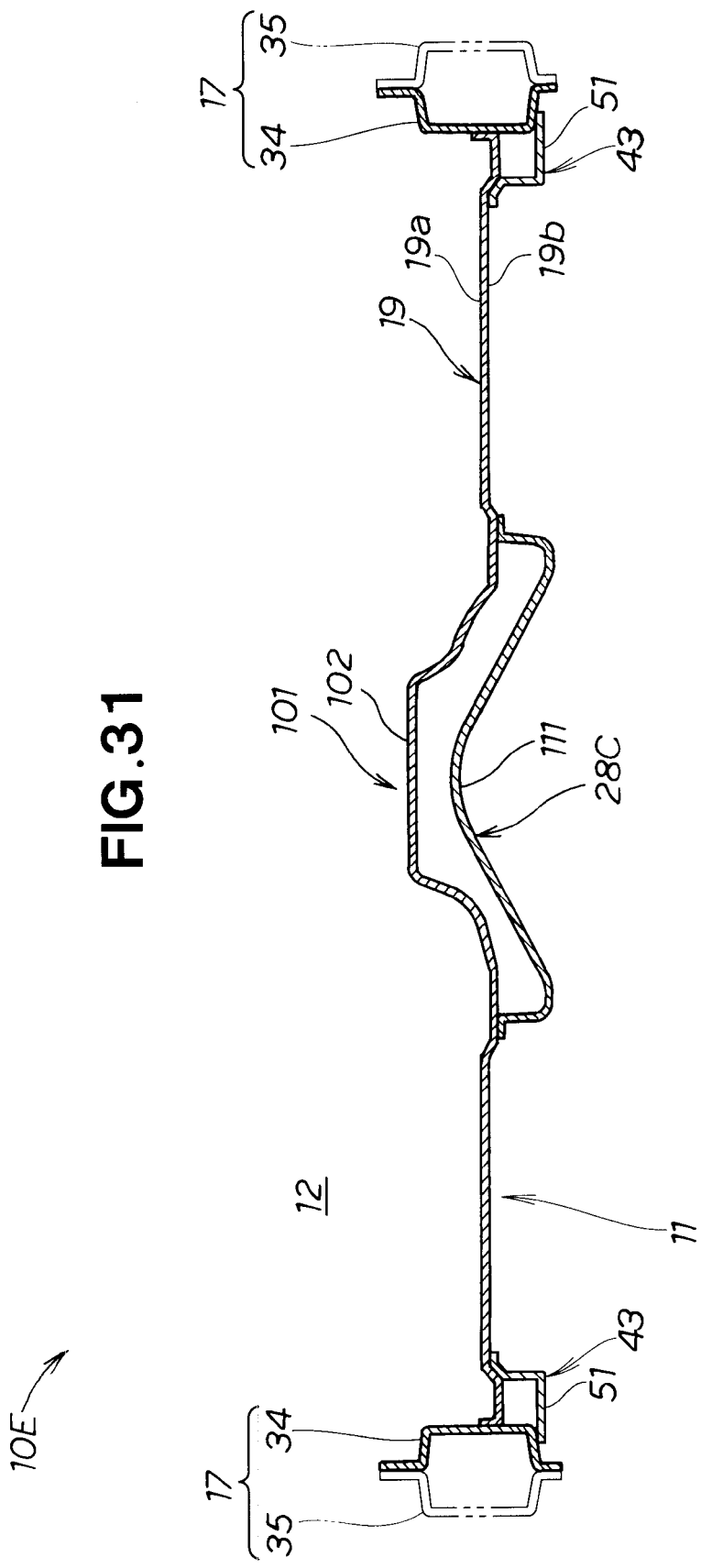
FIG. 31 is a cross-sectional view taken along line 31-31 of FIG. 28.
Figure 32:
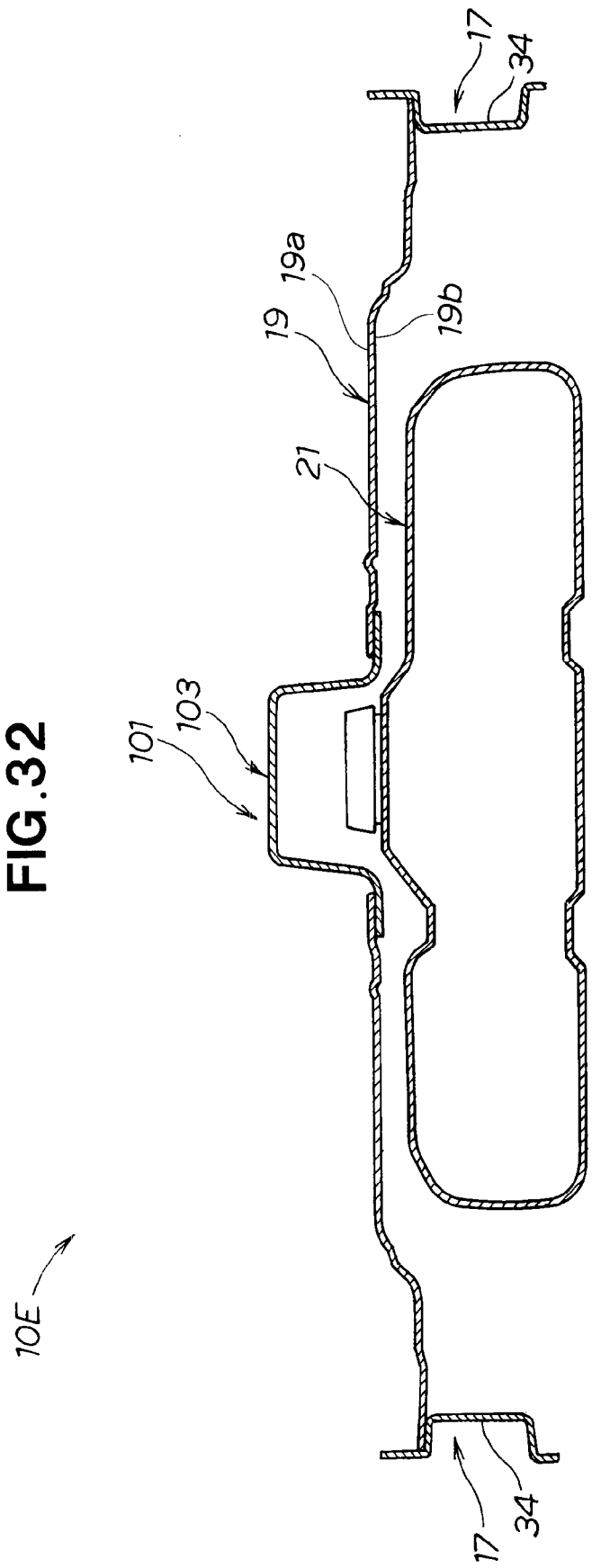
FIG. 32 is a cross-sectional view taken along line 32-32 of FIG. 28.

In a space in front of and above the fuel tank 21, the connecting portions 52, 52 of the left and right tunnel-side extensions 44, 44 are bonded to a front portion of the tunnel portion 101 via the tunnel cross-member 28C, as shown in FIGS. 28 to 30 and FIG. 35. Since the tunnel cross-member 28C is bonded along the lower surface of the tunnel portion 101, a front impact can be transmitted to the entire tunnel portion 101. Further, the vehicle body 11 has no floor frame, which is provided in a typical vehicle body, as shown in FIG. 28.

The strength and rigidity of the tunnel portion 101 are greater than the strength and rigidity of the floor panel 19. For example, the plate thickness of the tunnel portion 101 is set to be greater than the plate thickness of the floor panel 19, or/and the material of the tunnel portion 101 is selected to be stronger and more rigid than the material of the floor panel 19, for example, the tunnel portion 101 is made of a high-tensile steel plate, whereby the weight of the vehicle body 11 can be reduced. Further, members of lower strength and rigidity are not used with members of higher strength and rigidity; therefore, the vehicle body 11 is readily manufactured.

Figure 36:
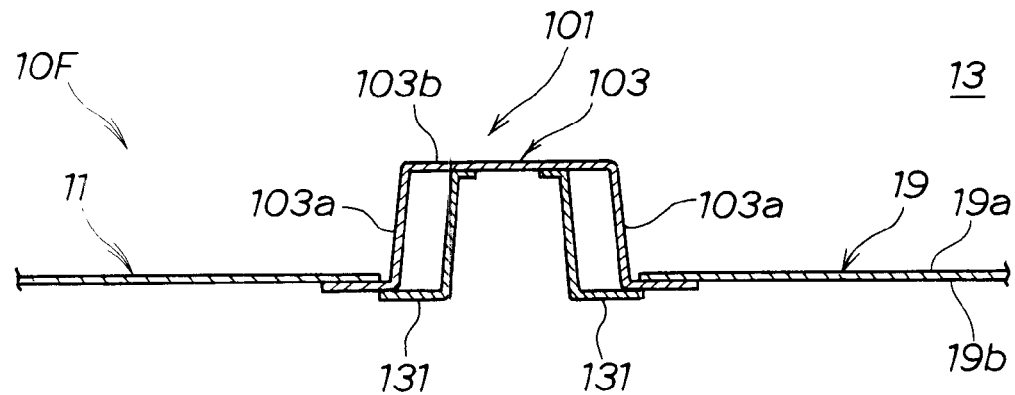
FIG. 36 is a cross-sectional view of a tunnel portion of a vehicle body according to a seventh embodiment of the present invention.
Figure 37:
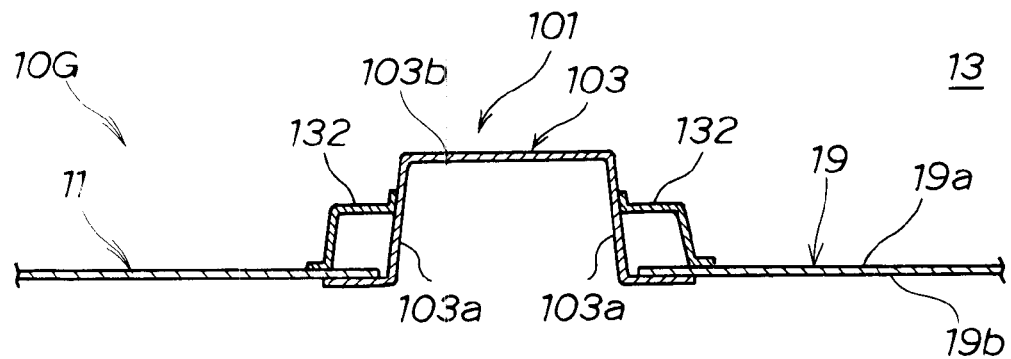
FIG. 37 is a cross-sectional view of a tunnel portion of a vehicle body according to an eighth embodiment of the present invention.
Figure 38:
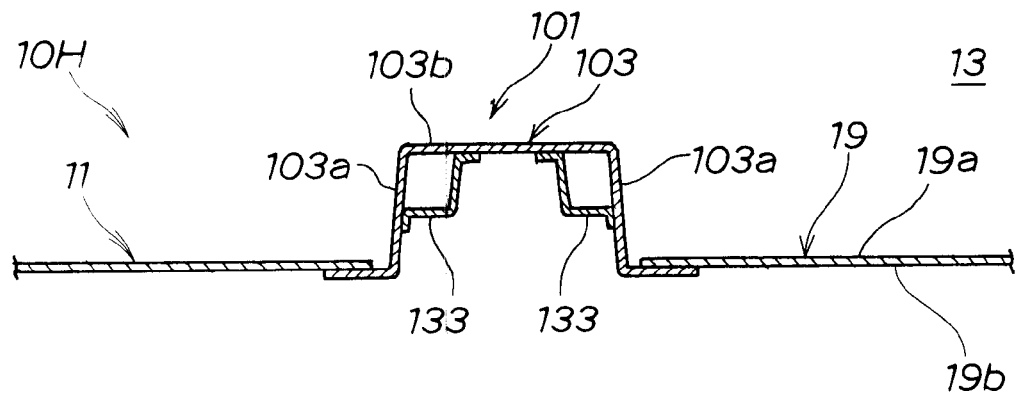
FIG. 38 is a cross-sectional view of a tunnel portion of a vehicle body according to a ninth embodiment of the present invention.

Vehicle body structures according to seventh, eighth, and ninth embodiments are next described. The seventh to ninth embodiments are characterized in that the rear tunnel body 103 of the tunnel portion 101 is reinforced as shown in FIGS. 36 to 38. The other components are substantially the same as those in the sixth embodiment shown in FIGS. 28 to 35 described above, and these components therefore have the same reference characters and are not described.

Seventh Embodiment

A vehicle body 11 of a vehicle 10F according to the seventh embodiment has left and right tunnel stiffeners 131, 131 that are disposed in the rear tunnel body 103 having a rough inverted U shape and reinforce the rear tunnel body 103, as shown in FIG. 36. The rear tunnel body 103 is formed of left and right vertical side plates 103a, 103a, and a horizontal upper plate 103b that closes the space between upper ends of the left and right side plates 103a, 103a. The left and right tunnel stiffeners 131, 131, each of which is a member extending along the rear tunnel body 103 and having a substantially reversed Z-shaped cross-section, are set apart from the left and right vertical side plates 103a, 103a by predetermined gaps and bonded to the rear tunnel body 103. As a result, the left vertical side plate 103a, the upper plate 103b, and the left tunnel stiffener 131 form a left closed cross-section. A right closed cross-section is formed in the same manner.

Eighth Embodiment

A vehicle body 11 of a vehicle 10G according to the eighth embodiment has left and right tunnel stiffeners 132, 132 that are disposed on the left and right outer surfaces of the rear tunnel body 103 and reinforce the rear tunnel body 103, as shown in FIG. 37. The left and right tunnel stiffeners 132, 132, each of which is a member extending along the rear tunnel body 103 and having a substantially inverted L-shaped cross-section, are so positioned that they cover the corners formed by the upper surface 19a of the floor panel 19 and the outer surfaces of the left and right side plates 103a, 103a and are bonded thereto. As a result, a closed cross-section is formed at each of the left and right corners.

Ninth Embodiment

A vehicle body 11 of a vehicle 10H according to the ninth embodiment has left and right tunnel stiffeners 133, 133 that are disposed in the rear tunnel body 103 and reinforce the rear tunnel body 103, as shown in FIG. 38. The left and right tunnel stiffeners 133, 133, each of which is a member extending along the rear tunnel body 103 and having a substantially inverted L-shaped cross-section, are so positioned that they cover the corners formed by the inner surfaces of the left and right side plates 103a, 103a and the inner surface of the upper plate 103b and are bonded thereto. As a result, a closed cross-section is formed at each of the left and right corners.

As described above, the tunnel portions 101 in the seventh to ninth embodiments are reinforced by the tunnel stiffeners 131, 132, and 133, which are disposed in positions higher than the floor panel 19. The tunnel stiffeners 131, 132, and 133 extend along the longitudinal direction of the tunnel portions 101 so as to form, along with the tunnel portions 101, closed cross-sections. The strength and rigidity of any of the tunnel portions 101 is therefore increased. The strength and rigidity of any of the tunnel portions 101 is greater than the strength and rigidity of the floor panel 19. The high-strength, high-rigidity tunnel portion 101 is strong and rigid enough to receive a front impact transmitted from the tunnel-side extensions 44. A greater amount of the front impact can therefore be distributed to any of the tunnel portions 101.

Further, the tunnel stiffeners are provided above the floor panel. The closed cross-sections formed by the tunnel stiffeners 131, 132, 133 and the tunnel portions 101 therefore do not protrude downward beyond the floor panel 19. Therefore, none of the tunnel stiffeners 131, 132, 133 interfere with the fuel tank 21, even when the fuel tank 21 is disposed under the tunnel portion 101. The capacity of the fuel tank 21 can therefore be large enough without any loss.

Tenth Embodiment

Figure 39:
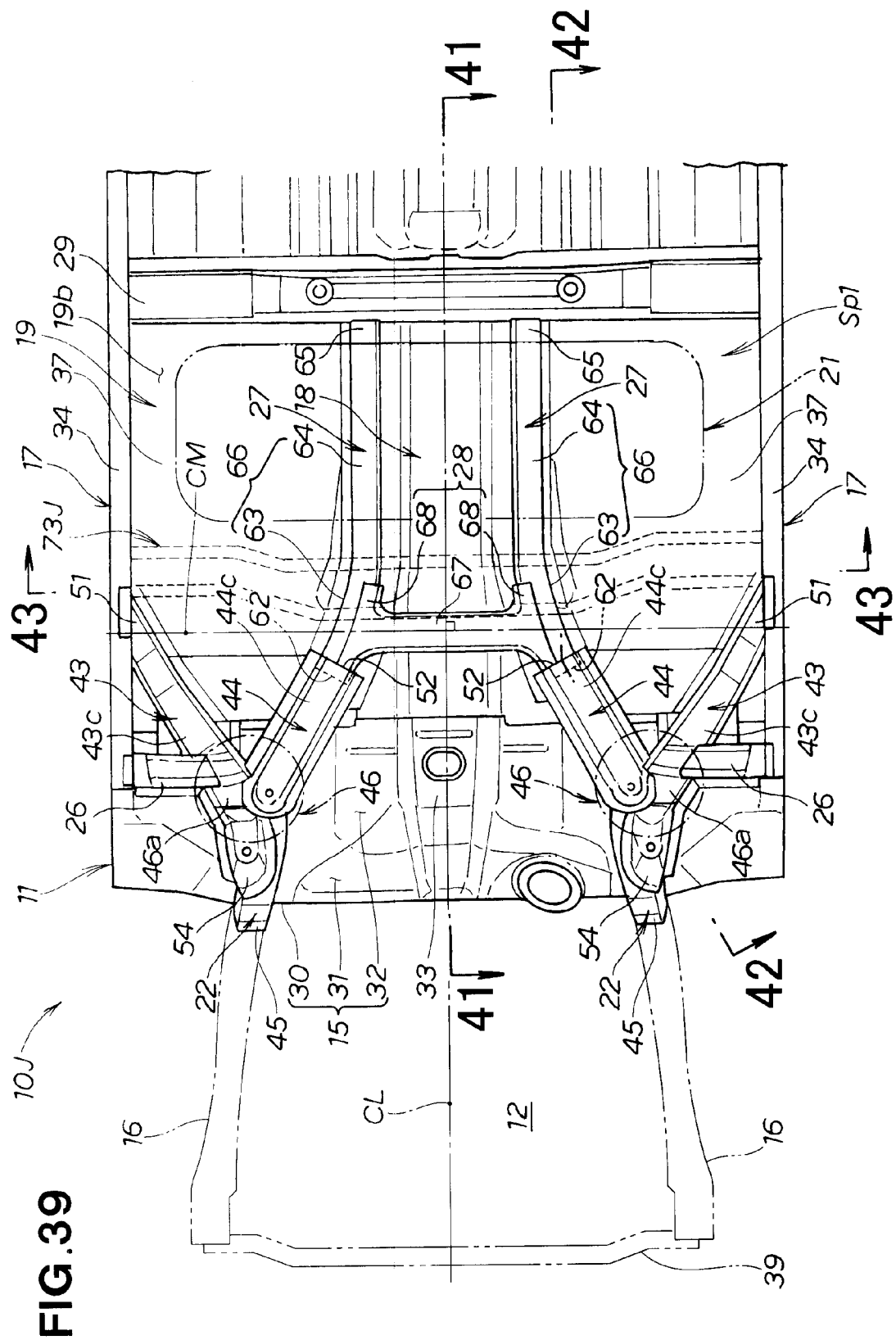
FIG. 39 is a bottom view of a front portion of a vehicle body according to a tenth embodiment of the present invention.
Figure 40:
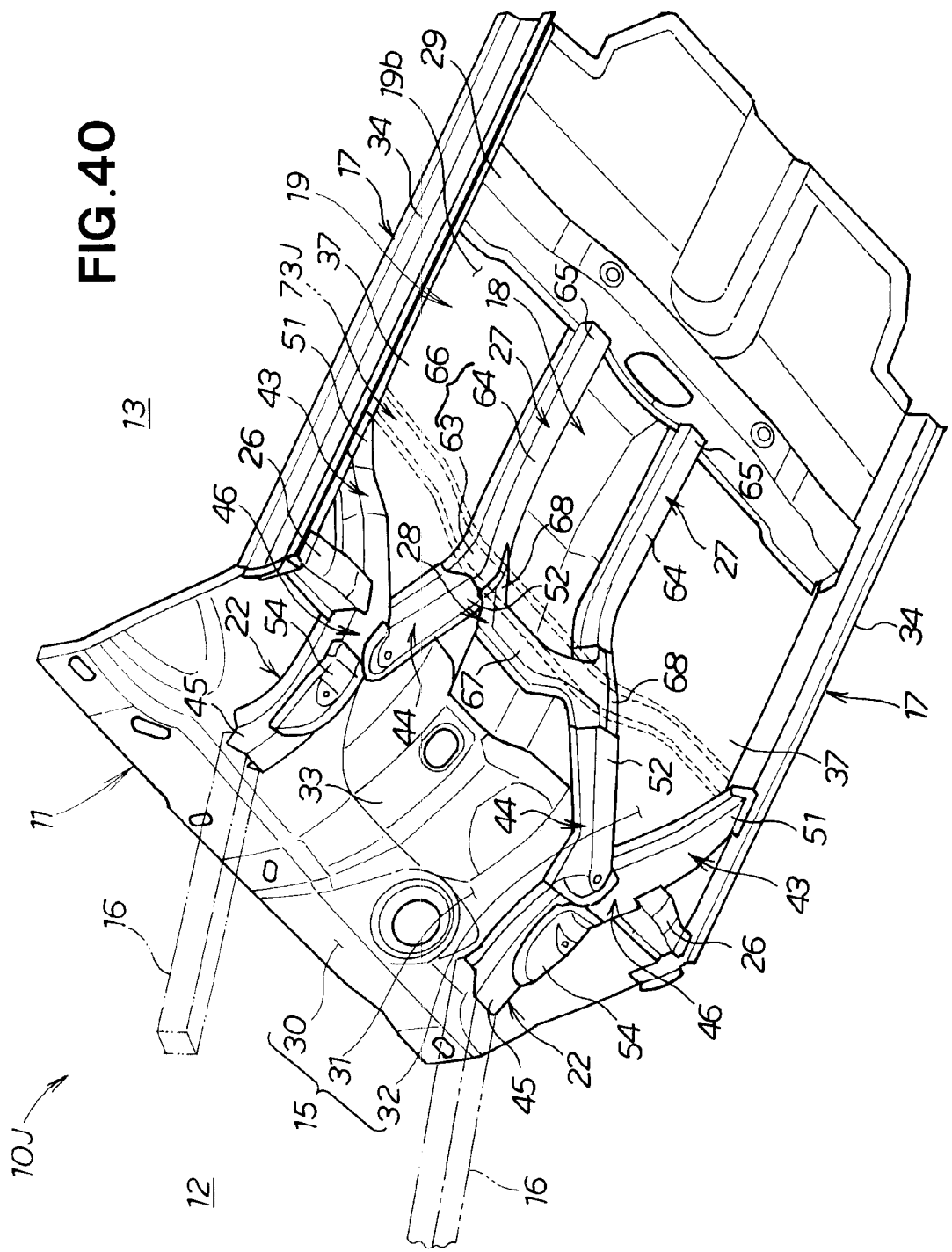
FIG. 40 is a perspective view of the front portion of the vehicle body according to the tenth embodiment of the present invention, as viewed downward and to the front.

A vehicle body structure according to a tenth embodiment is described with reference to FIGS. 39 to 44. A vehicle body 11 of a vehicle 10J according to the tenth embodiment shown in FIG. 39 is characterized in that a front cross-member 73J is added to the vehicle body 11 of the vehicle 10 according to the first embodiment shown in FIG. 1. The other components are substantially the same as those shown in FIGS. 1 to 11, and these components therefore have the same reference characters and are not described.

Figure 41:
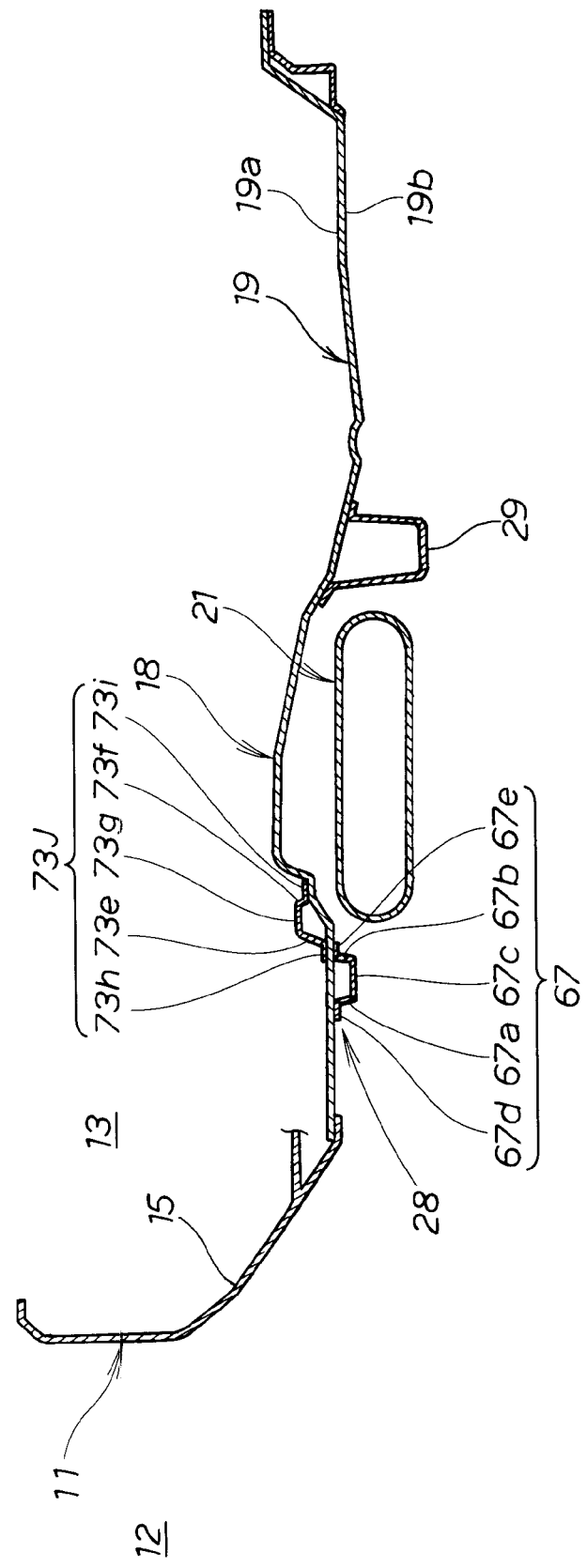
FIG. 41 is a cross-sectional view taken along line 41-41 of FIG. 39.

Although described above, the tunnel cross-member 28 has a substantially hat-shaped cross-section open toward the lower surface 19b of the floor panel 19, as shown in FIGS. 39 and 41. The upper end of the tunnel cross-member 28 is bonded to the lower surface 19b of the floor panel 19, thereby forming a rectangular closed cross-section. Specifically, the body 67 of the tunnel cross-member 28 is formed of a front standing wall 67a facing the front of the vehicle body, a rear standing wall 67b facing the rear of the vehicle body, a bottom wall 67c that connects the lower end of the front standing wall 67a to the lower end of the rear standing wall 67b, a front flange 67d extending forward from the upper end of the front standing wall 67a, and a rear flange 67e extending rearward from the upper end of the rear standing wall 67b. The front flange 67d and the rear flange 67e are placed on and bonded to the lower surface 19b of the floor panel 19 and the lower surface 18a of the tunnel portion 18. The left and right connectors 68, 68 of the tunnel cross-member 28 also have the same configuration as that of the body 67.

The front cross-member 73J runs between the left and right side sill inner portions 34, 34 and is bonded to the upper surface 19a of the floor panel 19, as shown in FIGS. 39 to 42. That is, the front cross-member 73J is located behind the left and right tunnel-side extensions 44, 44 and extends in the vehicle-width direction in the passenger compartment 13. The front cross-member 73J is also called an in-compartment cross-member because it is located in the passenger compartment 13.

The overall shape of the front cross-member 73J is so curved that a vehicle-width direction center thereof is convex toward the front of the vehicle body in a bottom view, as shown in FIG. 39. That is, the vehicle-width direction center portion of the front cross-member 73J is adjacent to the body 67 of the tunnel cross-member 28 and extends therealong in the vehicle-width direction. Both ends of the front cross-member 73J on the outer side in the vehicle-width direction are so positioned that at least part of the ends overlaps with the left and right side sill bonded portions 51, 51.

Figure 42:
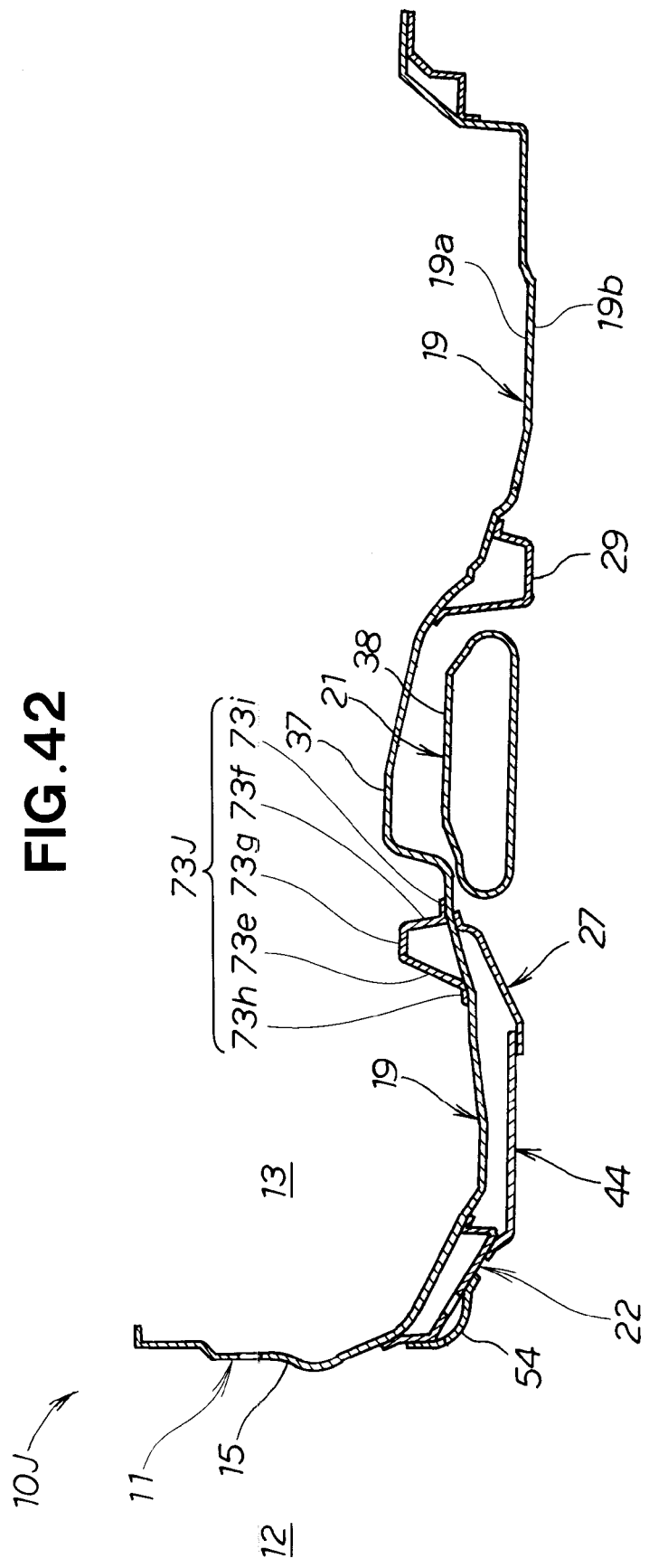
FIG. 42 is a cross-sectional view taken along line 42-42 of FIG. 39.

The front cross-member 73J has a hat-shaped cross-section which opens downward, and the open end is placed on and bonded to the upper surface 19a of the floor panel 19 from above, as shown in FIGS. 41 and 42. The lower end of the front cross-member 73J is bonded to the upper surface 19a of the floor panel 19, thereby forming a rectangular closed cross-section. More specifically, the front cross-member 73J is formed of a front standing wall 73e facing the front side of the vehicle body, a rear standing wall 73f facing the rear side of the vehicle body, a bottom (upper) wall 73g that connects the upper end of the front standing wall 73e to the upper end of the rear standing wall 73f, a front flange 73h (first flange 73h) extending forward from the lower end of the front standing wall 73e, and a rear flange 73i extending rearward from the lower end of the rear standing wall 73f. The front flange 73h and the rear flange 73i are placed on and bonded to the upper surface 19a of the floor panel 19. The front flange 73h and the rear flange 73i are called first flanges 73h, 73i as appropriate.

Figure 43:
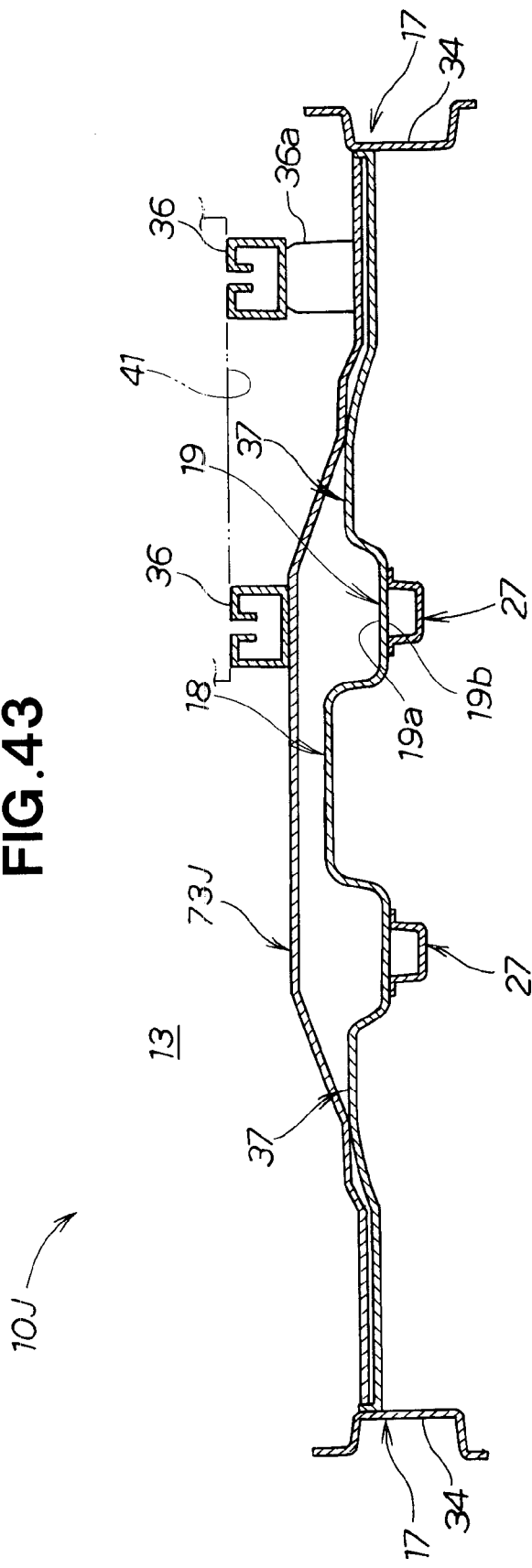
FIG. 43 is a cross-sectional view taken along line 43-43 of FIG. 39.
Figure 44:
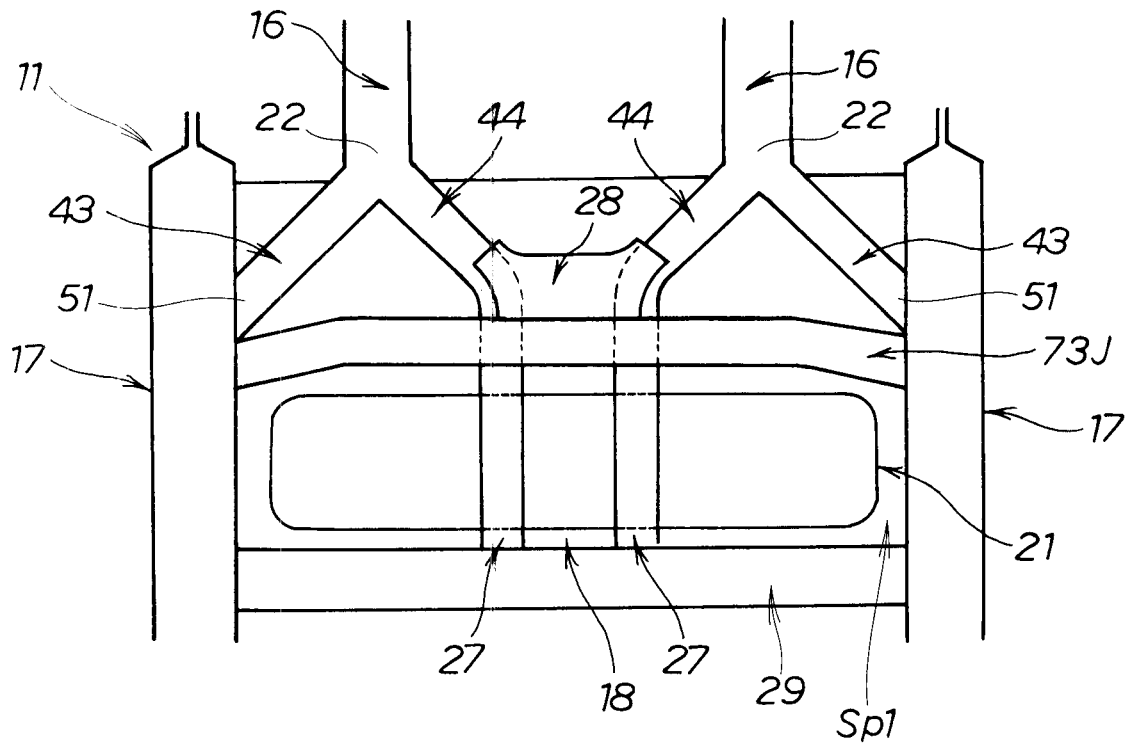
FIG. 44 is a bottom view diagrammatically showing the front portion of the vehicle body of FIG. 39.

Front portions of the seat rails 36, 36 are attached to the front cross-member 73J via seat brackets 36a, as shown in FIG. 43. A downward load acting on a front portion of the front seat 41 (see FIGS. 7 and 43) when a head-on collision occurs can thus reduce the degree to which the front seat 41 recedes.

The description of the tenth embodiment is summarized as follows. In the tenth embodiment, the front cross-member 73J runs between the left and right side sills 17, 17 along the upper surface 19a of the floor panel 19 and is positioned in, or is adjacent to, a portion of the tunnel cross-member 28 via the floor panel 19. A lateral impact can therefore be efficiently distributed from one of the side sills 17 through the front cross-member 73J to the other side sill 17, the tunnel cross-member 28, and the tunnel portion 18.

Eleventh Embodiment

A vehicle body structure according to an eleventh embodiment is described with reference to FIGS. 45 to 47. A vehicle body 11 of a vehicle 10K according to the eleventh embodiment shown in FIGS. 45 to 47 differs from the vehicle body 11 of the vehicle 10J according to the tenth embodiment shown in FIG. 39 in terms of the following two points. The other components are substantially the same as those shown in FIGS. 39 to 44 described above, and these components therefore have the same reference characters and are not described. A first difference is that the front cross-member 73J shown in FIGS. 39 and 42 is changed to a front cross-member 73K shown in FIG. 47. A second difference is that left and right divided cross-members 152, 152 shown in FIG. 45 are added.

Figure 45:
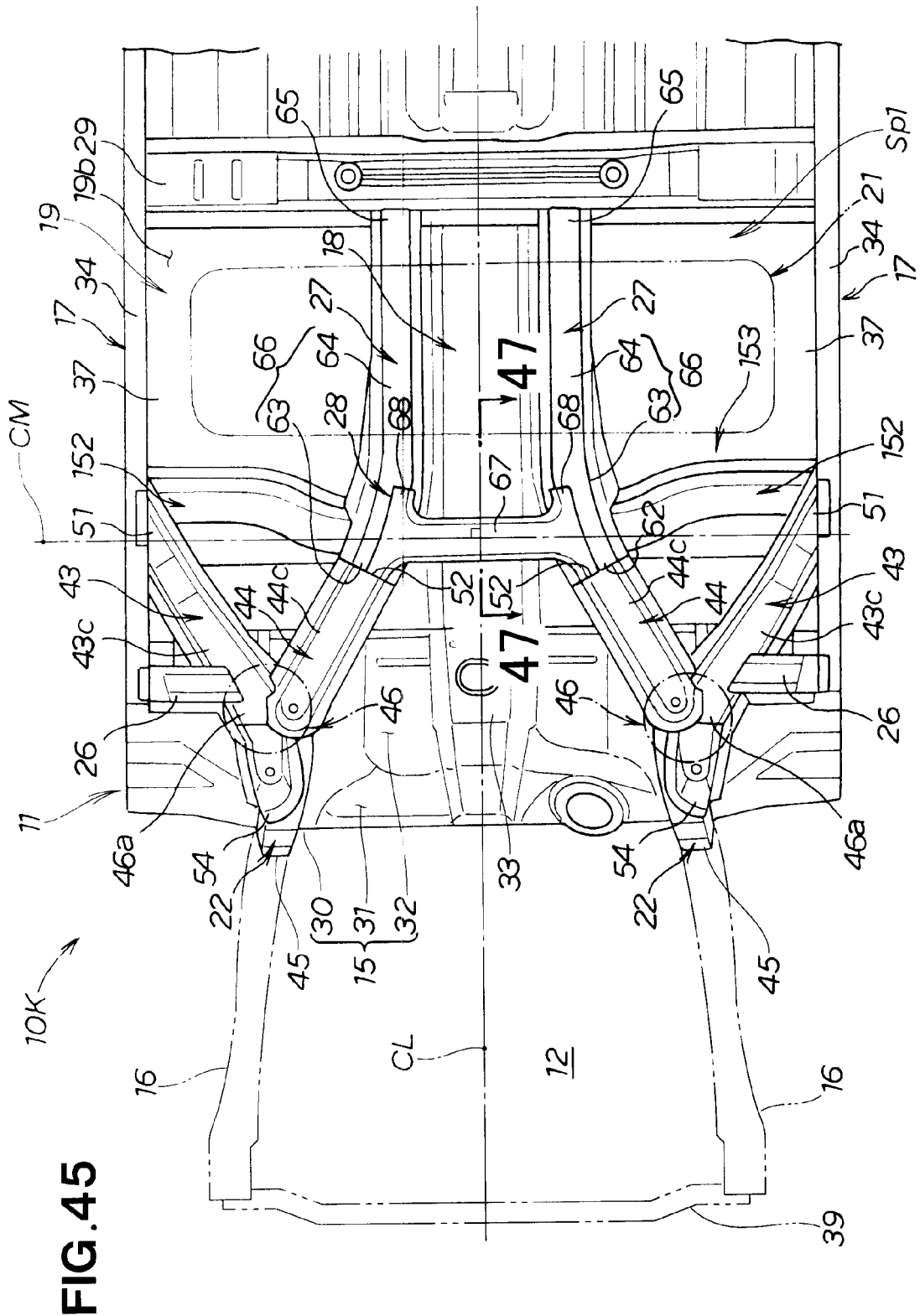
FIG. 45 is a bottom view of a front portion of a vehicle body according to an eleventh embodiment of the present invention.
Figure 46:
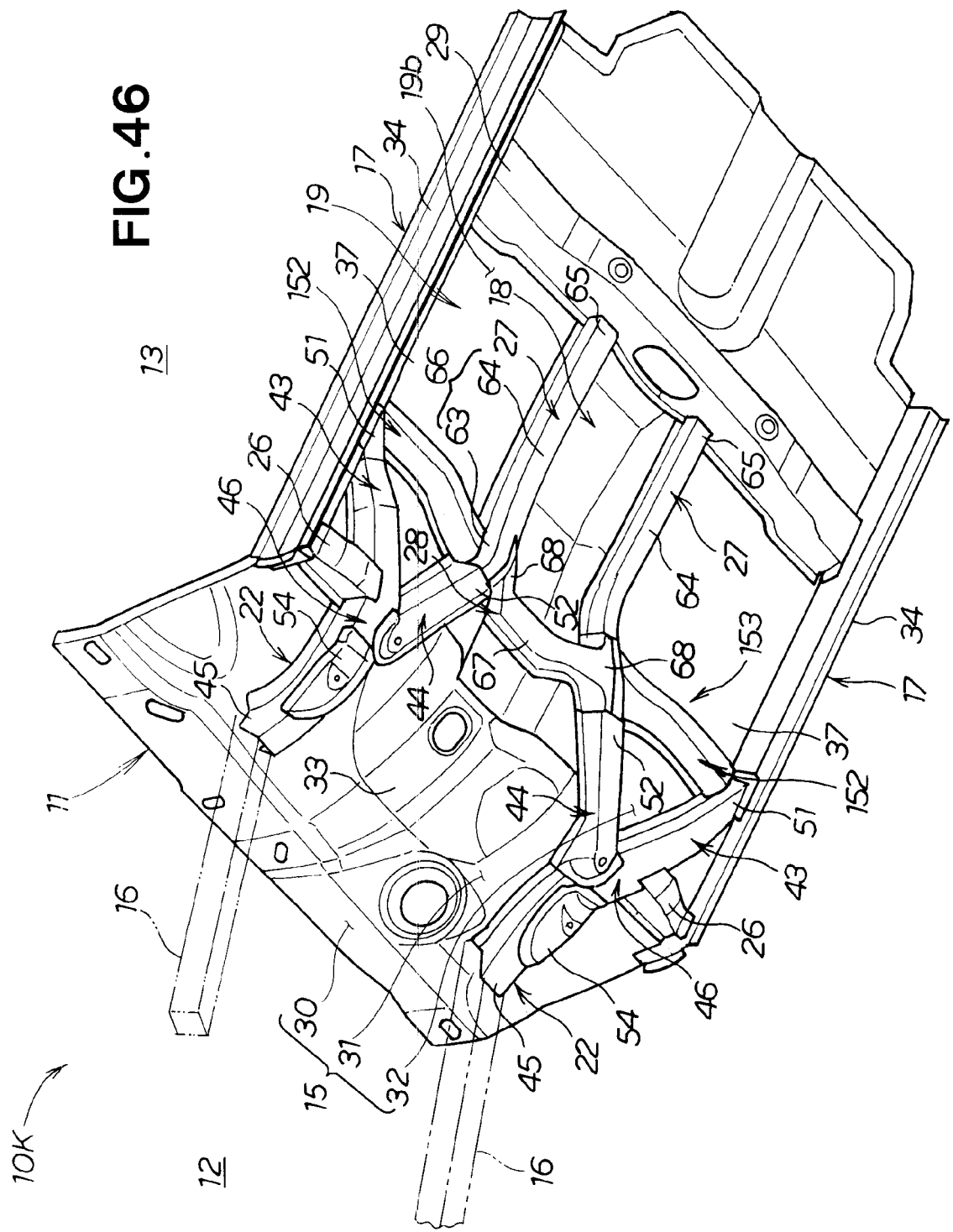
FIG. 46 is a perspective view of the front portion of the vehicle body according to the eleventh embodiment of the present invention, as viewed upward and rearward.

The left and right divided cross-members 152, 152 run between the respective front curved portions 63, 63 of the left and right tunnel frames 27, 27 and the left and right side sills 17, 17 and are placed on and bonded to the lower surface 19b of the floor panel 19, as shown in FIGS. 45 and 46. The ends of the left and right divided cross-members 152, 152 on the inner side in the vehicle-width direction are so positioned that they face the respective ends of the body 67 of the tunnel cross-member 28. The ends of the left and right divided cross-members 152, 152 on the outer side in the vehicle-width direction are positioned at the left and right side sill bonded portions 51, 51.

Each of the left and right divided cross-members 152, 152 has a substantially hat-shaped cross-section open toward the lower surface 19b of the floor panel 19, as does the body 67 of the tunnel cross-member 28. The upper ends of the left and right divided cross-members 152, 152 are bonded to the lower surface 19b of the floor panel 19, thereby forming rectangular closed cross-sections.

As described above, the tunnel cross-member 28 located at the center in the vehicle-width direction is connected continuously, i.e., integrally, in the vehicle-width direction with the left and right divided cross-members 152, 152 via the left and right tunnel frames 27, 27. The combination of the tunnel cross-member 28 and the left and right divided cross-members 152, 152 forms a single cross-member 153 that continuously extends in the vehicle-width direction. The cross-member 153 is called a lower-side continuous cross-member 153. Since the left and right divided cross-members 152, 152 are continuous with the tunnel cross-member 28 in the vehicle-width direction, a lateral impact on one of the side sills 17 can be efficiently transmitted to the other side sill 17 and the tunnel portion 18.

Figure 47:
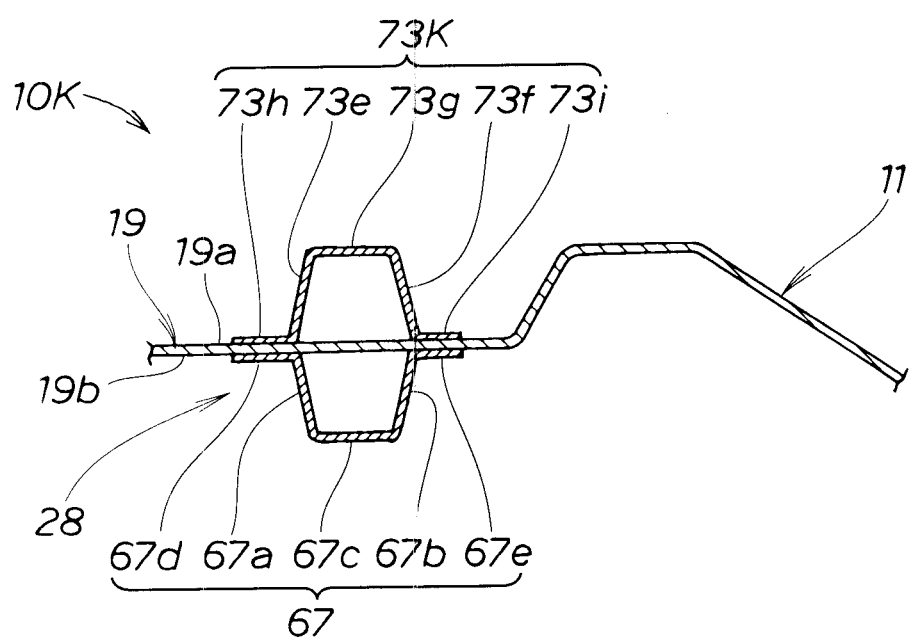
FIG. 47 is a cross-sectional view taken along line 47-47 of FIG. 45.
Figure 48:
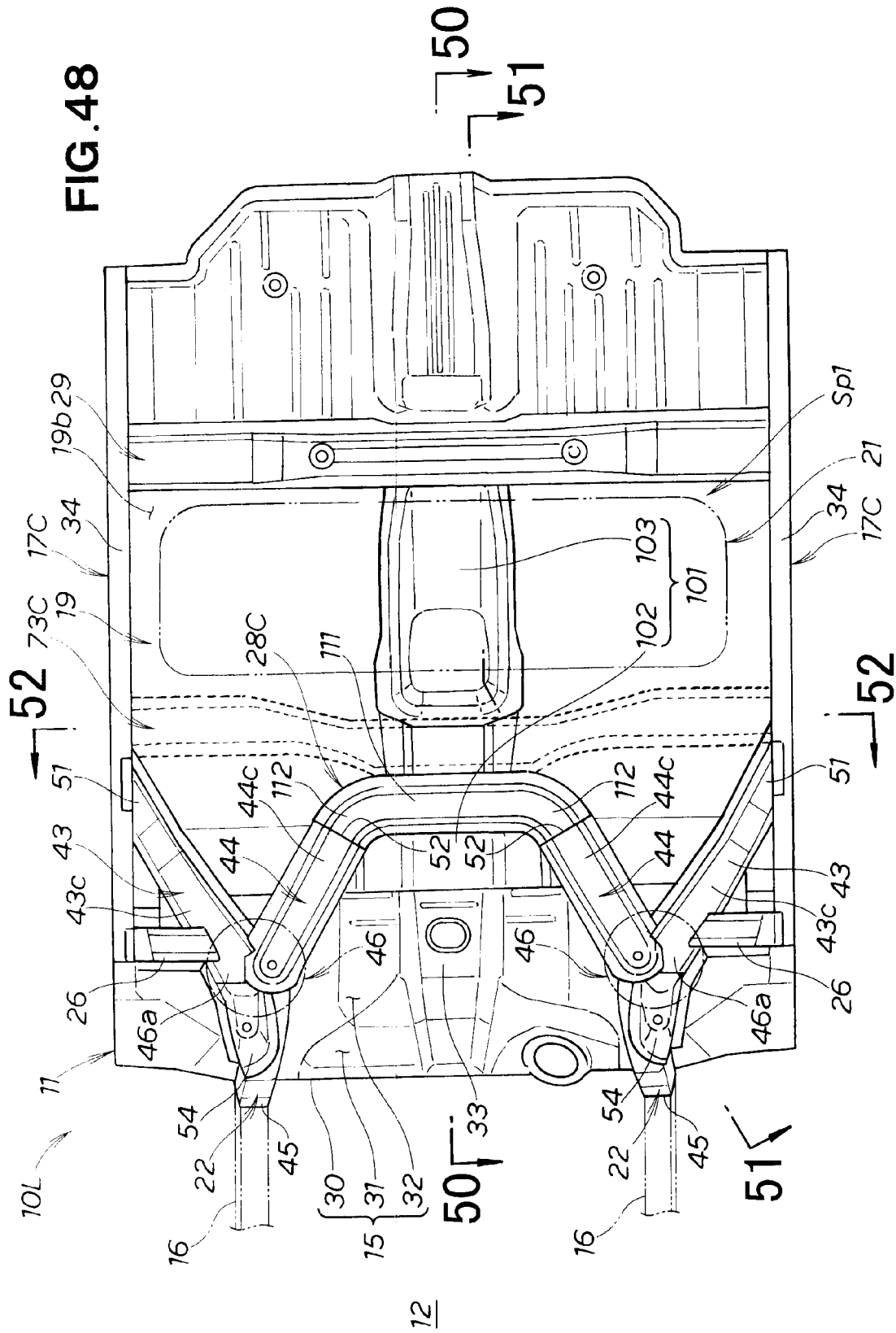
FIG. 48 is a bottom view of a front portion of a vehicle body according to a twelfth embodiment of the present invention.
Figure 49:
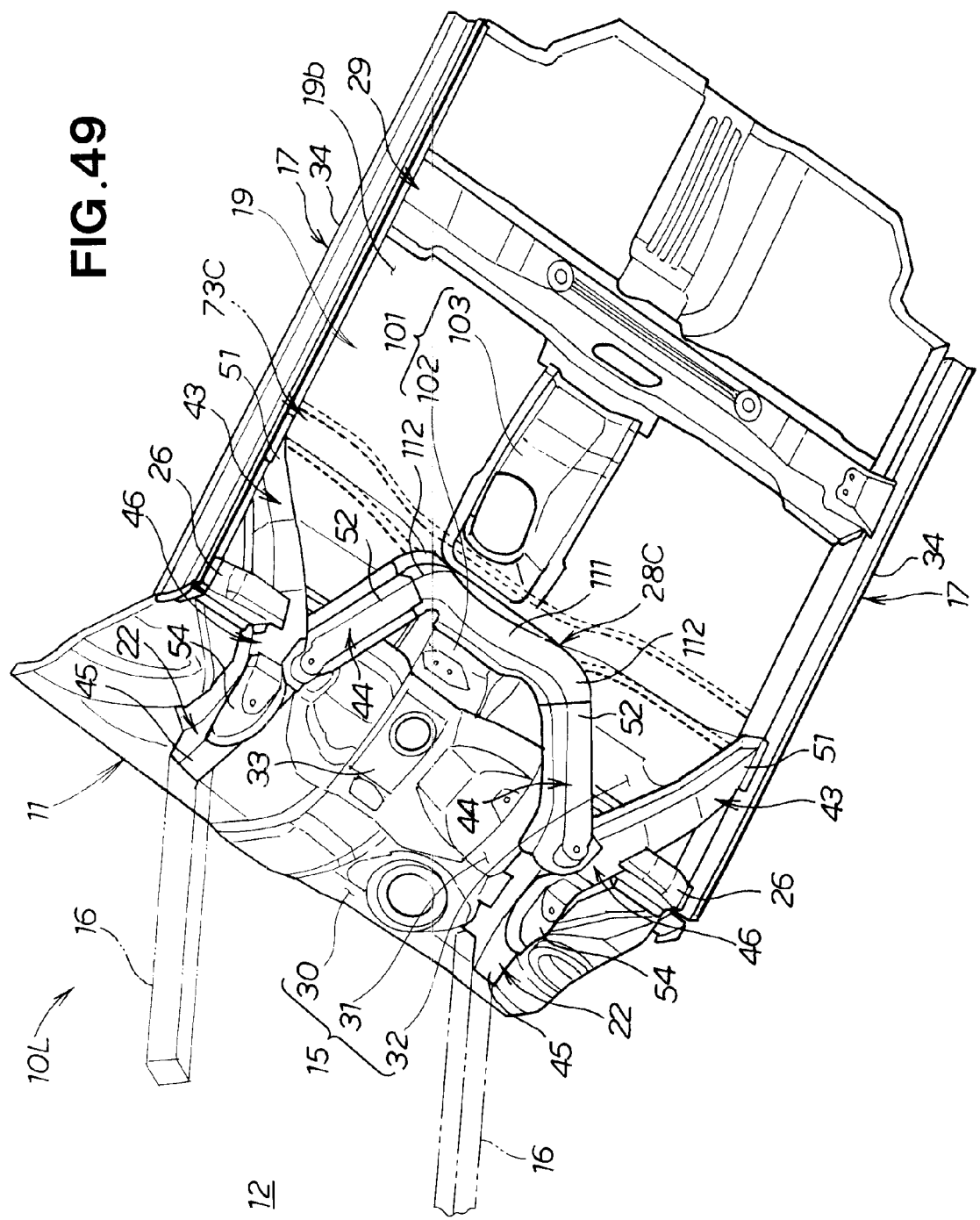
FIG. 49 is a perspective view of the front portion of the vehicle body according to the twelfth embodiment of the present invention, as viewed upward and rearward.
Figure 50:
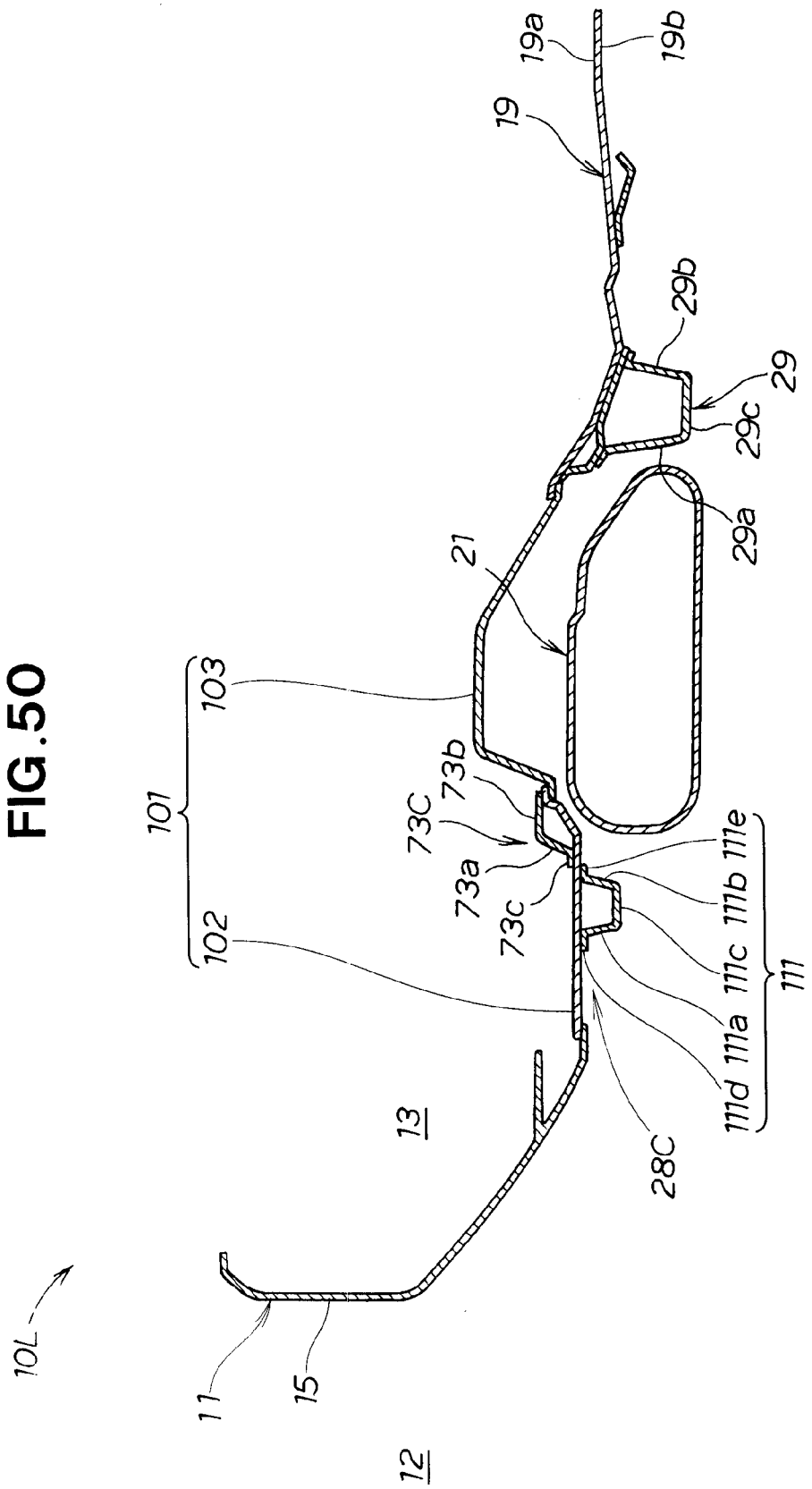
FIG. 50 is a cross-sectional view taken along line 50-50 of FIG. 48.
Figure 51:
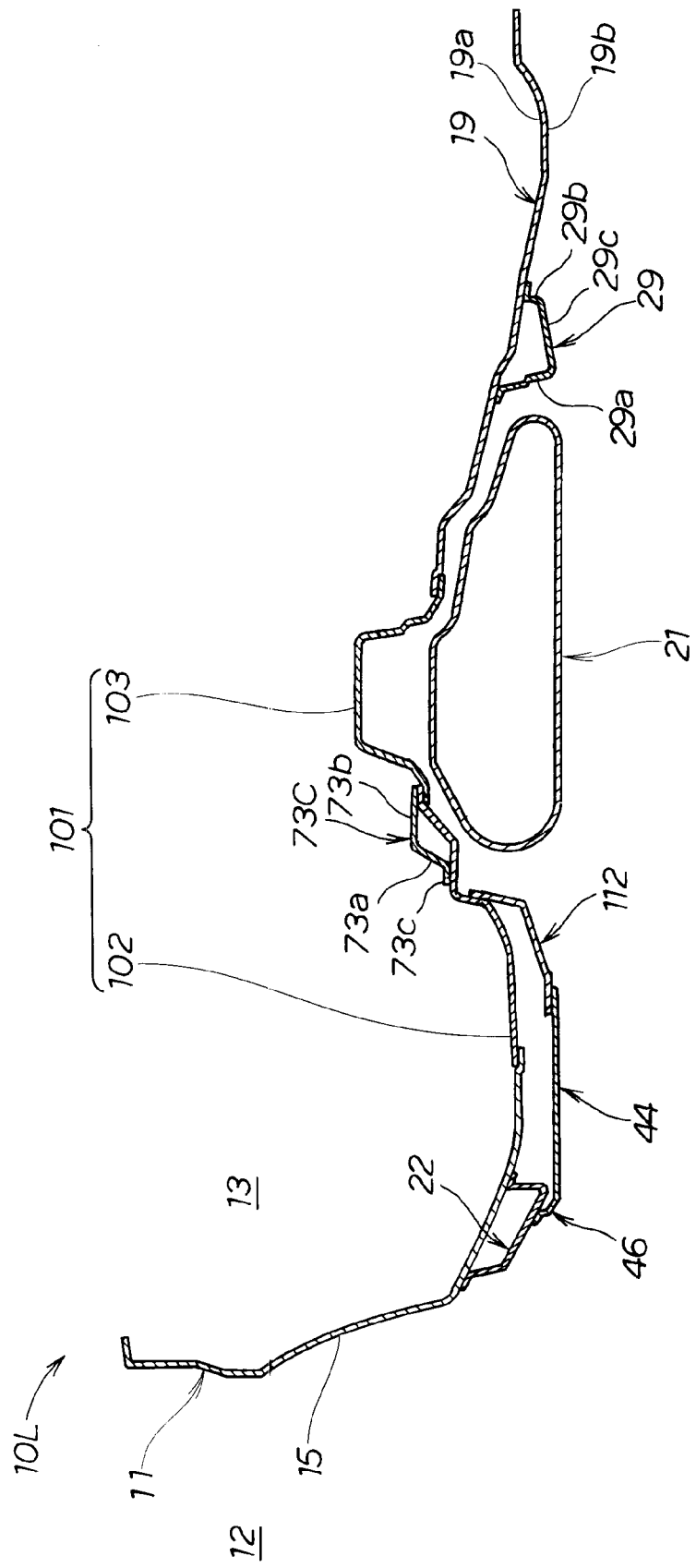
FIG. 51 is a cross-sectional view taken along line 51-51 of FIG. 48.

The front cross-member 73K shown in FIG. 47, which has substantially the same configuration as that of the front cross-member 73J shown in FIG. 39 described above, is placed on and bonded to the upper surface 19a of the floor panel 19. The front cross-member 73K in the eleventh embodiment is characterized in that it substantially overlaps with both the body 67 of the tunnel cross-member 28 and the left and right divided cross-members 152, 152 in a plan view, as shown in FIGS. 45 to 47. As a result, the entire front cross-member 73K completely or mostly overlaps with the body 67 of the tunnel cross-member 28. That is, the position of the front cross-member 73K coincides with the position of the tunnel cross-member 28 in the longitudinal direction of the vehicle body.

For example, the front cross-member 73K is positioned immediately above the body 67 with the floor panel 19 therebetween, as shown in FIG. 47. The front standing walls 67a, 73e coincide with each other in a plan view. The rear standing walls 67b, 73f coincide with each other in a plan view. The bottom walls 67c, 73g coincide with each other in a plan view. The front flanges 67d, 73h coincide with each other in a plan view. The rear flanges 67e, 73i coincide with each other in a plan view.

The description of the eleventh embodiment is summarized as follows. In the eleventh embodiment, the left and right divided cross-members 152, 152 are aligned with the tunnel cross-member 28 linearly in the vehicle-width direction and connect the left and right tunnel frames 27, 27 to the left and right side sills 17, 17. That is, the tunnel cross-member 28 and the left and right divided cross-members 152, 152 are aligned with each other linearly in the vehicle-width direction along the lower surface 18a of the tunnel portion 18 and connect the left and right side sills 17, 17 to each other. Further, the front cross-member 73K faces or is diagonally adjacent to a portion of the tunnel cross-member 28 with the floor panel 19 therebetween, as described above. The lower-side continuous cross-member 153, which is the combination of the tunnel cross-member 28 and the left and right divided cross-members 152, 152, and the front cross-member 73K are positioned above and below the floor panel 19. An impact transmitted from a side of the vehicle body to the corresponding one of the side sills 17 is transmitted through both the lower-side continuous cross-member 153 and the front cross-member 73K to the other side sill 17 and the tunnel portion 18. The lateral impact can be efficiently distributed to the other side sill 17 and the tunnel portion 18 by both the lower-side continuous cross-member 153 and the front cross-member 73K.

Further, the fuel tank 21 can be surrounded by the left and right side sills 17, 17, the rear cross-member 29, and the lower-side continuous cross-member 153. As a result, the fuel tank 21 can be better protected against a front impact and a lateral impact.

Twelfth Embodiment

A vehicle body structure according to a twelfth embodiment is described with reference to FIGS. 48 to 53. A vehicle body 11 of a vehicle 10L according to the twelfth embodiment differs from the vehicle body 11 of the vehicle 10C according to the fourth embodiment shown in FIGS. 17 to 26 in that the reinforcing members 121 and the stiffeners 126 in the left and right side sills 17C, 17C are omitted. The other components are substantially the same as those shown in FIGS. 17 to 26, and these components therefore have the same reference characters and are not described.

A front cross-member 73C in the twelfth embodiment basically has the same configuration as that of the front cross-member 73C in the fourth embodiment shown in FIGS. 17 to 25, as shown in FIGS. 48 to 51 and FIG. 53. The overall shape of the front cross-member 73C is so curved that a vehicle-width direction center portion thereof is convex toward the front of the vehicle body in a bottom view.

Specifically, the vehicle-width direction center portion of the front cross-member 73C is adjacent to the body 111 of the tunnel cross-member 28C and extends therealong in the vehicle-width direction. A flange 73c of the front cross-member 73C and the rear flange 111e of the body 111 of the tunnel cross-member 28C vertically overlap with each other with the floor panel 19 interposed therebetween. That is, the flanges 73c and 111e are continuous with each other in the vertical direction with the floor panel 19 interposed therebetween. Both ends of the front cross-member 73C on the outer side in the vehicle-width direction are so positioned that at least part of them overlaps with the left and right side sill bonded portions 51, 51.

Figure 52:
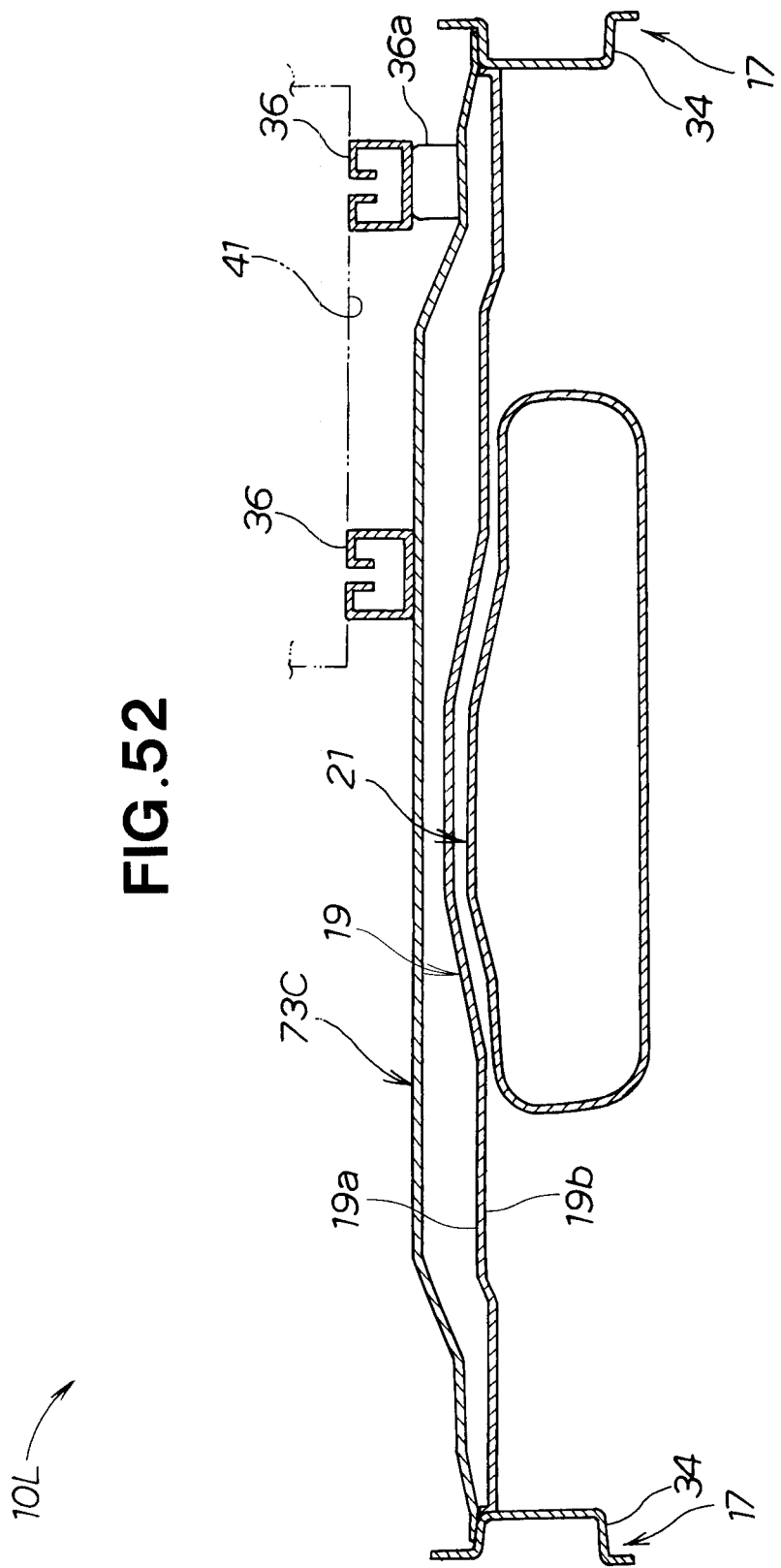
FIG. 52 is a cross-sectional view taken along line 52-52 of FIG. 48.
Figure 53:
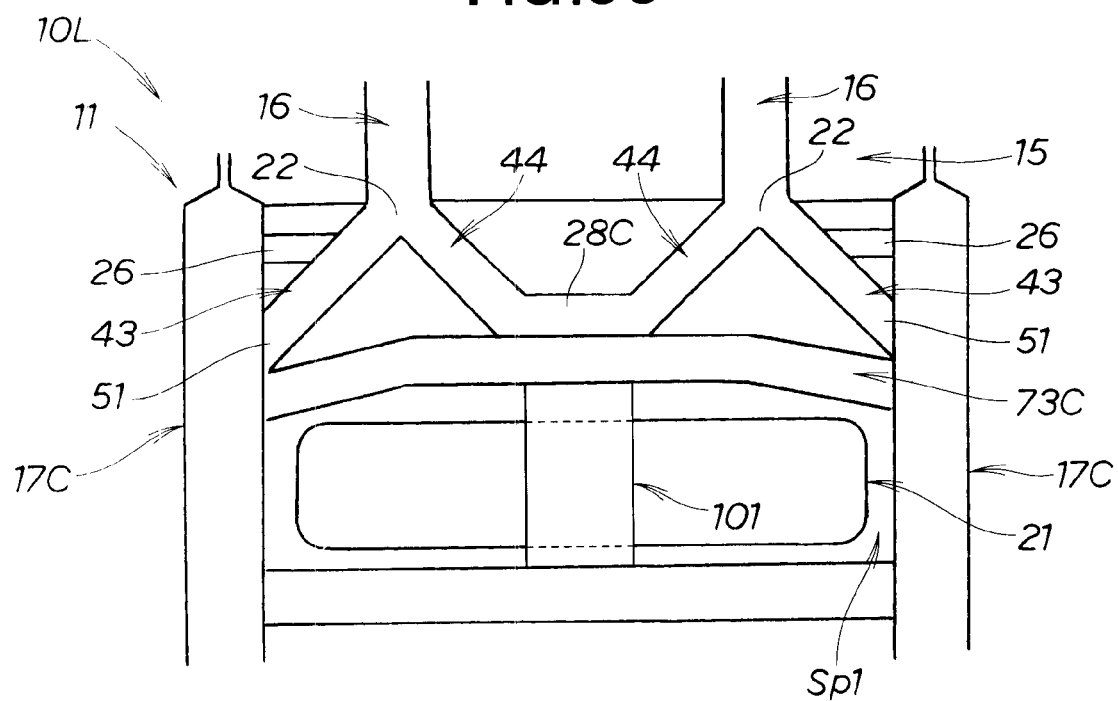
FIG. 53 is a bottom view diagrammatically showing the front portion of the vehicle body of FIG. 48.

The front portions of the seat rails 36, 36 are attached to the front cross-member 73J via the seat brackets 36a, as shown in FIG. 52.

The description of the twelfth embodiment is summarized as follows. In the twelfth embodiment, the front cross-member 73C runs between the left and right side sills 17, 17 along the upper surface 19a of the floor panel 19 and is positioned in, or adjacent to, the region of the body 111 of the tunnel cross-member 28C with the floor panel 19 therebetween. A lateral impact can therefore be efficiently distributed from the one of the side sills 17 through the front cross-member 73C to the other side sill 17, the tunnel cross-member 28C, and the tunnel portion 101.

Thirteenth Embodiment

A vehicle body structure according to a thirteenth embodiment is described with reference to FIGS. 54 and 55. A vehicle body 11 of a vehicle 10M according to the thirteenth embodiment is characterized in that the front cross-member 73C shown in FIGS. 48 to 53 is changed to a front cross-member 73M having a configuration shown in FIGS. 54 and 55. The other components are substantially the same as those shown in FIGS. 48 to 53, and these components therefore have the same reference characters and are not described.

Figure 54:
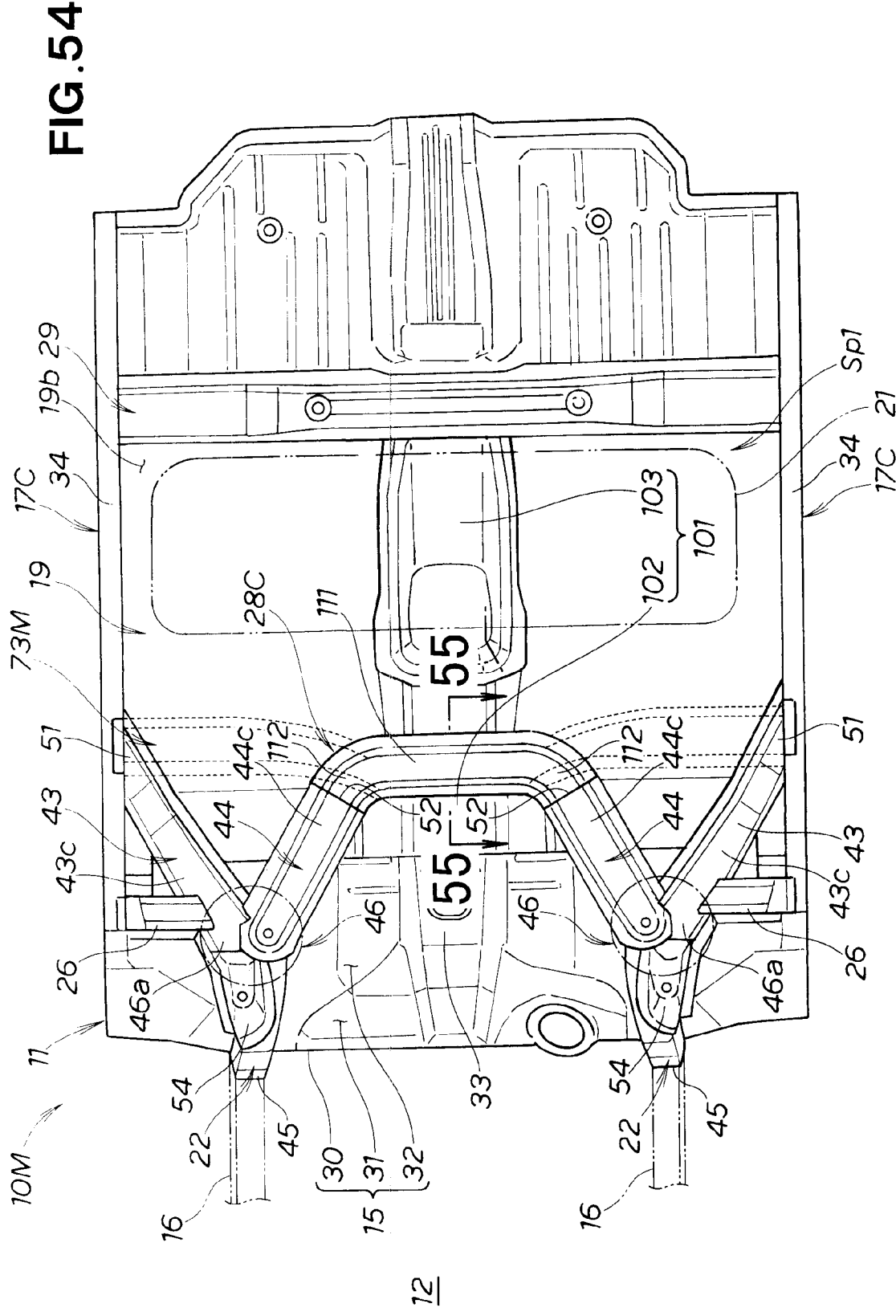
FIG. 54 is a bottom view of a front portion of a vehicle body according to a thirteenth embodiment of the present invention.
Figure 55:
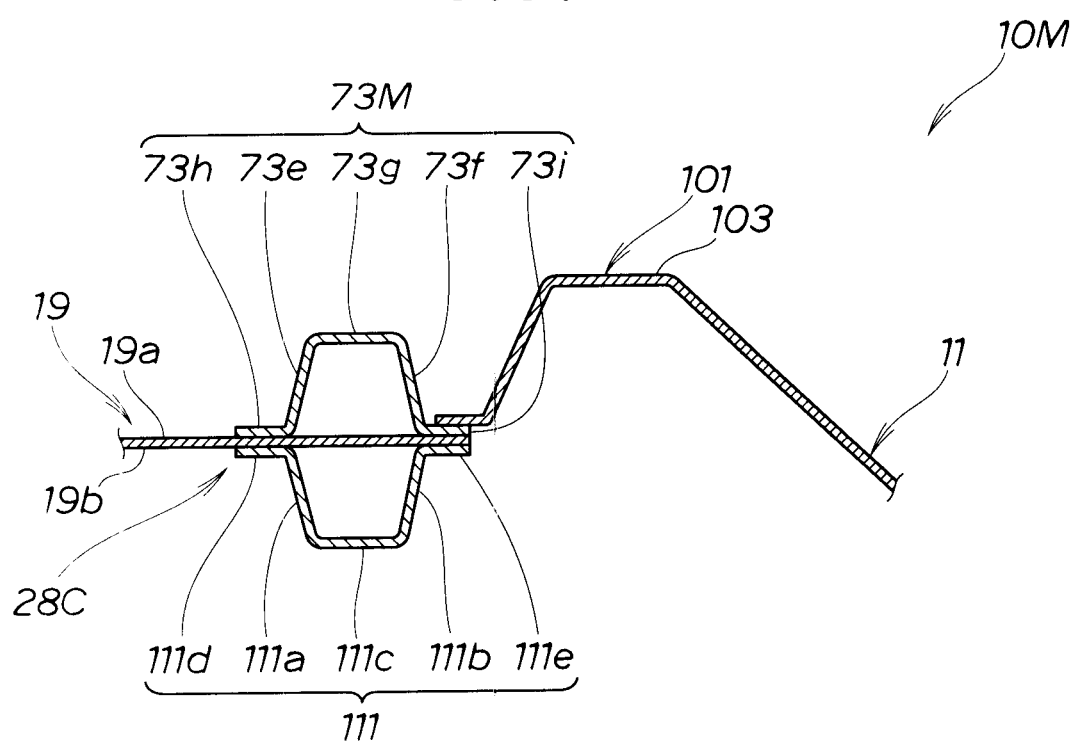
FIG. 55 is a cross-sectional view taken along line 55-55 of FIG. 54.

The front cross-member 73M has a curved overall shape so that a vehicle-width direction center thereof is convex toward the front of the vehicle body in a bottom view, and is placed on and bonded to the upper surface 19a of the floor panel 19, as shown in FIG. 54. That is, the overall shape of the front cross-member 73M is substantially the same as that of the front cross-member 73C shown in FIG. 48 described above.

The vehicle-width direction center portion of the front cross-member 73M is positioned immediately above the body 111 of the tunnel cross-member 28C with the floor panel 19 therebetween. That is, the central portion completely or mostly overlaps with the body 111. The ends of the front cross-member 73M on the outer side in the vehicle-width direction are positioned at the left and right side sill bonded portions 51, 51.

The cross-section of the front cross-member 73M is substantially the same as that of the front cross-member 73J in the tenth embodiment shown in FIG. 41 described above, as shown in FIG. 55. That is, the front cross-member 73M has a hat-shaped cross-section which opens downward, and the open end is placed on and bonded to the upper surface 19a of the floor panel 19 from above. The lower end of the front cross-member 73M is bonded to the upper surface 19a of the floor panel 19, thereby forming a rectangular closed cross-section. Specifically, the front cross-member 73M is formed of a front standing wall 73e, a rear standing wall 73f, a bottom wall 73g, a front flange 73h, and a rear flange 73i. The front flange 73h and the rear flange 73i are placed on and bonded to the upper surface 19a of the floor panel 19.

The front standing wall 73e of the front cross-member 73M coincides with the front standing wall 111a of the body 111 in a plan view. Similarly, the rear standing walls 73f, 111b coincide with each other in a plan view. The bottom walls 73g, 111c coincide with each other in a plan view. The front flanges 73h, 111d coincide with each other in a plan view. The rear flanges 73i, 111e coincide with each other in a plan view.

The description of the thirteenth embodiment is summarized as follows. In the thirteenth embodiment, the front cross-member 73M coincides with the tunnel cross-member 28C (body 111, in particular) in the longitudinal direction of the vehicle body. Further, the front cross-member 73M and the tunnel cross-member 28C are positioned on vertically opposite sides with the floor panel 19 therebetween, as described above. A lateral impact can therefore be efficiently distributed from one of the side sills 17C through the front cross-member 73M to the other side sill 17C, the tunnel cross-member 28C, and the tunnel portion 101. Moreover, since the front cross-member 73M and the tunnel cross-member 28C face each other in the vertical direction with the floor panel 19 therebetween, the strength and rigidity of the floor panel 19 can be increased.

In the invention, the first to thirteenth embodiments have been depicted above, but any of the embodiments can be combined as appropriate.

The energy container is the fuel tank 21 in the above description but is not limited thereto. For example, the energy container may be a battery, a fuel cell, a hydrogen tank, or the like.

The strength and rigidity of the vehicle body 11 can be further increased by providing an extra cross-member that is a separate member and that runs between the left and right bifurcating portions 46, 46.

The left and right sub-frame attaching points 54, 54 can be positioned at the left and right bifurcating portions 46, 46.

The strength and rigidity of the tunnel portions 18, 101 can be further increased by an appropriate combination of selecting the plate thickness, selecting the material, and adding any of the tunnel stiffeners 131, 132, and 133 shown in FIGS. 36 to 38.

Any of the tunnel stiffeners 131, 132, and 133 shown in FIGS. 36 to 38 can be provided throughout the entire tunnel portion 101 in the longitudinal direction of the vehicle body.

INDUSTRIAL APPLICABILITY

The vehicle body structures according to the invention are suitable for use in vehicle bodies of a variety of vehicles including sedans, wagons, and other passenger vehicles.

REFERENCE SIGNS LIST 10, 10A to 10H, 10J to 10M: Vehicle
11: Vehicle body
15: Dashboard
16: Front side frame
17, 17C: Side sill
18: Tunnel portion
19: Floor panel
19a: Upper surface
19b: Lower surface
21: Energy container (fuel tank)
22: Side frame extension
23: Sub-frame
26: Connecting member
27: Tunnel frame
28, 28C: Tunnel cross-member
29: Rear cross-member
34: Side sill inner portion
34a: Surface on outer side in vehicle-width direction
35: Side sill outer portion
43: Side-sill-side extension
43c: Bottom surface
44: Tunnel-side extension
44c: Bottom surface
46: Bifurcating portion
46a: Bottom surface
54: Sub-frame attaching portion
71, 71B: First triangular frame structure
72: Second triangular frame structure
73, 73C, 73J, 73K, 73M: Front cross-member
101: Tunnel portion
121, 121D: Reinforcing member
152: Divided cross-member
Sp1, Sp2: Space

The invention claimed is:

1. A vehicle body structure comprising: left and right front side frames located in a front portion of a vehicle body on left and right sides thereof and extending in a longitudinal direction of the vehicle body; a dashboard located behind the left and right front side frames and partitioning the vehicle body into the front portion and a rear portion; left and right side sills located behind the dashboard and on outer sides of the left and right front side frames in a vehicle-width direction and extending in the longitudinal direction of the vehicle body; a floor panel running between the left and right side sills and extending rearward from a lower portion of the dashboard; a tunnel portion protruding upward from the floor panel and extending from a vehicle-width direction center and lower end of the dashboard to a rear portion of the floor panel; a tunnel cross-member extending in the vehicle-width direction along a lower surface of a front portion of the tunnel portion and running across the tunnel portion; left and right side frame extensions extending rearward from rear ends of the left and right front side frames and located along a lower surface of the dashboard; and a rear cross-member running between the left and right side sills along a lower surface of a rear portion of the tunnel portion, wherein the floor panel has left and right protrusions protruding toward a passenger compartment so that a low-profile energy container is accommodated in a space located under a front seat and surrounded by the left and right side sills and the rear cross-member, the tunnel portion is made of a material having greater rigidity and strength than the floor panel, protrudes upward by a greater amount than the left and right protrusions of the floor panel, has an inverted U shape, and extends in the longitudinal direction of the vehicle body, a front end of the tunnel portion being bonded to the vehicle-width direction center and lower end of the dashboard and a rear end of the tunnel portion being bonded to the rear cross-member located behind the energy container and connecting the left and right side sills, the tunnel cross-member is bonded along a lower surface of the tunnel portion in front of the left and right protrusions to form a closed cross-section, the left and right side frame extensions have left and right bifurcating portions under the dashboard where the left and right side frame extensions bifurcate into left and right side-sill-side extensions and left and right tunnel-side extensions, the left and right side-sill-side extensions extend from the left and right bifurcating portions outward in the vehicle-width direction and obliquely rearward, and are bonded to the left and right side sills in front of the left and right protrusions, the left and right tunnel-side extensions extend from the left and right bifurcating portions inward in the vehicle-width direction and obliquely rearward and are bonded to left and right ends of the tunnel cross-member in front of the left and right protrusions, and a first tilt angle by which the left and right side-sill-side extensions are inclined outward in the vehicle-width direction and rearward is set to be substantially equal to a second tilt angle by which the left and right tunnel-side extensions are inclined inward in the vehicle-width direction and rearward.

2. The vehicle body structure of claim 1, further comprising left and right connecting members connecting front ends of the left and right side sills to the left and right bifurcating portions, and a front cross-member located behind the left and right tunnel-side extensions and extending in the vehicle-width direction,
   wherein the left and right side-sill-side extension, the left and right tunnel-side extensions, and the front cross-member form left and right first triangular frame structures, each of which having a substantially triangular shape, and
   wherein the left and right connecting members, the left and right side sills, and the left and right side-sill-side extensions form left and right second triangular frame structures each of which having a substantially triangular shape, and each of the second triangular frame structures is adjacent to the first triangular frame structure.

3. The vehicle body structure of claim 1, wherein each of the left and right side frame extensions forms a closed cross-section, and an area or a width of the closed cross-section of each of the left and right side frame extensions is set to be maximized at the corresponding bifurcating portion.

4. The vehicle body structure of claim 1, further comprising left and right tunnel frames located on opposite sides of the tunnel portion in the vehicle-width direction and extending in the longitudinal direction of the vehicle body,
   wherein rear ends of the left and right tunnel-side extensions are bonded to front curved portions of the left and right tunnel frames.

5. The vehicle body structure of claim 4, wherein front portions of the left and right tunnel frames have the front curved portions extending outward in the vehicle-width direction while being curved in opposite directions, and the front portions are connected to the front curved portions by the tunnel cross-member.

6. The vehicle body structure of claim 1, further comprising left and right connecting members for connecting front ends of the left and right side sills to the left and right bifurcating portions.

7. The vehicle body structure of claim 1, wherein bottom surfaces of the left and right bifurcating portions are substantially flush with bottom surfaces of the side-sill-side extensions and bottom surfaces of the tunnel-side extensions at a level of a horizontal portion of the lower surface of the dashboard.

8. The vehicle body structure of claim 1, further comprising a sub-frame, part of the sub-frame detachably attached to lower portions of the left and right front side frames,
   wherein each of the bifurcating portions of the left and right side frame extensions has a sub-frame attaching portion for detachably attaching the sub-frame.

9. The vehicle body structure of claim 4, wherein the left and right tunnel frames are curved to pass above an energy container disposed under the floor panel, and the left and right tunnel frames extend along a lower surface of the floor panel.

10. The vehicle body structure of claim 1, wherein each of the left and right side frame extensions has an inverted hat-shaped cross-section, and the left and right side-sill-side extensions are formed integrally with the left and right side frame extensions so that the inverted hat-shaped cross-sections thereof seamlessly continue.

11. The vehicle body structure of claim 10, wherein the left and right tunnel-side extensions are members separate from the left and right side frame extensions and the left and right side-sill-side extensions, each of the left and right side-sill-side extensions and the left and right tunnel-side extensions forms a closed cross-section, and an area of the closed cross-section of each of the left and right side-sill-side extensions is set to be greater than an area of the closed cross-section of each of the left and right tunnel-side extensions.

12. The vehicle body structure of claim 1, further comprising a rear cross-member running between the left and right side sills along a lower surface of a rear portion of the tunnel portion,
   wherein the left and right side sills are formed of left and right side sill inner portions located on the inner side in the vehicle-width direction and left and right side sill outer portions located on the outer side in the vehicle-width direction, a reinforcing member is provided on a vehicle-width-direction outer surface of each of the left and right side sill inner portions, front ends of the left and right reinforcing members are positioned at rear ends of the left and right side-sill-side extensions, and rear ends of the left and right reinforcing members are positioned at portions of the rear cross-member.

13. The vehicle body structure of claim 1, wherein strength and rigidity of the tunnel portion are set to be greater than strength and rigidity of the floor panel.

14. The vehicle body structure of claim 1, further comprising a tunnel stiffener provided in the tunnel portion and disposed above the floor panel, wherein the tunnel stiffener extends in the longitudinal direction along the tunnel portion and forms a closed cross-section.

15. The vehicle body structure of claim 1, wherein a tunnel stiffener is provided in the tunnel portion and is disposed above the floor panel, said tunnel stiffener extending in the longitudinal direction of the tunnel portion and cooperates with the tunnel portion to form a closed cross-section extending in the longitudinal direction of the vehicle body.

16. The vehicle body structure of claim 1, wherein the vehicle body structure further comprises a front cross-member located above the tunnel portion and opposite the tunnel cross-member below the floor panel, and the front cross-member and a front portion of each of the protrusions form a rectangular closed cross-section between the left and right side sills.

17. The vehicle body structure of claim 2, wherein the vehicle body structure further comprises a front cross-member located above the tunnel portion and opposite the tunnel cross-member below the floor panel, and the front cross-member and a front portion of each of the protrusions form a rectangular closed cross-section between the left and right side sills.

* * * * *